United States Patent
Gillespie et al.

(10) Patent No.: US 6,414,671 B1
(45) Date of Patent: *Jul. 2, 2002

(54) OBJECT POSITION DETECTOR WITH EDGE MOTION FEATURE AND GESTURE RECOGNITION

(75) Inventors: David W. Gillespie, Palo Alto; Timothy P. Allen, Los Gatos; Ralph C. Wolf, Santa Clara; Shawn P. Day, San Jose, all of CA (US)

(73) Assignee: Synaptics Incorporated, San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/046,716

(22) Filed: Mar. 24, 1998

Related U.S. Application Data

(60) Division of application No. 08/899,317, filed on Aug. 12, 1997, which is a continuation of application No. 08/623,483, filed on Mar. 28, 1996, now Pat. No. 5,880,411, which is a continuation-in-part of application No. 08/320,158, filed on Oct. 7, 1994, now Pat. No. 5,543,591, which is a continuation-in-part of application No. 08/300,387, filed on Sep. 2, 1994, now Pat. No. 5,914,465, which is a continuation-in-part of application No. 08/115,743, filed on Aug. 31, 1993, now Pat. No. 5,374,787, which is a continuation-in-part of application No. 07/895,934, filed on Jun. 8, 1992, now abandoned.

(51) Int. Cl.[7] .................................................. G09G 5/08

(52) U.S. Cl. ...................... 345/157; 345/173; 178/18.01

(58) Field of Search ................................ 345/157, 159, 345/160, 173, 174, 358, 169; 178/18.01, 18, 19.01, 18.06, 20.01, 18.03, 18.05, 18.07, 19.03; 341/33; 382/119, 181, 186, 187, 189

(56) References Cited

U.S. PATENT DOCUMENTS

| | | | |
|---|---|---|---|
| 2,219,497 A | 10/1940 | Stevens et al. | 175/183 |
| RE23,030 E | 8/1948 | Holt | 35/1 |
| 3,128,458 A | 4/1964 | Romero | 340/337 |
| 3,207,905 A | 9/1965 | Bray | 250/206 |
| 3,244,369 A | 4/1966 | Nassimbene | 235/145 |

(List continued on next page.)

FOREIGN PATENT DOCUMENTS

| | | | |
|---|---|---|---|
| EP | 0 187 372 | 12/1985 | G01B/7/00 |
| EP | 0 394 614 | 10/1990 | G06F/3/033 |
| EP | 0 490 001 | 6/1992 | G06F/3/033 |

(List continued on next page.)

OTHER PUBLICATIONS

Chun, et al., "A High–Performance Silicon Tactile Imager Based on a Capacitive Cell", IEEE Transactions on Electron Devices, Jul. 1985, vol. ED–32, No. 7, pp. 1196–1201.

"Double–Click Generation Method for Pen Operations", IBM Technical Disclosure Bulletin, Nov. 1992, vol. 35, No. 6, p. 3.

(List continued on next page.)

Primary Examiner—Bipin Shalwala
Assistant Examiner—Mansour M. Said
(74) Attorney, Agent, or Firm—Sierra Patent Group, Ltd.

(57) ABSTRACT

Methods for recognizing gestures made by a conductive object on a touch-sensor pad and for cursor motion are disclosed. Tapping, drags, pushes, extended drags and variable drags gestures are recognized by analyzing the position, pressure, and movement of the conductive object on the sensor pad during the time of a suspected gesture, and signals are sent to a host indicating the occurrence of these gestures. Signals indicating the position of a conductive object and distinguishing between the peripheral portion and an inner portion of the touch-sensor pad are also sent to the host.

5 Claims, 28 Drawing Sheets

U.S. PATENT DOCUMENTS

| | | | |
|---|---|---|---|
| 3,401,470 A | 9/1968 | Gaven | 35/9 |
| 3,437,795 A | 4/1969 | Kuljian | 235/61.1 |
| 3,482,241 A | 12/1969 | Johnson | 340/337 |
| 3,492,440 A | 1/1970 | Cerbone et al. | 179/90 |
| 3,493,791 A | 2/1970 | Adelson et al. | 307/252 |
| 3,497,617 A | 2/1970 | Ellis et al. | 178/19 |
| 3,497,966 A | 3/1970 | Gaven | 35/9 |
| 3,516,176 A | 6/1970 | Cleary et al. | 35/9 |
| 3,522,664 A | 8/1970 | Lambright et al. | 35/8 |
| 3,530,310 A | 9/1970 | Adelson et al. | 307/252 |
| 3,543,056 A | 11/1970 | Klein | 307/308 |
| 3,549,909 A | 12/1970 | Adelson et al. | 307/252 |
| 3,593,115 A | 7/1971 | Dym et al. | 323/93 |
| 3,598,903 A | 8/1971 | Johnson et al. | 178/18 |
| 3,662,378 A | 5/1972 | MacArthur | 340/347 DD |
| 3,675,239 A | 7/1972 | Ackerman et al. | 340/365 |
| 3,683,371 A | 8/1972 | Holz | 340/365 |
| 3,696,409 A | 10/1972 | Braaten | 340/365 |
| 3,732,389 A | 5/1973 | Kaelin et al. | 200/167 A |
| 3,737,670 A | 6/1973 | Larson | 307/116 |
| 3,757,322 A | 9/1973 | Barkan et al. | 340/365 C |
| 3,760,392 A | 9/1973 | Stich | 340/200 |
| 3,773,989 A | 11/1973 | Hacon | 200/52 R |
| 3,875,331 A | 4/1975 | Hasenbalg | 178/19 |
| 3,921,166 A | 11/1975 | Volpe | 340/365 C |
| 3,931,610 A | 1/1976 | Marin et al. | 340/172.5 |
| 3,932,862 A | 1/1976 | Graven | 340/324 M |
| 3,974,332 A | 8/1976 | Abe et al. | 178/18 |
| 3,992,579 A | 11/1976 | Dym et al. | 178/18 |
| 3,999,012 A | 12/1976 | Dym | 178/18 |
| 4,056,699 A | 11/1977 | Jordan | 200/5 A |
| 4,058,765 A | 11/1977 | Richardson et al. | 324/61 R |
| 4,071,691 A | 1/1978 | Pepper, Jr. | 178/19 |
| 4,087,625 A | 5/1978 | Dym et al. | 178/19 |
| 4,103,252 A | 7/1978 | Bobick | 331/48 |
| 4,129,747 A | 12/1978 | Pepper, Jr. | 178/19 |
| 4,148,014 A | 4/1979 | Burson | 340/709 |
| 4,177,354 A | 12/1979 | Mathews | 178/18 |
| 4,177,421 A | 12/1979 | Thornburg | 324/61 R |
| 4,198,539 A | 4/1980 | Pepper, Jr. | 178/18 |
| 4,221,975 A | 9/1980 | Ledniczki et al. | 307/116 |
| 4,224,615 A | 9/1980 | Penz | 340/712 |
| 4,246,452 A | 1/1981 | Chandler | 200/5 A |
| 4,257,117 A | 3/1981 | Besson | 368/69 |
| 4,264,903 A | 4/1981 | Bigelow | 340/365 C |
| 4,281,323 A | 7/1981 | Burnett et al. | 340/712 |
| 4,290,052 A | 9/1981 | Eichelberger et al. | 340/365 C |
| 4,290,061 A | 9/1981 | Serrano | 340/712 |
| 4,291,303 A | 9/1981 | Cutler et al. | 340/711 |
| 4,293,734 A | 10/1981 | Pepper, Jr. | 178/18 |
| 4,302,011 A | 11/1981 | Pepper, Jr. | 273/85 |
| 4,310,839 A | 1/1982 | Schwerdt | 340/712 |
| 4,313,113 A | 1/1982 | Thornburg | 340/709 |
| 4,334,219 A | 6/1982 | Paülus et al. | 340/712 |
| 4,371,746 A | 2/1983 | Pepper, Jr. | 178/18 |
| 4,398,181 A | 8/1983 | Yamamoto | 340/365 S |
| 4,423,286 A | 12/1983 | Bergeron | 178/19 |
| 4,430,917 A | 2/1984 | Pepper, Jr. | 84/1.01 |
| 4,442,317 A | 4/1984 | Jandrell | 178/18 |
| 4,455,452 A | 6/1984 | Schuyler | 178/18 |
| 4,475,235 A | 10/1984 | Graham | 382/3 |
| 4,476,463 A | 10/1984 | Ng et al. | 340/712 |
| 4,511,760 A | 4/1985 | Garwin et al. | 178/18 |
| 4,516,112 A | 5/1985 | Chen | 340/365 |
| 4,526,043 A | 7/1985 | Boie et al. | 73/862.04 |
| 4,550,221 A | 10/1985 | Mabusth | 178/18 |
| 4,550,310 A | 10/1985 | Yamaguchi et al. | 340/365 |
| 4,554,409 A | 11/1985 | Mitsui et al. | 178/19 |
| 4,570,149 A | 2/1986 | Thornburg et al. | 338/114 |
| 4,582,955 A | 4/1986 | Blesser | 178/19 |
| 4,595,913 A | 6/1986 | Aubuchon | 340/365 |
| 4,616,107 A | 10/1986 | Abe et al. | 178/18 |
| 4,639,720 A | 1/1987 | Rympalski et al. | 340/712 |
| 4,653,107 A | 3/1987 | Shojima et al. | 382/13 |
| 4,672,154 A | 6/1987 | Rodgers et al. | 178/19 |
| 4,680,430 A | 7/1987 | Yoshikawa et al. | 178/19 |
| 4,686,332 A | 8/1987 | Greanias et al. | 178/19 |
| 4,698,461 A | 10/1987 | Meadows et al. | 178/19 |
| 4,733,222 A | 3/1988 | Evans | 340/365 C |
| 4,734,685 A | 3/1988 | Watanabe | 340/710 |
| 4,736,191 A | 4/1988 | Matzke et al. | 340/365 C |
| 4,758,690 A | 7/1988 | Kimura | 178/19 |
| 4,766,423 A | 8/1988 | Ono et al. | 340/709 |
| 4,773,024 A | 9/1988 | Faggin et al. | 364/513 |
| 4,788,385 A | 11/1988 | Kimura | 178/19 |
| 4,794,208 A | 12/1988 | Watson | 178/19 |
| 4,802,103 A | 1/1989 | Faggin et al. | 364/513 |
| 4,820,886 A | 4/1989 | Watson | 178/19 |
| 4,853,498 A | 8/1989 | Meadows et al. | 178/19 |
| 4,914,624 A * | 4/1990 | Dunthorn | 364/900 |
| 4,918,262 A | 4/1990 | Flowers et al. | 178/18 |
| 4,922,061 A | 5/1990 | Meadows et al. | 178/19 |
| 4,935,728 A | 6/1990 | Kley | 340/709 |
| 4,954,967 A | 9/1990 | Takehashi | 364/518 |
| 4,962,342 A | 10/1990 | Mead et al. | 307/201 |
| 4,988,982 A | 1/1991 | Rayner et al. | 340/706 |
| 5,016,008 A | 5/1991 | Gruaz et al. | 341/33 |
| 5,083,044 A | 1/1992 | Mead et al. | 307/311 |
| 5,117,071 A | 5/1992 | Greanias et al. | 178/19 |
| 5,119,038 A | 6/1992 | Anderson et al. | 330/2 |
| 5,120,907 A | 6/1992 | Shinbori et al. | 478/18 |
| 5,120,908 A | 6/1992 | Zank et al. | 178/19 |
| 5,120,996 A | 6/1992 | Mead et al. | 307/353 |
| 5,122,623 A | 6/1992 | Zank et al. | 178/19 |
| 5,146,049 A | 9/1992 | Shima | 178/18 |
| 5,149,919 A | 9/1992 | Greanias et al. | 178/19 |
| 5,153,572 A | 10/1992 | Caldwell et al. | 340/712 |
| 5,164,713 A | 11/1992 | Bain | 340/710 |
| 5,191,641 A | 3/1993 | Yamamoto | 395/118 |
| 5,194,862 A | 3/1993 | Edwards | 341/20 |
| 5,220,649 A | 6/1993 | Forcier | 395/148 |
| 5,231,450 A | 7/1993 | Daniels | 355/27 |
| 5,239,140 A | 8/1993 | Kuroda et al. | 178/18 |
| 5,252,951 A * | 10/1993 | Tannenbaum et al. | 345/156 |
| 5,270,711 A | 12/1993 | Knapp | 341/34 |
| 5,287,105 A | 2/1994 | Sclotterbeck et al. | 341/20 |
| 5,327,161 A * | 7/1994 | Logan et al. | 345/157 |
| 5,339,213 A | 8/1994 | O'Callaghan | 361/683 |
| 5,349,303 A | 9/1994 | Gerpheide | 330/257 |
| 5,363,120 A * | 11/1994 | Drumm | 345/158 |
| 5,365,254 A | 11/1994 | Kawamoto | 345/157 |
| 5,369,227 A | 11/1994 | Stone | 178/18 |
| 5,373,118 A | 12/1994 | Watson | 178/19 |
| 5,374,787 A | 12/1994 | Miller et al. | 178/18 |
| 5,374,942 A | 12/1994 | Gilligan et al. | 345/157 |
| 5,376,946 A * | 12/1994 | Mikan | 345/157 |
| 5,376,948 A | 12/1994 | Roberts | 345/173 |
| 5,386,219 A | 1/1995 | Greanias et al. | 345/174 |
| 5,389,745 A | 2/1995 | Sakamoto | 178/18 |
| 5,402,151 A | 3/1995 | Duwaer | 345/173 |
| 5,408,194 A | 4/1995 | Steinbach et al. | 327/62 |
| 5,408,593 A | 4/1995 | Kotaki et al. | 395/122 |
| 5,428,367 A | 6/1995 | Mikan | 345/157 |
| 5,455,906 A | 10/1995 | Usuda | 395/162 |
| 5,469,191 A | 11/1995 | Smith, III et al. | 345/157 |
| 5,488,204 A | 1/1996 | Mead et al. | 178/18 |
| 5,495,077 A | 2/1996 | Miller et al. | 178/18 |
| 5,517,578 A | 5/1996 | Altman et al. | 382/181 |
| 5,543,588 A | 8/1996 | Bissett et al. | 178/18 |
| 5,563,632 A | 10/1996 | Roberts | 345/173 |
| 5,579,036 A | 11/1996 | Yates, IV | 345/173 |

| | | | |
|---|---|---|---|
| 5,602,570 A | 2/1997 | Capps et al. ............... 345/173 |
| 5,612,719 A | 3/1997 | Beernink et al. ........... 345/173 |
| 5,717,939 A | 2/1998 | Bricklin et al. ............. 395/764 |
| 5,763,909 A | 6/1998 | Mead et al. ................. 257/291 |
| 5,764,224 A | 6/1998 | Lilja et al. .................. 345/179 |
| 5,787,197 A | 7/1998 | Beigi et al. ................. 382/187 |
| 5,854,625 A | 12/1998 | Frisch et al. ............... 345/173 |
| 5,861,583 A | 1/1999 | Schediwy et al. ....... 178/18.06 |
| 5,861,886 A | 1/1999 | Moran et al. ............... 345/358 |
| 5,864,242 A | 1/1999 | Allen et al. ................... 326/44 |
| 5,880,411 A * | 3/1999 | Gillespie et al. ......... 178/18.01 |
| 5,914,465 A | 6/1999 | Allen et al. .............. 178/18.06 |
| 5,942,733 A | 8/1999 | Allen et al. .............. 178/18.01 |
| 6,028,271 A | 2/2000 | Gillespie et al. ......... 178/18.01 |

FOREIGN PATENT DOCUMENTS

| | | | |
|---|---|---|---|
| EP | 0 574 213 | 12/1993 | ........... G06K/11/16 |
| EP | 0 589 498 | 3/1994 | ........... G06K/11/16 |
| EP | 0 609 021 | 8/1994 | ........... G06K/11/16 |
| FR | 2 662 528 | 11/1991 | ........... G06K/11/16 |
| GB | 2 139 762 | 11/1984 | ........... G06F/3/033 |
| GB | 2 266 038 | 10/1993 | ........... G06F/3/033 |
| GB | 2 288 665 | 10/1995 | ........... G06K/11/12 |
| JP | 60 205625 | 10/1985 | ............ G06F/3/03 |
| JP | 62 126429 | 6/1987 | ........... G06F/3/033 |
| JP | 63 073415 | 4/1988 | ........... G06F/3/033 |
| JP | 02 040614 | 2/1990 | ........... G02F/1/133 |
| JP | 04 015725 | 1/1992 | ........... G06F/3/033 |
| JP | 06 139022 | 5/1994 | ........... G06F/3/033 |
| JP | 07 072976 | 3/1995 | ........... G06F/3/033 |
| WO | 91/03039 | 3/1991 | ............ G09G/3/02 |
| WO | 91/05327 | 4/1992 | ............ G09G/3/02 |
| WO | 92/21091 | 11/1992 | ......... G06F/15/403 |
| WO | 96/07966 | 3/1996 | ........... G06F/3/033 |
| WO | 96/11435 | 4/1996 | ........... G06F/3/033 |
| WO | 96/18179 | 6/1996 | ........... G08C/21/00 |

OTHER PUBLICATIONS

"Pressure–Sensitive Icons", IBM Technical Disclosure Bulletin, Jun. 1990, vol. 33, No. 1B, pp. 277–278.

"Scroll Control Box", IBM Technical Disclosure Bulletin, Apr. 1993, vol. 36, No. 4, pp. 399–403.

"Three–Axis Touch–Sensitive Pad", IBM Technical Disclosure Bulletin, Jan. 1987, vol. 29, No. 8, pp. 3451–3453.

Tiburtius, "Transparente Folientastaturen", Feinwerktechnik & Messtechnik 97, No. 7, Munchen, DE, Jul. 1989, pp. 299–300.

Wilton, Microsoft Windoes 3 Developer's Workshop, 1991, pp. 229–230.

* cited by examiner

PUSH GESTURE

OBJECT POSITION DETECTOR WITH EDGE MOTION FEATURE AND GESTURE RECOGNITION

RELATED APPLICATIONS

This application is a divisional of patent application Ser. No. 08/899,317, filed Aug. 12, 1997, which is a continuation of patent application Ser. No. 08/623,483, filed Mar. 28, 1996, now U.S. Pat. No. 5,880,411, which is a continuation-in-part of application Ser. No. 08/320,158, filed Oct. 7, 1994, now U.S. Pat. No. 5,543,591, which is a continuation-in-part of application Ser. No. 08/300,387, filed Sep. 2, 1994, now U.S. Pat. No. 5,914,465, which is a continuation-in-part of application Ser. No. 08/115,743, filed Aug. 31, 1993, now U.S. Pat. No. 5,374,787, which is a continuation-in-part of application Ser. No. 07/895,934, Jun. 8, 1992 now abandoned.

BACKGROUND OF THE INVENTION

1. Field of the Invention

The present invention relates to object positioning sensing transducers and systems. More particularly, the present invention relates to object position recognition useful in applications such as cursor movement for computing devices and other applications, and especially to cursor movement with enhanced edge-motion and gesture-recognition features.

2. The Prior Art

Numerous devices are available or have been proposed for use as object position detectors for use in computer systems and other applications. The most familiar of such devices is the computer "mouse". While extremely popular as a position indicating device, a mouse has mechanical parts and requires a surface upon which to roll its position ball. Furthermore, a mouse usually needs to be moved over long distances for reasonable resolution. Finally, a mouse requires the user to lift a hand from the keyboard to make the cursor movement, thereby upsetting the prime purpose, which is usually typing on the computer.

Trackball devices are similar to mouse devices. A major difference, however is that, unlike a mouse device, a trackball device does not require a surface across which is must be rolled. Trackball devices are still expensive, have moving parts, and require a relatively heavy touch as do the mouse devices. They are also large in size and doe not fit well in a volume-sensitive application like a laptop computer. There are several available touch-sense technologies which may be employed for use as a position indicator. Resistive-membrane position sensors are known and used in several applications. However, they generally suffer from poor resolution, the sensor surface is exposed to the user and is thus subject to wear. In addition, resistive-membrane touch sensors are relatively expensive. A one-surface approach requires a user to be grounded to the sensor for reliable operation. This cannot be guaranteed in portable computers. An example of a one-surface approach is the UnMouse product by MicroTouch, of Wilmington, MA A two-surface approach has poorer resolution and potentially will wear out very quickly in time.

Resistive tablets are taught by U.S. Pat. No. 4,680,430 to Yoshikawa, U.S. Pat. No. 3,497,617 to Ellis and many others. The drawback of all such approaches is the high power consumption and the high cost of the resistive membrane employed.

Surface Acoustic Wave (SAW) devices have potential use as position indicators. However, this sensor technology is expensive and is not sensitive to light touch. In addition, SAW devices are sensitive to residue buildup on the touch surfaces and generally have poor resolution.

Strain gauge or pressure plate approaches are an interesting position sensing technology, but suffer from several drawbacks. This approach may employ piezo-electric transducers. One drawback is that the piezo phenomena is an AC phenomena and may be sensitive to the user's rate of movement. In addition, strain gauge or pressure plate approaches are somewhat expensive because special sensors are required.

Optical approaches are also possible but are somewhat limited for several reasons. All would require light generation which will require external components and increase cost and power drain. For example, a "finger-breaking" infra-red matrix position detector consumes high power and suffers from relatively poor resolution.

There have been numerous attempts to provide a device for sensing the position of a thumb or other finger for use as a pointing device to replace a mouse or trackball. Desirable attributes of such a device are low power, low profile, high resolution, low cost, fast response, and ability to operate reliably when the finger carries electrical noise, or when the touch surface is contaminated with dirt or moisture.

Because of the drawbacks of resistive devices, many attempts have been made to provide pointing capability based on capacitively sensing the position of the finger. U.S. Pat. No. 3,921,166 to Volpe teaches a capacitive matrix in which the finger changes the transcapacitance between row and column electrodes. U.S. Pat. No. 4,103,252 to Bobick employs four oscillating signals to interpolate x and y positions between four capacitive electrodes. U.S. Pat. No. 4,455,452 to Schuyler teaches a capacitive tablet wherein the finger attenuates the capacitive coupling between electrodes.

U.S. Pat. No. 4,550,221 to Mabusth teaches a capacitive tablet wherein the effective capacitance to "virtual ground" is measured by an oscillating signal. Each row or column is polled sequentially, and a rudimentary form of interpolation is applied to resolve the position between two rows or columns. An attempt is made to address to problem of electrical interference by averaging over many cycles of the oscillating waveform. The problem of contamination is addressed by sensing when no finger was present and applying a periodic calibration during such no-finger-present periods. U.S. Pat. No. 4,639,720 to Rympalski teaches a tablet for sensing the position of a stylus. The stylus alters the transcapacitance coupling between row and column electrodes, which are scanned sequentially. U.S. Pat. No. 4,736,191 to Matzke teaches a radial electrode arrangement under the space bar of a keyboard, to be activated by touching with a thumb. This patent teaches the use of total touch capacitance, as an indication of the touch pressure, to control the velocity of cursor motion. Pulsed sequential polling is employed to address the effects of electrical interference.

U.S. Pat. Nos. 4,686,332 and 5,149,919 to Greanias, teaches a stylus and finger detection system meant to be mounted on a CRT. As a finger detection system, its X/Y sensor matrix is used to locate the two matrix wires carrying the maximum signal. With a coding scheme these two wires uniquely determine the location of the finger position to the resolution of the wire stepping. For stylus detection, Greanias first coarsely locates it, then develops a virtual dipole by driving all lines on one side of the object in one direction and all lines on the opposite side in the opposite direction.

This is done three times with different dipole phases and signal polarities. Assuming a predetermined matrix response to the object, the three measurements present a set of simultaneous equations that can be solved for position.

U.S. Pat. No. 4,733,222 to Evans is the first to teach a capacitance touch measurement system that interpolates to a high degree. Evans teaches a three terminal measurement system that uses a drive, sense and electrode signal set (3 signals) in its matrix, and bases the measurement on the attenuation effect of a finger on the electrode node signal (uses a capacitive divider phenomena). Evans sequentially scans through each drive set to measure the capacitance. From the three largest responses and interpolation routine is applied to determine finger position. Evans also teaches a zeroing technique that allows "no-finger" levels to be canceled out as part of the measurement.

U.S. Pat. No. 5,016,008 to Gruaz describes a touch sensitive pad that also uses interpolation. Gruaz uses a drive and sense signal set (2 signals) in the touch matrix and like Evans relies on the attenuation effect of a finger to modulate the drive signal. The touch matrix is sequentially scanned to read the response of each matrix line. An interpolation program then selects the two largest adjacent signals in both dimensions to determiner the finger location, and ratiometrically determines the effective position from those 4 numbers.

Gerpheide, PCT application US90/04584, publication No. WO91/03039, U.S. Pat. No. 5,305,017 applies to a touch pad system a variation of the virtual dipole approach of Greanias. Gerpheide teaches the application of an oscillating potential of a given frequency and phase to all electrodes on one side of the virtual dipole, and an oscillating potential of the same frequency and opposite phase to those on the other side. Electronic circuits develop a "balance signal" which is zero when no finger is present, and which has one polarity if a finger is on one side of the center of the virtual dipole, and the opposite polarity if the finger is on the opposite side. To acquire the position of the finger initially, the virtual dipole is scanned sequentially across the tablet. Once the finger is located, it is "tracked" by moving the virtual dipole toward the finger once the finger has moved more than one row or column.

Because the virtual dipole method operates by generating a balance signal that is zero when the capacitance does not vary with distance, it only senses the perimeter of the finger contact area, rather than the entire contact area. Because the method relies on synchronous detection of the exciting signal, it must average for long periods to reject electrical interference, and hence it is slow. The averaging time required by this method together with the necessity to search sequentially for a new finger contact once a previous contact is lost, makes this method, like those before it, fall short of the requirements for a fast pointing device that is not affected by electrical interference.

It should also be noted that all previous touch pad inventions that used interpolation placed rigorous design requirements on their sensing pad. Greanias and Evans use a complicated and expensive drive, sense and electrode line scheme to develop their signal. Gruaz and Gerpheide use a two signal drive and sense set. In the present invention the driving and sensing is done on the same line. This allows the row and column sections to by symmetric and equivalent. This in turn allows independent calibration of all signal paths, which makes board layout simpler and less constraining, and allows for more unique sensor topologies.

The shortcomings of the inventions and techniques described in the prior art can also be traced to the use of only one set of driving and sensing electronics, which was multiplexed sequentially over the electrodes in the tablet. This arrangement was cost effective in the days of discrete components, and avoided offset and scale differences among circuits.

The sequential scanning approach of previous systems also made them more susceptible to noise. Noise levels could change between successive measurements, thus changing the measured signal and the assumptions used in interpolation routines.

Finally, all previous approaches assumed a particular signal response for finger position versus matrix position. Because the transfer curve is very sensitive to many parameters and is not a smooth linear curve as Greanias and Gerpheide assume, such approaches are limited in the amount of interpolation they can perform.

In prior co-pending application Ser. No. 08/115,743, filed Aug. 31, 1993, now U.S. Pat. No. 5,734,787, a two-dimensional capacitive sensing system equipped with a separate set of drive/sense electronics for each row and for each column of a capacitive tablet is disclosed. All row electrodes are sensed simultaneously, and all column electrodes are sensed simultaneously. The sensed signals are processed by analog circuitry.

Of the touchpad devices currently available, only the Alps/Cirque GlidePoint includes gesture recognition. The GlidePoint supports basic tap, double-tap, and drag gestures to simulate actions on a primary mouse button. It now also supports multiple-finger gestures and there are gestures for simulating secondary button clicks. No information is known about the implementation methods employed in the GlidePoint. However, the GlidePoint is known to have difficulty with double-taps, one of the problems addressed by the present invention. The GlidePoint exhibits a hesitation on each finger-motion stroke which may be an attempt to stabilize the cursor during tap gestures. Also, the Glide-Point must rely on physical switches or extremely high gain or acceleration in order to allow drags over long distances.

One touchpad product, the UnMouse, mounts a switch underneath its resistive sensor so that the user simply presses down on the pad to activate the button. Aside from requiring fragile and complex mechanical mounting, this device also is reported to be very tiring to the user.

Graphics tablets operated by a pressure sensitive stylus instead of a finger are well known in the art. These devices typically use a mechanism like the "push" gesture of the present invention to simulate actuator switches. No other gestures of the sort described herein have been seen in stylus operated tablets.

It is thus an object of the present invention to provide a two-dimensional capacitive sensing system equipped with a separate set of drive/sense electronics for each row and for each column of a capacitive tablet, wherein all row electrodes are sensed simultaneously, and all column electrodes are sensed simultaneously.

It is a further object of the present invention to provide an electronic system that is sensitive to the entire area of contact of a finger or other conductive object with a capacitive tablet, and to provide as output the coordinates of some measure of the center of this contact area while remaining insensitive to the characteristic profile of the object being detected.

It is a further object of the present invention to provide an electronic system that provides as output some measure of area of contact of a finger of other conductive object with a capacitive tablet.

Yet another object of the present invention is to provide a two-dimensional capacitive sensing system equipped with a separate set of drive/sense electronics for each row and for each column of a capacitive tablet, wherein all row electrodes are sensed simultaneously, and all column electrodes are sensed simultaneously and wherein the information defining the location of a finger or other conductive object is processed in digital form.

It is a further object of the present invention to provide a two-dimensional capacitive sensing system wherein all row electrodes are sensed simultaneously, and all column electrodes are sensed simultaneously and wherein the location of a finger or other conductive object within a peripheral region of a sensing plane can optionally cause cursor "edge motion" on a display screen allowing control of large cursor excursions from a small sensing plane with a single gesture.

A further object of the invention is to provide for the recognition of a drag extension gesture made by a finger or other object on a touch-sensor pad in a manner which permits control of large cursor excursions from a small sensing plane with a single gesture.

A further object of the invention is to provide for the recognition of gestures made by a finger or other object on a touch-sensor pad in a manner which compensates for unintended motion of the finger or other object during expression of the gesture.

Yet another object of the present invention is to provide for the recognition of multiple-finger gestures and for simulating secondary button clicks.

It is a further object of the present invention is to provide for the recognition of the difference between gestures made by novice and expert users.

BRIEF DESCRIPTION OF THE INVENTION

With the advent of very high levels of integration, it has become possible to integrate many channels of driving/sensing electronics into one integrated circuit, along with the control logic for operating them, and the interface electronics to allow the pointing device to communicate directly with a host microprocessor. The present invention uses adaptive analog techniques to overcome offset and scale differences between channels, and can thus sense either transcapacitance or self-capacitance of all tablet rows or columns in parallel. This parallel-sensing capability, made possible by providing one set of electronics per row or column, allows the sensing cycle to be extremely short, thus allowing fast response while still maintaining immunity to very high levels of electrical interference.

The present invention comprises a position-sensing technology particularly useful for applications where finger position information is needed, such as in computer "mouse" or trackball environments. However the position-sensing technology of the present invention has much more general application than a computer mouse, because its sensor can detect and report if one or more points are being touched. In addition, the detector can sense the pressure of the touch.

According to a preferred embodiment of the present invention, referred to herein as a "finger pointer" embodiment, a position sensing system includes a position sensing transducer comprising a touch-sensitive surface disposed on a substrate, such as a printed circuit board, including a matrix of conductive lines. A first set of conductive lines runs in a first direction and is insulated from a second set of conductive lines running in a second direction generally perpendicular to the first direction. An insulating layer is disposed over the first and second sets of conductive lines. The insulating layer is thin enough to promote significant capacitive coupling between a finger placed on its surface and the first and second sets of conductive lines.

Sensing electronics respond to the proximity of a finger, conductive object, or an object of high dielectric constant (i.e. greater than about 5) to translate the capacitance changes of the conductors caused by object proximity into digital information which is processed to derive position and touch pressure information. Its output is a simple X, Y and pressure value of the one object on its surface. In all descriptions herein, fingers are to be considered interchangeable with conductive objects and objects of high dielectric constant.

Different prior art pad scan techniques have different advantages in different environments. Parallel drive/sense techniques according to the present invention allow input samples to be taken simultaneously, thus all channels are affected by the same phase of an interfering electrical signal, greatly simplifying the signal processing and noise filtering.

There are two drive/sense methods employed in the touch sensing technology of the present invention. According to a first and presently preferred embodiment of the invention, the voltages on all of the X lines of the sensor matrix are simultaneously moved, while the voltages of the Y lines are held at a constant voltage, with the complete set of sampled points simultaneously giving a profile of the finger in the X dimension. Next, the voltages on all of the Y lines are held at a constant voltage to obtain a complete set of sampled points simultaneously giving a profile of the finger in the other dimension.

According to a second drive/sense method, the voltages on all of the X lines of the sensor matrix are simultaneously moved in a positive direction, while the voltages of the Y lines are moved in a negative direction. Next, the voltages on all of the X lines of the sensor matrix are simultaneously moved in a negative direction, while the voltages of the Y lines are moved in a positive direction. This technique doubles the effect of any transcapacitance between the two dimensions, or conversely, halves the effect of any parasitic capacitance to the ground. In both methods, the capacitive information from the sensing process provides a profile of the proximity of the finger to the sensor in each dimension.

As presently preferred, both embodiments then take these profiles and derive a digital value representing the centroid for X and Y position and derive a second digital value for the Z pressure information. The digital information may be directly used by a host computer. Analog processing of the capacitive information may also be used according to the present invention.

The position sensor of these embodiments can only report the position of one object on its sensor surface. If more than one object is present, the position sensor of this embodiment computes the centroid position of the combined set of objects. However, unlike prior art, because the entire pad is being profiled, enough information is available to discern simple multi-finger gestures to allow for a more powerful user interface.

According to another aspect of the present invention, several power reduction techniques which can shut down the circuit between measurements have been integrated into the system. This is possible because the parallel measurement technique according to the present invention is so much faster than prior art techniques.

According to a further aspect of the invention, a variety of noise reduction techniques are integrated into the system.

According to yet another aspect of the present invention, a capacitance measurement technique which is easier to calibrate and implement is employed.

According to two aspects of the present invention, when the presence of a finger or other conductive object is sensed within a defined peripheral region of the sensing plane, the control of cursor motion may be changed to provide "edge motion" to allow control of large cursor excursions on a display screen from a single gesture executed on a small sensing plane.

According to another aspect of the invention a drag extension gesture is recognized by the host which permits the control of large cursor excursions on a display screen from a single gesture executed on a small sensing plane.

According to a further object of the present invention, a number of gestures made by a finger or other object on the touch-sensor pad are recognized and communicated to a host. Recognition of whether certain gestures are made by novice or expert users is also provided. Compensation for unintended motion of the finger or other object during expression of the gestures is provided.

BRIEF DESCRIPTION OF THE DRAWINGS

FIG. 4b is an illustrative schematic diagram of the charge integrator circuit of FIG. 4a.

DETAILED DESCRIPTION OF A PREFERRED EMBODIMENT

This application is a divisional of co-pending application Ser. No. 08/899,317, filed Aug. 12, 1997, which is a continuation of co-pending application Ser. No. 08/623,483, filed Mar. 28, 1996, which is a continuation-in-part of co-pending application Ser. No. 08/320,158, filed Oct. 7, 1994, which is a continuation-in-part of co-pending application Ser. No. 08/300,387, filed Sep. 2, 1994, which is a continuation-in-part of co-pending application Ser. No. 08/115,743, filed Aug. 31, 1993, now U.S. Pat. No. 5,374,787, which is a continuation-in-part of co-pending application Ser. No. 07/895,934, filed June 8, 1992. The present invention continues the approach disclosed in the parent applications and provides more unique features not previously available. These improvements provide a more easily integrated solution, increased sensitivity, and greater noise rejection, increased data acquisition rate and decreased power consumption. The present invention allows for continuous self calibration to subtract out the effects of environmental changes and allows for enhanced cursor control from edge motion on a sensing plane.

Those of ordinary skill in the art will realize that the following description of the present invention is illustrative only and not in any way limiting. Other embodiments of the invention will readily suggest themselves to such skilled persons.

The present invention brings together in combination a number of unique features which allow for new applications not before possible. Because the object position sensor of the present invention has very low power requirements, it is beneficial for use in battery operated of low power applications such as lap top or portable computers. It is also a very low cost solution, has no moving parts (and is therefore virtually maintenance free), and uses the existing printed circuit board traces for sensors. The sensing technology of the present invention can by integrated into a computer motherboard to even further lower its cost in computer applications. Similarly, in other applications the sensor can be part of an already existent circuit board.

Because of its small size and low profile, the sensor technology of the present invention is useful in lop top or portable applications where volume is an important consideration. The sensor technology of the present invention requires circuit board space for only a single sensor interface chip that can interface directly to a microprocessor, plus the area needed on the printed circuit board for sensing.

Figure 1:
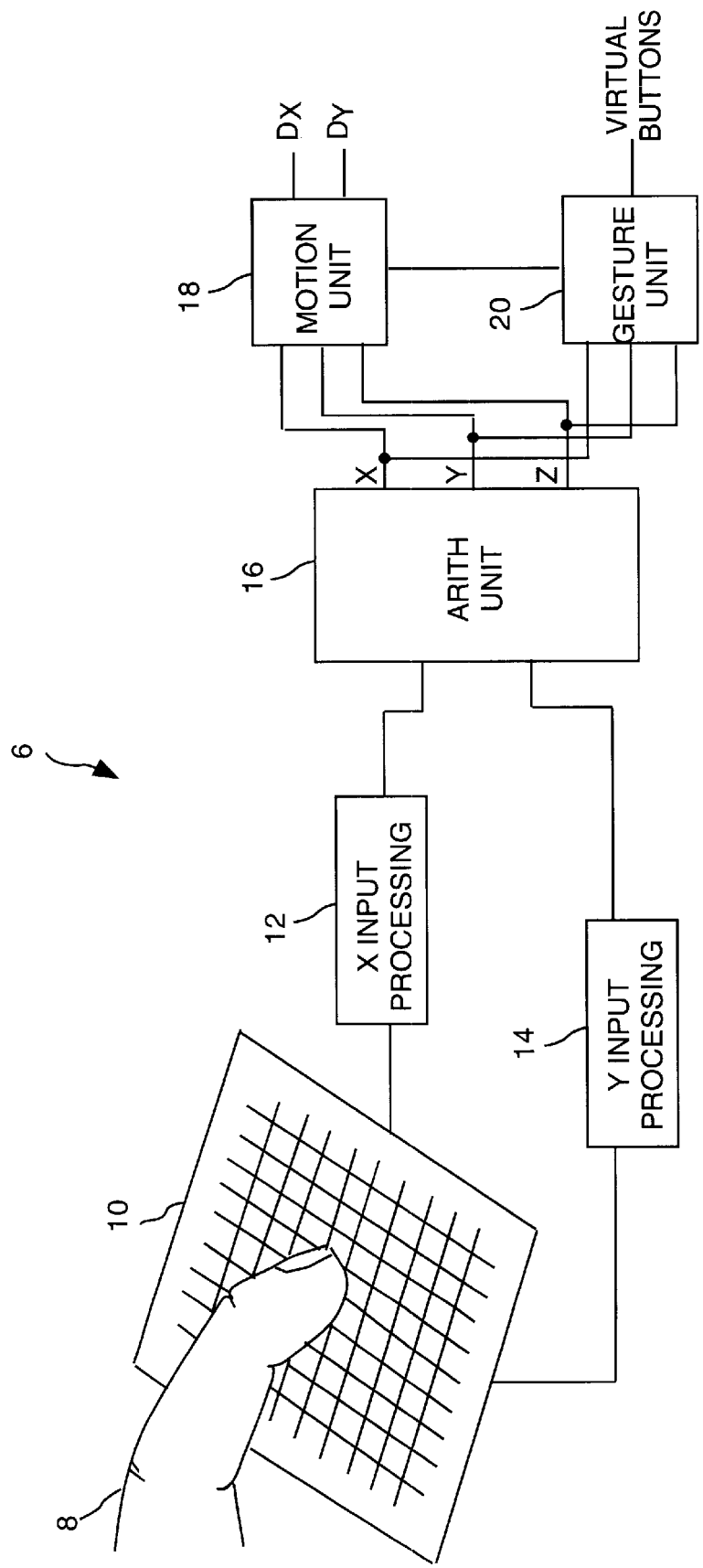
FIG. 1 is an overall block diagram of the capacitive position sensing system of the present invention.
Figure 2A:
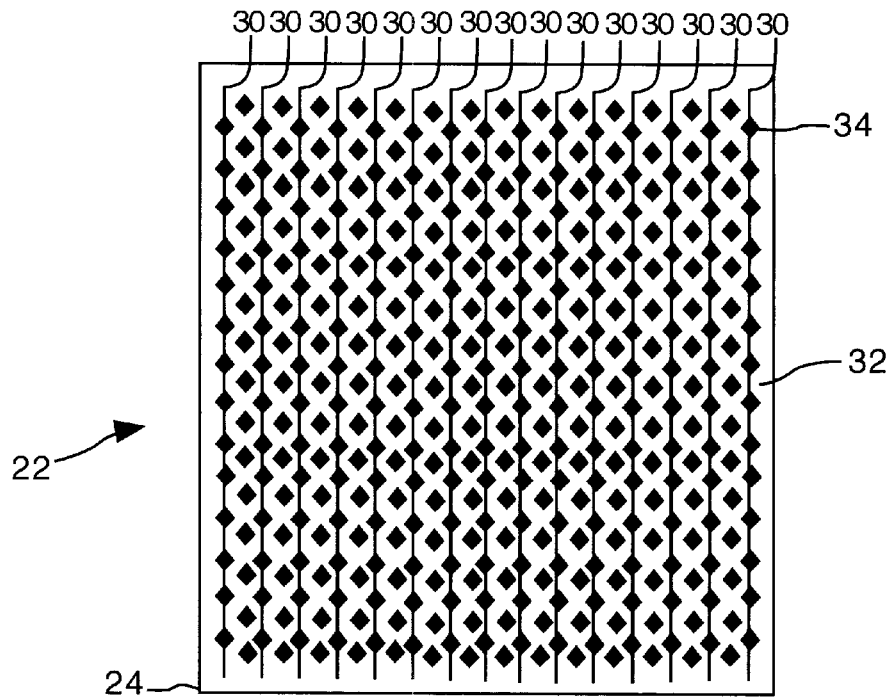
FIG. 2a is a top view of an object position sensor transducer according to a presently preferred embodiment of the invention showing the object position sensor surface layer including a top conductive trace layer and conductive pads connected to a bottom trace layer.
Figure 2B:
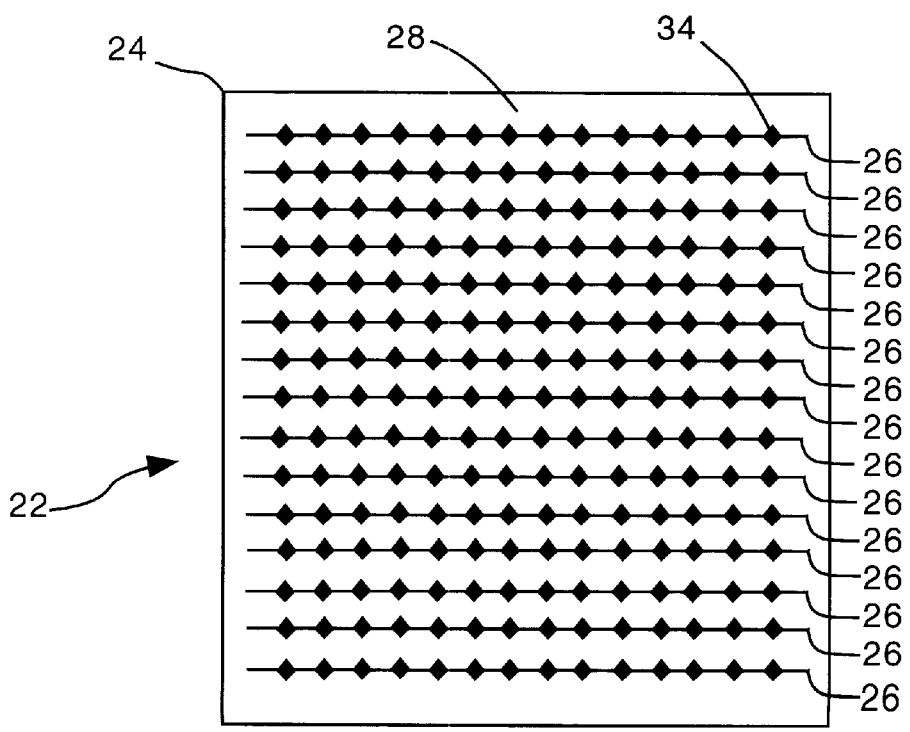
FIG. 2b is a bottom view of the object position sensor transducer of FIG. 2a showing the bottom conductive trace layer.
Figure 2C:
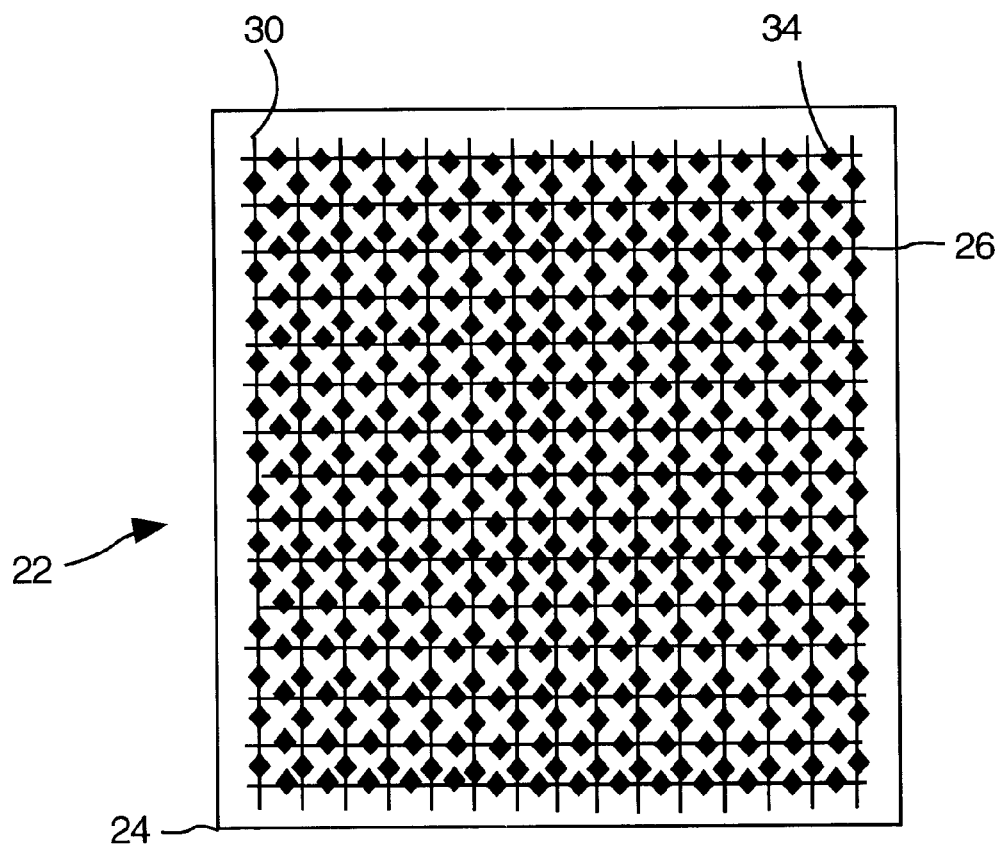
FIG. 2c is a composite view of the object position sensor transducer of FIGS. 2a and 2b showing both the top and bottom conductive trace layers.
Figure 2D:
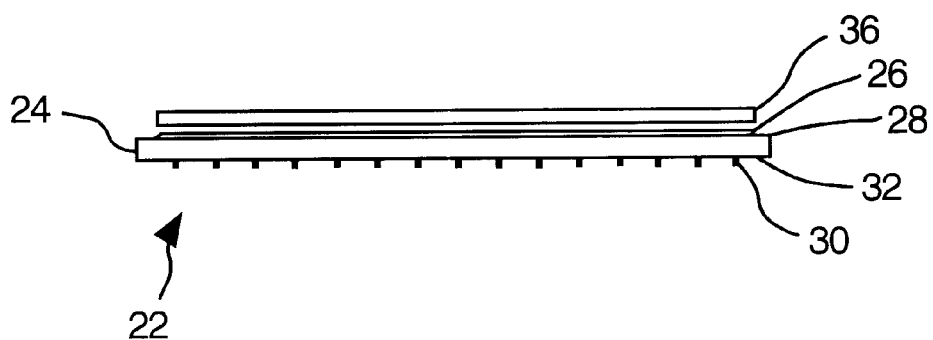
FIG. 2d is a cross-sectional view of the object position sensor transducer of FIGS. 2a–2c.

Referring first to FIG. 1, a simplified block diagram of the capacitive position sensing system 6 of the present invention is presented. Capacitive position sensing system 6 can accurately determine the position of a finger 8 or other conductive object proximate to or touching a sensing plane 10. The capacitance of a plurality of conductive lines running in a first direction (e.g., "X") is sensed by X input processing circuitry 12 and the capacitance of a plurality of conductive lines running in a second direction (e.g., "Y") is sensed by Y input processing circuitry 14. The sensed capacitance values are digitized in both X input processing circuitry 12 and Y input processing circuitry 14. The outputs of X input processing circuitry 12 and Y input processing circuitry 14 are presented to arithmetic unit 16, which uses the digital information to derive digital information representing the position and pressure of the finger 8 or other conductive object relative to the sensing plane 10.

The X, Y, and Z outputs of arithmetic unit 16 are directed to motion unit 18 which provides the cursor motion direction signals to the host computer. Those of ordinary skill in the art will recognize, that as used herein, "host" may mean a stand-alone computer such as an IBM or compatible PC or computer made by Apple Computers, hand-held control units, personal digital assistants, remote communication devices, or the like, or to any other devices or system which can take as input the output of a touch tablet.

The X, Y, and Z outputs of arithmetic unit 16 are also directed to gesture unit 20, which is used to recognize certain finger gestures performed by a user on sensing plane 10. In addition, gesture unit 20 may produce a signal to motion unit 18 to enable the edge motion feature of the present invention based on the state of gesture processing.

The sensor material can be anything that allows creation of a conductive X/Y matrix of pads. This includes not only standard PC boards, but also includes but is not limited to flexible PC boards, conductive elastomer materials, silk-screened conductive lines, and piezo electric Kynar plastic materials. This renders it useful as well in any portable equipment application or in human interface where the sensor needs to be molded to fit within the hand.

The sensor can be conformed to any three dimensional surface. Copper can be plated in two layers on most any surface contour producing the sensor. This will allow the sensor to be adapted to the best ergonomic form needed for any particular application. This coupled with the "light-touch" feature will make it effortless to use in many applications. The sensor can also be used in an indirect manner, i.e it can have an insulating foam material covered by a conductive layer over the touch sensing surface and be used to detect any object (not just conductive) that presses against its surface.

Small sensor areas are practical, i.e., a presently conceived embodiment takes about 1.5"×1.5" of area, however those or ordinary skill in the art will recognize that the area is scaleable for different applications. The matrix area is scalable by either varying the matrix trace spacing or by varying the number or traces. Large sensor areas are practical where more information is needed.

Besides simple X and Y position information, the sensor technology of the present invention also provides finger pressure information. This additional dimension of information may be used by programs to control special features such as "brush-width modes in Paint programs, special menu accesses, etc., allowing provision of a more natural sensory input to computers. It has also been found useful for implementing "mouse click and drag" modes and for simple input gestures.

The user will not even have to touch the surface to generate the minimum reaction. This feature can greatly minimize user strain and allow for more flexible use.

The sense system of the present invention depends on a transducer device capable of providing position and pressure information regarding the object contacting the transducer. Referring nor to FIGS. 2a–2d, top, bottom, composite, and cross-sectional views, respectively, are shown of a presently-preferred sensing plane comprising a touch sensor array 22 for use in the present invention. Since capacitance is exploited by this embodiment of the present invention, the surface of touch sensor array 22 is designed to maximize the capacitive coupling to a finger or other conductive object.

A presently preferred touch sensor array 22 according to the present invention comprises a substrate 24 including a first set of conductive traces 26 disposed on a top surface 28 thereof and run in a first direction to comprise row positions of the touch sensor array 22. A second set of conductive traces 30 are disposed on a bottom surface 32 thereof and run in a second direction preferably orthogonal to the first direction to form the column positions of the touch sensor array 22. The first and second set of conductive traces 26 and 30 are alternately in contact with periodic sense pads 34 comprising enlarged areas, shown as diamonds in FIGS. 2a–2c, any shape, such as circles, which allows them to be closely packed is equivalent for purposes of this invention. As an arbitrary convention herein, the first set of conductive traces 26 will be referred to as being oriented in the "X" or "row" direction and may be referred to herein sometimes as "X lines" and the second set of conductive traces 30 will be referred to as being oriented in the "Y" or "column" direction and may be referred to herein sometimes as "Y lines".

The number and spacing of these sense pads 34 depends upon the resolution desired. For example, in an actual embodiment constructed according to the principles of the present invention, a 0.10 inch center-to-center diamond-shaped pattern of sense pads 34 disposed along a matrix of 15 rows and 15 columns of conductors is employed. Every other sense pad 34 in each direction in the pad pattern is connected to first and second sets of conductive traces 26 and 30 on the top and bottom surfaces 28 and 32, respectively of substrate 24.

Substrate 24 may be a printed circuit board, a flexible circuit board or any of a number of available circuit interconnect technology structures. Its thickness is unimportant as long as contact may be made therethrough from the second set of conductive traces 30 to their sense pads 34 on the top surface 28. The printed circuit board comprising substrate 24 can be constructed using standard industry techniques. Board thickness is not important. Connections form the sense pads 34 to the second set of conductive traces 30 may be made employing standard plated-through hole techniques well known in the printed circuit board art.

In an alternate embodiment of the present invention, the substrate 24 may have a thickness on the order of 0.005 to 0.010 inches. Then the sense pads 34 on the top surface 28 and the plated through holes that connect to the second set of conductive traces 30, can be omitted, further reducing the cost of the system.

An insulating layer 36 is disposed over the sense pads 34 on top surface 28 to insulate a human finger or other object therefrom. Insulating layer 36 is preferably a thin layer (i.e., approximately 5 mils) to keep capacitive coupling large and may comprise a material, such as mylar, chosen for its protective and ergonomic characteristics. The term "significant capacitive coupling" as used herein shall mean capacitive coupling having a magnitude greater than about 0.5 pF.

There are two different capacitive effects taking place when a finger approaches the touch sensor array 22. The first capacitive effect is trans-capacitance, or coupling between sense pads 34, and the second capacitive effect is self-capacitance, or coupling to virtual ground. Sensing circuitry is coupled to the touch sensor array 22 of the present invention and responds to changes in either or both of these capacitances. This is important because the relative sized of the two capacitances change greatly depending on the user environment. The ability of the present invention to detect changes in both self capacitance and trans-capacitance results in a very versatile system having a wide range of applications.

According to the preferred embodiment of the invention, a position sensor system including touch sensor array 22 and associated position detection circuitry will detect a finger position on a matrix of printed circuit board traces via the capacitive effect of finger proximity to the touch sensor array 22. The position sensor system will report the X, Y position of a finger placed near the touch sensor array 22 to much finer resolution than the spacing between the first and second sets of conductive traces 26 and 30. The position sensor according to this embodiment of the invention will also report a z value proportional to the outline of that finger and hence indicative of the pressure with which the finger contacts the surface of insulating layer 36 over the touch sensor array 22.

According to the presently preferred embodiment of the invention, a very sensitive, light-touch detector circuit may be provided using adaptive analog and digital 5 VLSI techniques. The circuit of the present invention is very robust and calibrates out process and systematic errors. The detector circuit of the present invention will process the capacitive input information and provide digital information which may be presented directly to a microprocessor.

According to this embodiment of the invention, sensing circuitry is contained on a single sensor processor integrated circuit chip. The sensor processor chip can have any number of X and Y "matrix" inputs. The number of X and Y inputs does not have to be equal. The integrated circuit has a digital bus as output. In the illustrative example disclosed in FIGS. 2a–2d herein, the touch sensor array 22 has 15 traces in both the X and Y directions. The sensor processor chip thus has 15 X inputs and 15 Y inputs. An actual embodiment constructed according to the principles of the present invention employed 18 traces in the X direction and 24 traces in the Y direction. Those of ordinary skill in the art will recognize that the size of the touch sensor array 22 which may be employed in the present invention is arbitrary and will be dictated largely by design choice.

The X and Y matrix nodes are driven and sensed in parallel, with the capacitive information from each line indicating how close a finger is to that node. The scanned information provides a profile of the finger proximity in each dimension. According to this aspect of the present invention, the profile centroid is derived in both the X and Y directions and is the position in that dimension. The profile curve of proximity is also integrated to provide the Z information.

There are two drive and sense methods employed in the touch sensing technology of the present invention. According to a first and presently preferred embodiment of the invention, the voltages on all of the X lines of the touch sensor array 22 are simultaneously moved, while the voltages of the Y lines are held at a constant voltage. Next, the voltages on all of the Y lines of the touch sensor array 22 are simultaneously moved, while the voltages of the X lines are held at a constant voltage. This scanning method accentuates the measurement of capacitance to virtual ground provided by the finger. Those of ordinary skill in the art will recognize that the order of these two steps is somewhat arbitrary and may be reversed.

According to a second drive/sense method, the voltages on all of the X lines of the touch sensor array 22 are simultaneously moved in a positive direction, while the voltages of the Y lines are moved in a negative direction. Next, the voltages on all of the X lines of the touch sensor array 22 are simultaneously moved in a negative direction, while the voltages of the Y lines are moved in a positive direction. This second drive/sense method accentuates transcapacitance and de-emphasizes virtual ground capacitance. As with the first drive/sense method, those of ordinary skill in the art will recognize that the order of these two steps is somewhat arbitrary and may be reversed.

Figure 3:
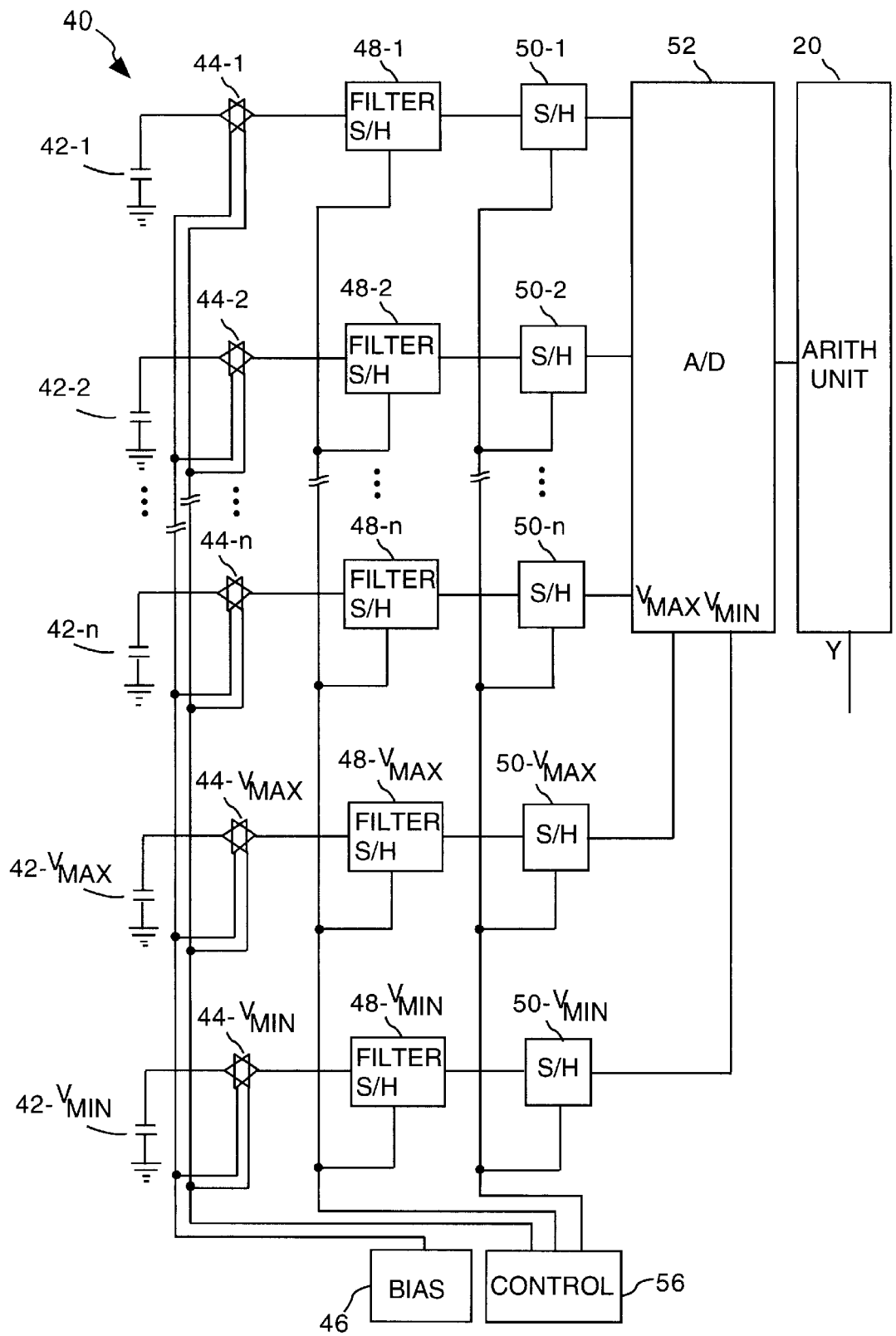
FIG. 3 is a block diagram of sensor decoding electronics which may be used with the sensor transducer in accordance with a preferred embodiment of the present invention.

Referring now to FIG. 3, a block diagram of the presently preferred sensing circuitry 40 for use according to the present invention is presented. This block diagram, and the accompanying disclosure, relates to the sensing circuitry 40 in one dimension (X) only, and includes the X input processing circuitry 12 of FIG. 1. Those of ordinary skill in the art will appreciate that an identical circuit would be used for sensing the opposite (Y) dimension and would include the Y input processing circuitry 14 of FIG. 1. Such skilled persons will further note that the two dimensions do not need to be orthogonal to one another. For example, they can be radial or of any other nature to match the contour of the touch sensor array 22 and other needs of the system. Those of ordinary skill in the art will recognize that the technology disclosed herein could be applied as well to a one-dimensional case where only one set of conductive traces is used.

The capacitance at each touch sensor array 22 node is represented by equivalent capacitors 42-1 through 42-n. The capacitance of capacitors 42-1 through 42-n comprises the capacitance of the matrix conductors and has a characteristic background value when no object (e.g., a finger) is proximate to the sensing plane 10 of the touch sensor array 22. As an object approaches the sensing plane 10 the capacitance of capacitors 42-1 through 42-n increases in proportion to the size and proximity of the object.

According to the present invention, the capacitance at each touch sensor array 22 node is measured simultaneously using charge integrator circuits 44-1 through 44-n. Charge-integrator circuits 44-1 through 44-n serve to inject charge into the capacitances 42-1 through 42-n, respectively, and to develop an output voltage proportional to the capacitance sensed on the corresponding X matrix line. Thus charge-integrator circuits 44-1 through 44-n are shown as bidirectional amplifier symbols. Each charge-integrator circuit 44-1 through 44-n is supplied with an operating bias voltage by bias-voltage generating circuit 46.

As used herein, the phrase "proportional to the capacitance" means that the voltage signal generated is a monotonic function of the sensed capacitance. In the embodiment described herein, the voltage is directly and linearly proportional to the capacitance sensed. Those of ordinary skill in the art will recognize that other monotonic functions, including but not limited to inverse proportionality, and non-linear proportionality such as logarithmic or exponential functions, could be employed in the present invention without departing from the principles disclosed herein. In addition current-sensing as well as voltage-sensing techniques could be employed.

According to a presently preferred drive/sense method used in the present invention, the capacitance measurements are performed simultaneously across all inputs in one dimension to overcome a problem which is inherent in all prior art approaches that scan individual inputs. The problem with the prior-art approach is that it is sensitive to high frequency and large amplitude noise (large dv/dt noise) that is coupled to the circuit via the touching object. Such noise may distort the finger profile because of noise appearing in a later scan cycle but not an earlier one, due to a change in the noise level.

The present invention overcomes this problem by "taking a snapshot" of all inputs simultaneously in X and then Y directions (or visa versa). Because the injected noise is proportional to the finger signal strength across all inputs, it is therefore symmetric around the finger centroid. Because it is symmetric around the finger centroid it does not affect the finger position. Additionally, the charge amplifier performs a, differential measuring function to further reject common-mode noise.

Because of the nature of the charge integrator circuits 44-1 through 44-n, their outputs will be changing over time and will have the desired voltage output for only a short time. As presently preferred, filter circuits 48-1 through 48-n are implemented as sample and hold switched capacitor filters.

The desired voltage is captured by the filter circuits 48-1 through 48-n. As controlled by control circuitry 56, the filter circuits 48-1 through 48-n will filter out any high frequency noise from the sensed signal. This is accomplished by choosing the capacitor for the filter to be much larger than the output capacitance of charge integrator circuits 44-1 through 44-n. In addition, those of ordinary skill in the art will recognize that the switched capacitor filter circuits 48-1 through 48-n will capture the desired voltages and store them.

According to the present invention, the capacitance information obtained in voltage form from the capacitance measurements is digitized and processed in digital format. Accordingly, the voltages stored by filter circuits 48-1 through 48-n are stored in sample/hold circuits 50-1 through 50-n so that the remainder of the circuitry processes input data taken at the same time. Sample/hold circuits 50-1 through 50-n may be configured as conventional sample/hold circuits as is well known in the art.

The sampled analog voltages at the outputs of sample/hold circuits 50-1 through 50-n are digitized by analog-to-digital (A/D) converters 52. As presently preferred, A/D converters 52 resolve the input voltage to a 10-bit wide digital signal (a resolution of one part in 1,024), although those of ordinary skill in the art will realize that other resolutions may be employed. A/D converters 52 may be conventional successive approximation type converters as is known in the art.

Given the charge integrator circuits 44 employed in the present invention, the background level (no object present) of the charge integrator circuits 44 outputs will be about 1 volt. The $\Delta V$ resulting from the presence of a finger or other object will typically be about 0.4 volt. The voltage range of the A/D converters 52 should therefore be in the range of between about 1–2 volts.

An important consideration is the minimum and maximum voltage reference points for the A/D converters 52 ($V_{min}$ and $V_{max}$). It has been found that noise will cause position jitter if these reference voltages are fixed points. A solution to this problem which is employed in the present invention is to dynamically generate the $V_{min}$ and $V_{max}$ reference voltages from reference capacitances 42-Vmin and 42-Vmax, sensed by charge integrator circuits 44-Vmin and 44-Vmax and processed by filter circuits 48 Vmin and 48-Vmax and stored in sample/hold circuits 50-Vmin and 50-Vmax. In this manner, any common mode noise present when the signals are sampled from the touch sensor array 22 will also be present in the $V_{min}$ and $V_{max}$ reference voltage values and will tend to cancel. Those of ordinary skill in the art will realize that reference capacitances 42-Vmin and 42-Vmax may either be discrete capacitors or extra traces in the touch sensor array 22.

According to the present invention, the $V_{min}$ reference voltage is generated from a capacitor having a value equal to the lowest capacitance expected to be encountered in the touch sensor array 22 with no object present (about 12 pF assuming a 2 inch square sensor array). The $V_{max}$ reference voltage is generated from a capacitor having a value equal to the largest capacitance expected to be encountered in the touch sensor array 22 with an object present (about 16 pF assuming a 2 inch square sensor array).

The outputs of A/D converters 52 provide inputs to arithmetic unit 16. As will be more fully disclosed with reference to FIG. 8, the function of arithmetic unit 16 is to compute the weighted average of the signals on the individual sense lines in both the X and Y directions in the touch sensor array 22. Thus, arithmetic unit 16 is shared by the X input processing circuitry 12 and the Y input processing circuitry 14 as shown in FIG. 1.

Control circuitry 56 of FIG. 3 orchestrates the operation of the remainder of the circuitry. Because the system is discretely sampled and pipelined in its operation, control circuitry 56 is present to manage the signal flow. The functions performed by control circuitry 56 may be conventionally developed via what is commonly known in the art as a state machine or microcontroller.

Figure 4A:
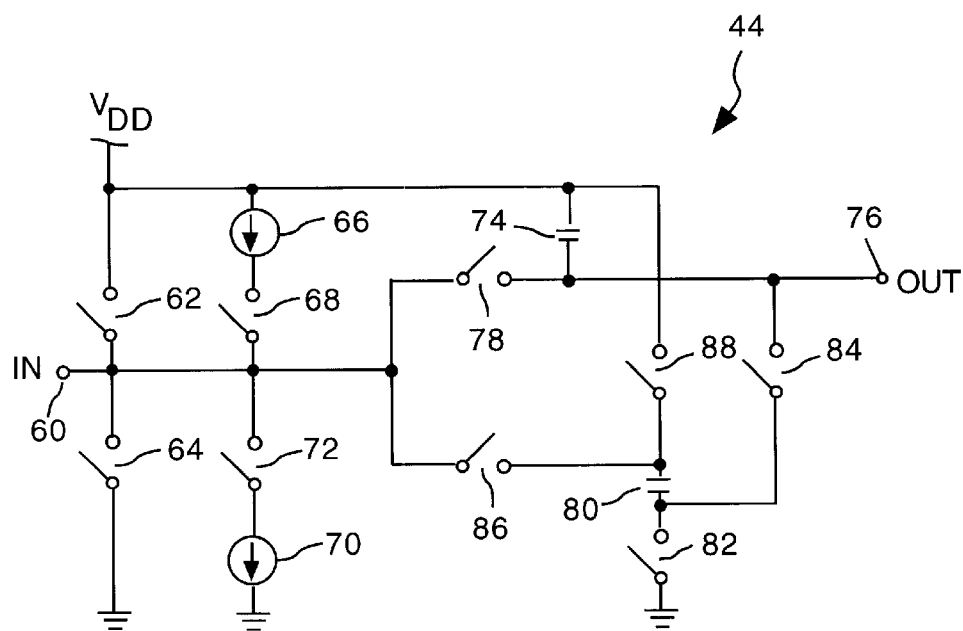
FIG. 4a is a simplified schematic diagram of a charge integrator circuit which may be used in the present invention.
Figure 4B:
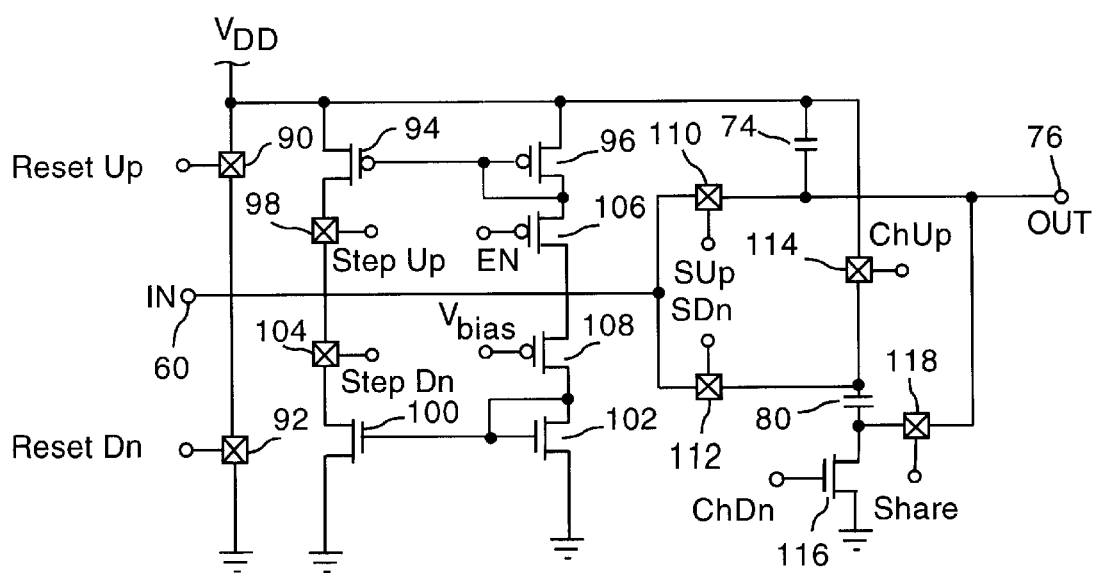
Figure 5:
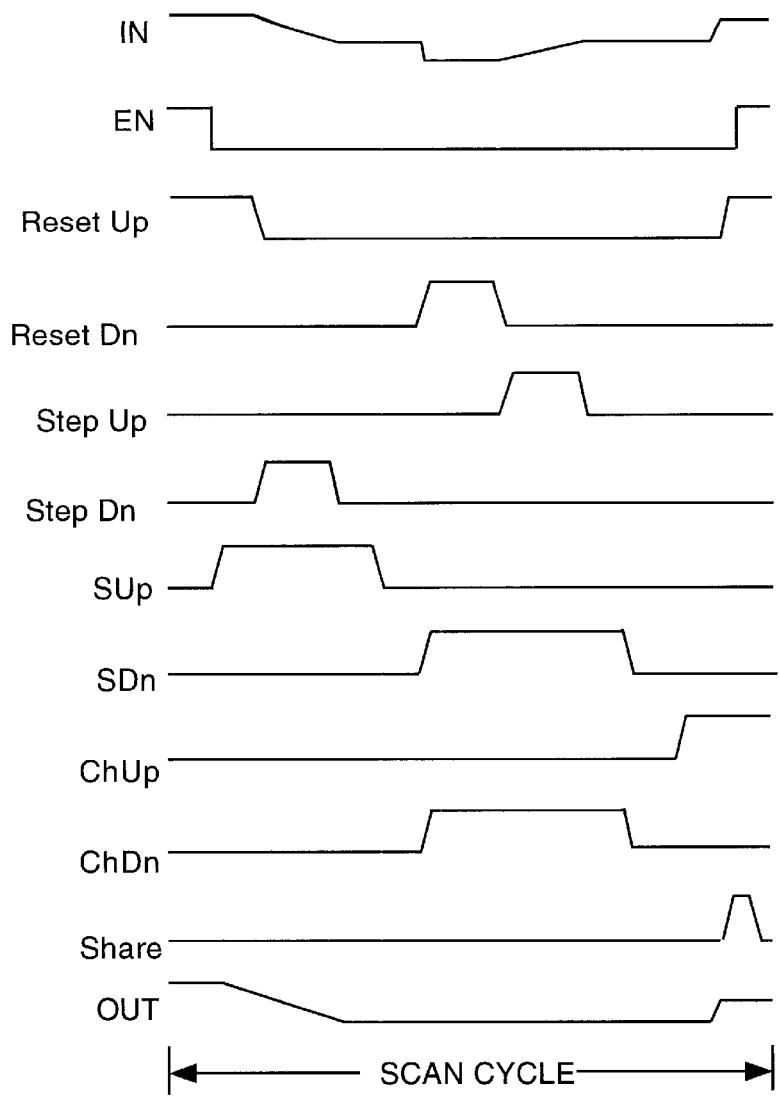
FIG. 5 is a timing diagram of the operation of charge integrator circuit of FIGS. 4a and 4b.

The structure and operation of the individual blocks of FIG. 3 will now be disclosed. Referring now to FIGS. 4a, 4b, and 5, a typical charge integrator circuit 44 will be described. Charge integrator circuit 44 is shown as a simplified schematic diagram in FIG. 4a and as an illustrative schematic diagram in FIG. 4b. The timing of the operation of charge integrator circuit 44 is shown in FIG. 5. These timing signals are provided by the control circuitry 56.

Charge integrator circuit 44 is based on the fundamental physical phenomena of using a current to charge a capacitor. If the capacitor is charged for a constant time by a constant current, then a voltage will be produced on the capacitor which is inversely proportional to the capacitance. The capacitance to be charged is the sensor array line capacitance 42 in parallel with an internal capacitor. This internal capacitor will contain the voltage of interest.

Referring now to FIG. 4a, a simplified schematic diagram of an illustrative charge integrator circuit 44 is shown. A charge integrator circuit input node 60 is connected to one of the X (or Y) lines of the touch sensor array 22. A first shorting switch 62 is connected between the charge integrator circuit input node 60 and $V_{DD}$, the positive supply rail. A second shorting switch 64 is connected between the charge integrator circuit input node 60 and ground, the negative supply rail. A positive constant current source 66 is connected to $V_{DD}$, the positive supply rail and to the charge integrator circuit input node 60 and through a first current source switch 68. A negative constant current source 70 is connected to ground and to the charge integrator circuit input node 60 and through a second current source switch 72. It is obvious that other high and low voltage rails could be used in place of $V_{DD}$ and ground.

A first internal capacitor 74 is connected between $V_{DD}$ and output node 76 of charge integrator circuit 44. A positive voltage storage switch 78 is connected between output node 76 and input node 60. A second internal capacitor 80 has one of its plates connected to ground through a switch 82 and to output node 76 of charge integrator circuit 44 through a switch 84, and the other one of its plates connected to input node 60 through a negative voltage storage switch 86 and to $V_{DD}$ through a switch 88. The capacitance of first and second internal capacitors 74 and 80 should be a small fraction (i.e., about 10%) of the capacitance of the individual sensor array lines. In a typical embodiment, the sensor array line capacitance will be about 10 pF and the capacitance of capacitors 74 and 80 should be about 1 pF.

According to the presently preferred embodiment of the invention, the approach used is a differential measurement for added noise immunity, the benefit of which is that any low frequency common mode noise gets subtracted out. For the following discussion, it is to be assumed that all switches are open unless they are noted as closed. First, the sensor array line is momentarily shorted to $V_{DD}$ through switch 62, switch 78 is closed connecting capacitor 74 in parallel with the capacitance of the sensor line. Then the parallel capacitor combination is discharged with a constant current from current source 70 through switch 72 for a fixed time period. At the end of the fixed time period, switch 78 is opened, thus storing the voltage on the sensor array line on capacitor 74.

The sensor line is then momentarily shorted to ground through switch 64, and switches 82 and 86 are closed to place capacitor 80 in parallel with the capacitance of the sensor line. Switch 68 is closed and the parallel capacitor combination is charged with a constant current from current source 66 for a fixed time period equal to the fixed time period of the first cycle. At the end of the fixed time period, switch 86 is opened, thus storing the voltage on the sensor matrix line on capacitor 80.

The first and second measured voltages are then averaged. This is accomplished by opening switch 82 and closing switches 88 and 84, which places capacitor 80 in parallel with capacitor 74. Because capacitors 74 and 80 have the same capacitance, the resulting voltage across them is equal to the average of the voltages across each individually. This final result is the value that is then passed on to the appropriate one of filter circuits 48-1 through 48-n.

The low frequency noise, notably 50/60 Hz and their harmonics, behaves as a DC current component that adds in one measurement and subtracts in the other. When the two results are added together that noise component averages to zero. The amount of noise rejection is a function of how quickly in succession the two opposing charge-up and charge-down cycles are performed as will be disclosed herein. One of the reasons for the choice of this charge integrator circuit 44 is that it allows measurements to be taken quickly.

Referring now to FIG. 4b, a more complete schematic diagram of an illustrative embodiment of charge integrator circuit 44 of the simplified diagram of FIG. 4a is shown. Input node 60 is shown connected to V DD and ground through pass gates 90 and 92, which replace switches 62 and 64 of FIG. 4a. Pass gate 90 is controlled by a signal ResetUp presented to its control input and pass gate 92 is controlled by a signal ResetDn presented to its control input. Those of ordinary skill in the art will recognize that pass gates 90 and 92, as well as all of the other pass gates which are represented by the same symbol in FIG. 4b may be conventional CMOS pass gates as are known in the art. The convention used herein is that the pass gate will be off when its control input is held low and will be on and present a low impedance connection when its control input is held high.

P-Channel MOS transistors 94 and 96 are configured as a current Mirror. P-Channel MOS transistor 94 serves as the current source 66 and pass gate 98 serves as switch 68 of FIG. 4a. The control input of pass gate 98 is controlled by a signal StepUp.

N-Channel MOS transistors 100 and 102 are also configured as a current mirror. N-Channel MOS transistor 100 serves as the current source 70 and pass gate 104 serves as switch 72 of FIG. 4a. The control input of pass gate 104 is controlled by a signal StepDn. P-Channel MOS transistor 106 and N-Channel MOS transistor 108 are placed in series with P-Channel MOS current mirror transistor 96 and N-Channel MOS current mirror transistor 102. The control gate of P-Channel MOS transistor 106 is driven by an enable signal EN, which turns on P-Channel MOS transistor 106 to energize the current mirrors. This device is used as a power conservation device so that the charge integrator circuit 44 may be turned off to conserve power when it is not in use.

N-Channel MOS transistor 108 has its gate driven by a reference voltage Vbias, which sets the current through current mirror transistors 96 and 102. The voltage Vbias is set by a servo feedback circuit as will be disclosed in more detail with reference to FIG. 10. Those of ordinary skill in the art will appreciate that this embodiment allows calibration to occur in real time (via long time constant feedback) thereby zeroing out any long term effects due to sensor environmental changes. In a current embodiment of the invention, Vbias is common for all charge integrator circuits 44-1 through 44-n and 44-Vmax and 44-Vmin.

Note that proper sizing of N-channel MOS transistors 102 and 108 may provide temperature compensation. This is accomplished by taking advantage of the fact that the threshold of N-Channel MOS transistor 108 reduces with temperature while the mobility of both N-Channel MOS transistors 102 and 108 reduce with temperature. The threshold reduction has the effect of increasing the current while the mobility reduction has the effect of decreasing the current. By proper device sizing these effects can cancel each other out over a significant part of the operating range.

Capacitor 74 has one plate connected to $V_{DD}$ and the other plate connected to the output node 76 and to the input node 60 through pass gate 110, shown as switch 78 in FIG. 4a. The control input of pass gate 110 is driven by the control signal SUp. One plate of capacitor 80 is connected to input node 60 through pass gate 112 (switch 86 in FIG. 4a) and to $V_{DD}$ through pass gate 114 (switch 88 in FIG. 4a). The control input of pass gate 112 is driven by the control signal SDn and the control input of pass gate 114 is driven by the control signal ChUp. The other plate of capacitor 80 is connected to ground through N-Channel MOS transistor 116 (switch 82 in FIG. 4a) and to output node 76 through pass gate 118 (switch 84 in FIG. 4a). The control input of pass gate 118 is driven by control signal Share.

Referring now to FIGS. 4a, 4b and the timing diagram of FIG. 5, the operation of charge integrator circuit 44 during one scan cycle may be observed. First the EN (enable) control signal goes active by going to 0v. This turns on the current mirrors and energizes the charge and discharge current sources, P-channel and N-channel MOS transistors 94 and 100. The ResetUp control signal is active high at this time, which shorts the input node 60 (and the sensor line to which it is connected) to $V_{DD}$. The Sup control signal is also active high at this time which connects capacitor 74 and the output node 76 to input node 60. This arrangement guarantees that the following discharge portion of the operating cycle always starts from a known equilibrium state.

The discharge process starts after the ResetUp control signal goes inactive. The StepDn control signal goes active, connecting N-channel MOS transistor 100, the discharge current source, to the input node 60 and its associated sensor line. StepDn is active for a set amount of time, and the negative constant current source discharges the combined capacitance of the sensor line and capacitor 74 thus lowering its voltage during that time. StepDn is then turned off. A short time later the SUp control signal goes inactive, storing the measured voltage on capacitor 74. That ends the discharge cycle.

Next, the ResetDn control signal becomes active and shorts the sensor line to ground. Simultaneously the SDn and ChDn control signals become active and connect capacitor 80 between ground and the sensor line. Capacitor 80 is discharged to ground, guaranteeing that the following charge up cycle always starts from a known state.

The charge up cycle starts after ResetDn control signal becomes inactive and the StepUp control signal becomes active. At this point the current charging source, P-channel MOS transistor 94, is connected to the sensor line and supplies a constant current to charge the sensor line by increasing the voltage thereon. The StepUp control signal is active for a set amount of time (preferably equal to the time for the previously mentioned cycle) allowing the capacitance to charge, and then it is turned off. The SDn control signal then goes inactive, leaving the measured voltage across capacitor 80.

The averaging cycle now starts. First the voltage on capacitor 80 is level shifted. This is done by the ChDn control signal going inactive, letting one plate of the capacitor 80 float. Then the ChUp control signal goes active, connecting the second plate of the capacitor 80 to $V_{DD}$. Then the Share control signal becomes active which connects the first plate of capacitor 80 to output node 76, thus placing capacitors 74 and 80 in parallel. This has the effect of averaging the voltages across the two capacitors 74 and 80, thus subtracting out common-mode noise as previously described. This average voltage is also then available on output node 76.

Those of ordinary skill in the art will recognize that the environmental alternating current and other low frequency noise-canceling feature inherent in the averaging of the voltages obtained in the discharge and charge cycles is most effective when the two cycles are performed very close together in time. According to the present invention, the ChDn and ChUp signals should be asserted with respect to each other within a time period much less than a quarter of the period of the noise to be canceled in order to take advantage of this feature of the present invention.

According to the present invention, two different drive/sense methods have been disclosed. Those of ordinary skill in the art will readily observe that the charge integrator circuit 44 disclosed with reference to FIGS. 4a, 4b, and 5 is adaptable to operate according to either scanning method disclosed herein.

Figure 6:
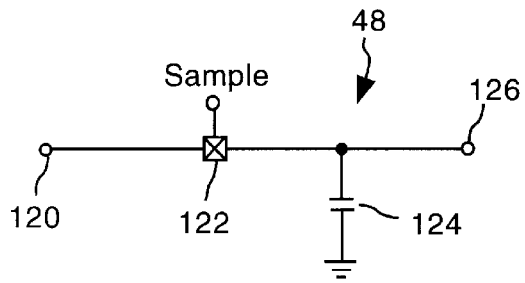
FIG. 6 is a schematic diagram of an illustrative filter and sample/hold circuit for use in the present invention.

As is clear from an understanding of the operation of charge integrator circuit 44, its output voltage is only available for a short period of time and is subject to environmental noise. In order to minimize the effects of noise, a switched capacitor filter circuit 48 is used. Referring now to FIG. 6, a schematic diagram of an illustrative switched capacitor filter circuit 48 which may be used in the present invention is shown. Those of ordinary skill in the art will recognize this switched capacitor filter circuit, which comprises an input node 120, a pass gate 122 having a control input driven by a Sample control signal, a capacitor 124 connected between the output of the pass gate 122 and a fixed voltage such as ground, and an output node 126 comprising the common connection between the capacitor 124 and the output of the pass gate 122. In a typical embodiment, capacitor 124 will have a capacitance of about 10 pF.

As will be appreciated by persons of ordinary skill in the art, the switched capacitor filter circuit 48 is in part a sample/hold circuit and has a filter time constant which is K times the period of sample, where K is the ratio of capacitor 124 to the sum of capacitors 74 and 80 of the charge integrator circuit 44 of FIGS. 4a and 4b to which it is connected. The switched capacitor filter circuit 48 further reduces noise injection in the system. In the preferred embodiment, K=10/2=5. Those of ordinary skill in the art will recognize that other types of filter circuits, such as RC filters, may be employed in the present invention.

Figure 7:
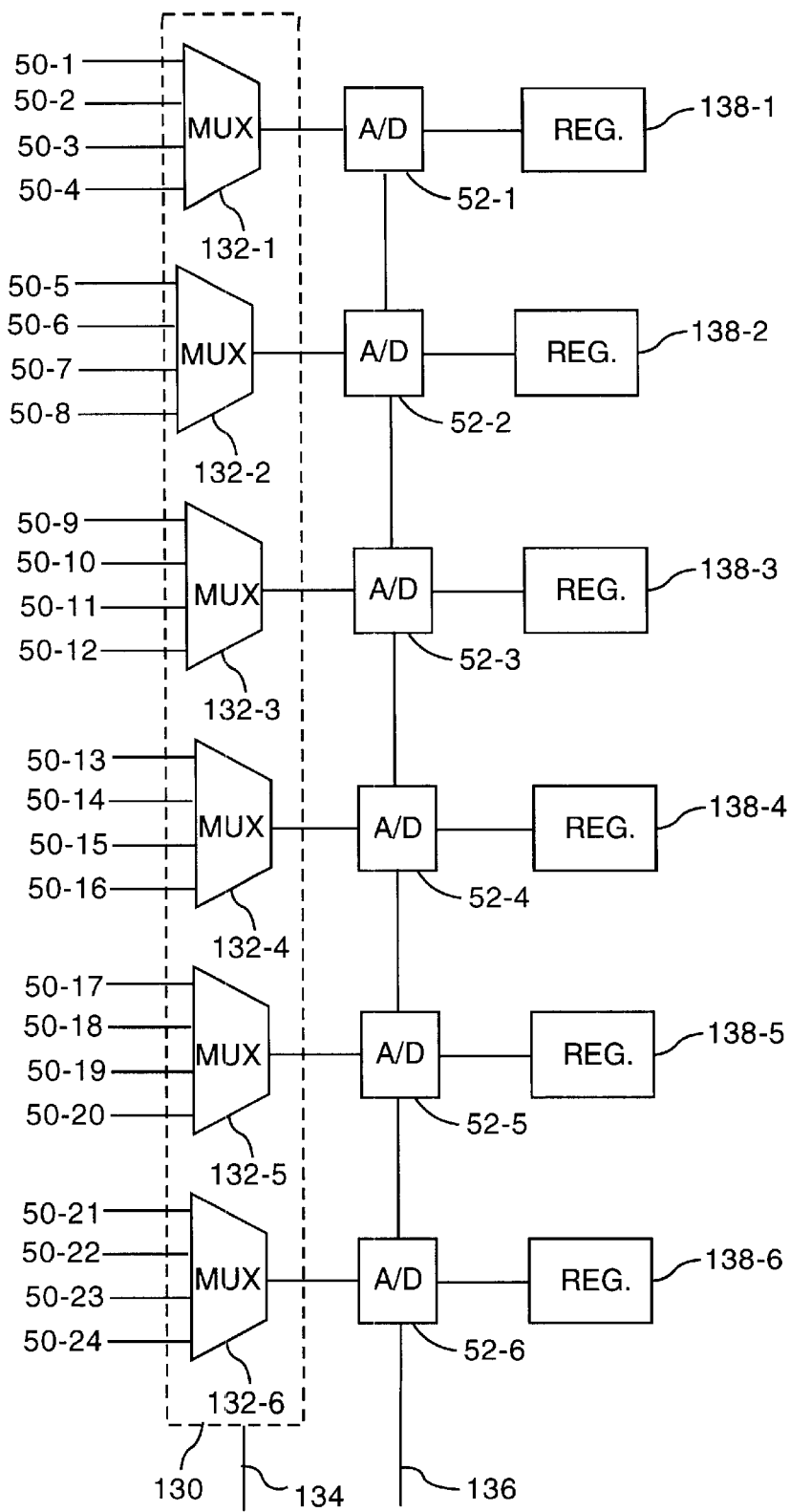
FIG. 7 is a more detailed block diagram of a presently preferred arrangement of A/D converters for use in the present invention.

Referring now to FIG. 7, a more detailed block diagram of a presently preferred arrangement of A/D converters 52 of FIG. 3 is presented. There are fewer A/D converters 52 than there are lines in the touch sensor array 22, and the inputs to the A/D converters 52 are multiplexed to share each of the individual A/D converters 52 among several lines in the touch sensor array 22. The arrangement in FIG. 7 is more efficient in the use of integrated circuit layout area than providing individual A/D converters 52 for each input line.

In the embodiment illustrated in FIG. 7, twenty-four conductive line traces are assumed for the touch sensor array 22 of FIGS. 2a–2d. As shown in FIG. 7, the outputs of sample/hold circuits 50-1 through 50-24 are fed to the analog data inputs of analog multiplexer 130. Analog multiplexer 130 has six outputs, each of which drives the input of an individual A/D converter 52-1 through 52-6. The internal arrangement of analog multiplexer 130 is such that four different ones of the inputs are multiplexed to each of the outputs. Analog multiplexer 130 has been conceptually drawn as six internal multiplexer blocks 132-1 through 132-6.

In the example shown in FIG. 7, inputs taken from sample/hold circuits 50-1 through 50-4 are multiplexed to the output of internal multiplexer block 132-1 which drives A/D converter 52-1. Similarly, inputs taken from sample/hold circuits 50-5 through 50-8 are multiplexed to the output of internal multiplexer block 132-2 which drives A/D converter 52-2; inputs taken from sample/hold circuits 50-9 through 50-12 are multiplexed to the output of internal multiplexer block 132-3 which drives A/D converter 52-3; inputs taken from sample/hold circuits 50-13 through 50-16 are multiplexed to the output of internal multiplexer block 132-4 which drives A/D converter 52-4; inputs taken from sample/hold circuits 50-17 through 50-20 are multiplexed to the output of internal multiplexer block 132-5 which drives A/D converter 52-5; and inputs taken from sample/hold circuits 50-21 through 50-24 are multiplexed to the output of internal multiplexer block 132-6 which drives A/D converter 52-6.

Analog multiplexer 130 has a set of control inputs schematically represented by bus 134. In the illustrative embodiment shown in FIG. 7, each of internal multiplexors 132-1 through 132-6 are four-input multiplexors and thus control bus 134 may comprise a two-bit bus for a one-of four selection. Those of ordinary skill in the art will recognize that the arrangement of FIG. 7 is merely one of a number of specific solutions to the task of A/D conversion from twenty-four channels, and that other satisfactory equivalent arrangements are possible.

In a straightforward decoding scheme, multiplexors 132-1 through 132-6 will pass, in sequence, the analog voltages present on their first through fourth inputs on to the inputs of A/D converters 52-1 through 52-6 respectively. After the analog values have settled in the inputs of A/D converters 52-1 through 52-6, a CONVERT command is asserted on common A/D control line 136 to begin the A/D conversion process.

When the A/D conversion process is complete, the digital value representing the input voltage is stored in registers 138-1 through 138-6. As presently preferred, registers 138-1 through 138-6 may each comprise a two-word register, so that one word may be read out of the registers 138-1 through 138-6 to arithmetic unit 16 while a second word is being written into the registers 138-1 through 138-6 in order to maximize the speed of the system. The design of such registers 138-1 through 138-6 is conventional in the art.

Figure 8:
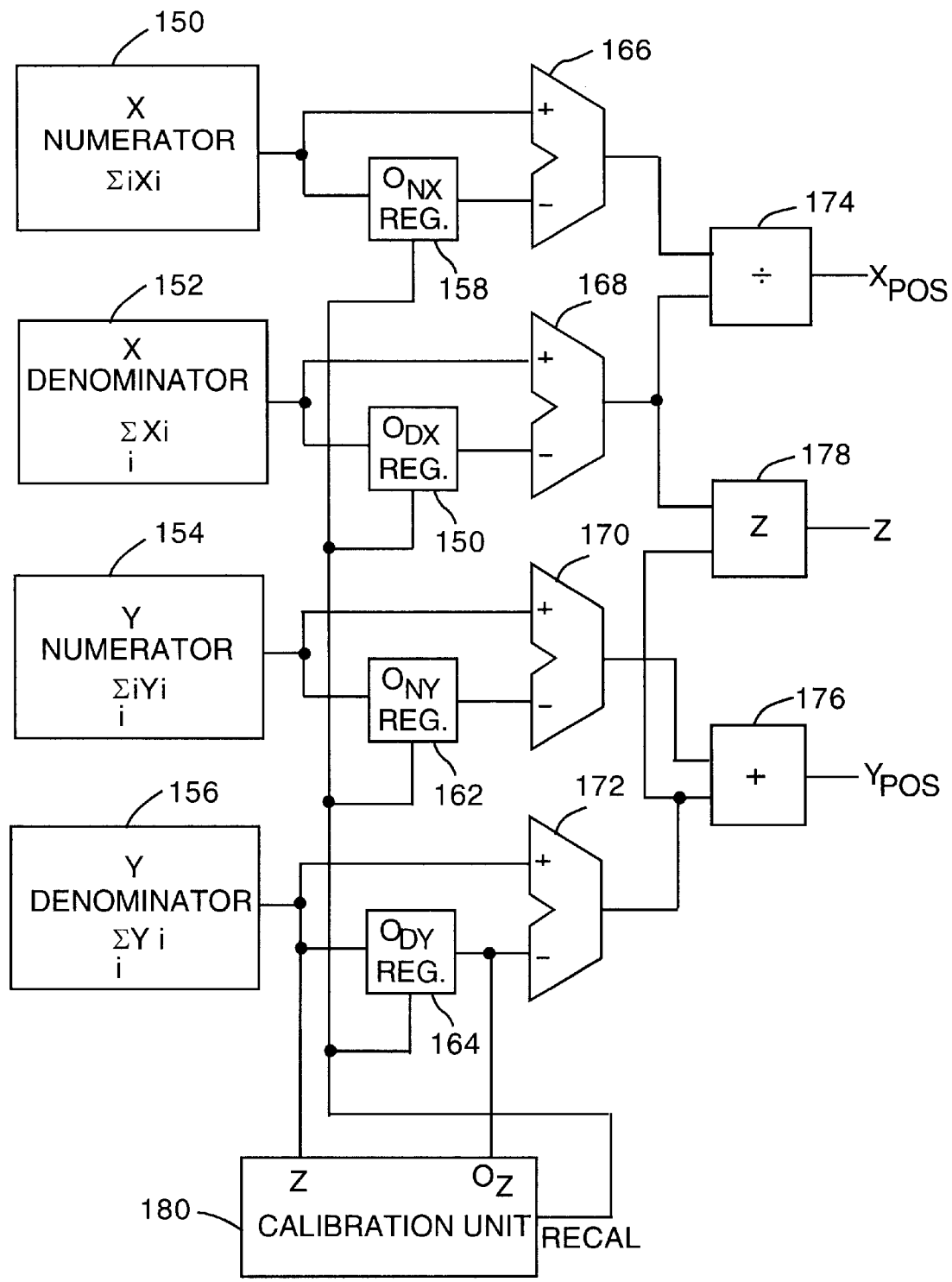
FIG. 8 is a block diagram of an illustrative arithmetic unit which may be used in the present invention.

Referring now to FIG. 8, a more detailed block diagram of the arithmetic unit 16 is presented. Those of ordinary skill in the art will appreciate that arithmetic unit 16 processes information from both the X and Y dimensions, i.e., from X input processing circuit 12 and Y input processing circuit 14 of FIG. 1.

Before disclosing the structural configuration of arithmetic unit 16, it is helpful to understand the preferred method by which the centroid position of an object proximate to the touch sensor array 22 is determined according to the present invention.

According to a presently preferred embodiment of the invention, the object position in either direction may be determined by evaluating the weighted average of the capacitances measured on the individual sense line of the touch sensor array 22. In the following discussion, the X direction is used, but those of ordinary skill in the art will recognize that the discussion applies to the determination of the weighted average in the Y direction as well. As is well known, the weighted average may be determined as follows:

$$Xposition = \frac{\sum_{i=0}^{n} i \times \Delta Ci}{\sum_{i=0}^{n} \Delta Ci} \quad [\text{Eq. 1}]$$

where $\Delta C_i = C_i - CO_i$. $C_i$ is the capacitance presently being measured on the ith trace and $CO_i$ is the value measured on that same trace at some past time when no object was present. In terms of these past and present capacitance measurements, the position can be expressed as:

$$Xposition = \frac{\sum_{i=0}^{n} i \times (Ci - COi)}{\sum_{i=0}^{n} (Ci - COi)} \quad [\text{Eq. 2}]$$

Using the distributive property of multiplication over addition, this expression is seen to be equivalent to:

$$Xposition = \frac{-\sum_{i=0}^{n}(i \times COi) + \sum_{i=0}^{n}(i \times Ci)}{-\sum_{i=0}^{n}(COi) + \sum_{i=0}^{n}(Ci)} \quad [\text{Eq. 3}]$$

where the negative terms in both the numerator and denominator are offsets and represent the background value of the capacitances with no object present. If the term $O_N$ is used to represent the numerator offset and the term $O_D$ is used to represent the denominator offset, Eq. 3 may be re-written as:

$$Xposition = \frac{-O_N + \sum_{i=0}^{n}(i \times Ci)}{-O_D + \sum_{i=0}^{n}(Ci)} \quad [\text{Eq. 4}]$$

Referring now to FIG. 8, it may be seen that arithmetic unit 16 includes X numerator and denominator accumulators 150 and 152 and Y numerator and denominator accumulators 154 and 156. The source of operand data for X numerator and denominator accumulators 150 and 152 and Y numerator and denominator accumulators 154 and 156 are the registers 138-1 through 138-6 in each (X and Y) direction of the touch sensor array 22 of FIG. 1. The X and Y denominator accumulators 152 and 156 sum up the digital results from the A/D conversions. The X and Y numerator accumulators 150 and 154 compute the weighted sum of the input data rather than the straight sum. X and Y numerator and denominator accumulators 150, 152, 154, and 156 may be configured as hardware elements or as software running on a microprocessor as will be readily understood by those of ordinary skill in the art.

As may be seen from an examination of FIG. 8, X and Y numerator accumulators 150 and 154 compute the expression of Eq. 4:

$$\sum_{i=0}^{n} i \times C_i \quad [\text{Eq. 5}]$$

and X and Y denominator accumulators 152 and 156 compute the expression of Eq. 4:

$$\sum_{i=0}^{n} C_i \quad [\text{Eq. 6}]$$

The contents of X and Y numerator and denominator offset registers 158, 160, 162, and 164 are subtracted from the results stored in the X and Y numerator and denominator accumulators 150, 152, 154, and 156 in adders 166, 168, 170, and 172. Adder 166 subtracts the offset $O_{NX}$ stored in X numerator offset register 158. Adder 168 subtracts the offset $O_{DX}$ stored in X denominator offset register 160.

Adder 170 subtracts the offset $O_{NY}$ stored in Y numerator offset register 162. Adder 172 subtracts the offset $O_{DY}$ stored in Y denominator offset register 164. The numerator denominator pairs are divided by division blocks 174 and 176 to produce the X and Y position data, and the X and Y denominator pair is used by block 178 to produce Z axis (pressure) data. The function performed by block 178 will be disclosed later herein. The offsets $O_{DX}$, $O_{NX}$, $O_{DY}$, and $O_{NY}$ are sampled from the contents of the X and Y numerator and denominator accumulators 150, 152, 154 and 156 when directed by calibration unit 180.

Persons of ordinary skill in the art will readily appreciate that the architecture of the system of the present invention may be distributed in a number of ways, several of which involve the availability of a microprocessor, whether it be in a host computer to which the system of the present invention is connected or somewhere between the integrated circuit described herein and a host computer. Embodiments of the present invention are contemplated wherein the accumulated numerator and denominator values representing the summation terms are delivered to such a microprocessor along with the $O_N$ and $O_D$ offset values for processing, or where all processing is accomplished by a programmed microprocessor as is known in the art.

Initially, the X and Y numerator and denominator accumulators 150, 152, 154, and 156 are set to zero during system startup. If the multiplexed A/D converters 52-1 through 52-6 as shown in FIG. 7 are employed, the digitized voltage data in the first word of register 138-1 (representing the voltage at the output of sample/hold circuit 50-1) is added to the sum in the accumulator and the result stored in the accumulator. In succession, the digitized voltage values stored in the first word of registers 138-2 through 138-6 (representing the voltage at the outputs of sample/hold circuits 50-5, 50-9, 50-13, 50-17, and 50-21, respectively) are added to the sums in the accumulators and the results stored in the accumulators. As previously mentioned, A/D converters 52-1 through 52-6 may at this time be converting the voltages present at the outputs of sample/hold circuits 50-2, 50-6, 50-10, 50-14, 50-18, and 50-22 and storing the digitized values in the second words of registers 138-1 through 138-6 respectively.

Next, in succession, the digitized voltage values stored in the second words of registers 138-1 through 138-6 (representing the voltage at the outputs of-sample/hold circuits 50-2, 50-6, 50-10, 50-14, 50-18, and 50-22, respectively) are added to the sum in the accumulator and the result stored in the accumulator.

Next, in succession, the digitized voltage values stored in the first words of registers 138-1 through 138-6 (representing the voltage at the outputs of sample/hold circuits 50-3, 50-7, 50-11, 50-15, 50-19, and 50-23, respectively) are added to the sum in the accumulator and the result stored in the accumulator, followed by digitized voltage values stored in the second words of registers 138-1 through 138-6 (representing the voltage at the outputs of sample/hold circuits 50-4, 50-8, 50-12, 50-16, 50-20, and 50-24, respectively).

At this point in time, the accumulators hold the sums of all of the individual digitized voltage values. The digital values stored in the $O_N$ and $O_D$ offset registers 158, 160, 162, and 164 are now respectively subtracted from the values stored in the numerator and denominator accumulators. The division operation in dividers 174 and 176 then completes the weighted average computation.

The division operation may also be performed by an external microprocessor which can fetch the values stored in the accumulators or perform the accumulations itself. As the $O_N$ and $O_D$ offset values are presently derived by an external microprocessor, the additional processing overhead presented to such external microprocessor by this division operation is minimal. Alternately, a dedicated microprocessor may be included on chip to handle these processing tasks without departing from the invention disclosed herein.

The above disclosed processing takes place within about 1 millisecond and may be repeatedly performed. Current mouse standards update position information 40 times per second, and thus the apparatus of the present invention may easily be operated at this repetition rate.

Because of the nature of the method employed in the present invention, an opportunity exists to provide additional noise immunity without requiring additional hardware in the system of the present invention. While it is apparent that after the above-disclosed sequence has been performed, the accumulators may be cleared and the process repeated, the values may also be allowed to remain in the accumulators. If this is done, an averaging function may be implemented to further filter out noise. According to this aspect of the invention, a number of samples are taken and run through the accumulators without clearing them at the end of the processing sequence. As presently preferred, twenty-five samples are processed before a single division result is taken for use by the system, thus greatly reducing the effects of transient system noise spikes. Those of ordinary skill in the art will recognize that the number of samples taken prior to clearing the accumulators is a matter of design choice dictated by factors such as data acquisition rates, data processing rates etc.

It is preferable to provide additional filtering of the X and Y position data produced by division blocks 174 and 176 of the arithmetic unit 16 of FIG. 8. The filtering preferably occurs in between arithmetic unit 16 and motion and gesture units 18 and 20 of FIG. 1. The X and Y coordinates are separately filtered as independent numbers. Each filter is an averaging register computing a "running average" as is well known in the art. When the finger's presence is first detected, the filter register is initialized with the current quotient. In subsequent samples, the new quotient is averaged with the filter register value to produce a new filter register value. In the presently preferred embodiment, the values are equally weighted in the average, though different weightings can be used to provide stronger or weaker filtering. The sequence of values in the filter register serve as the X and Y coordinates used by the motion and gesture units 18 and 20 of FIG. 1.

The system of the present invention is adaptable to changing conditions, such as component aging, changing capacitance due to humidity, and contamination of the touch surface, etc. In addition, the present invention effectively minimizes ambient noise. According to the present invention, these effects are taken into consideration in three ways. First, the offset values $O_N$ and $O_D$ are dynamically updated to accommodate changing conditions. Second, a servo-feedback circuit is provided to determine the bias voltage used to set the bias of the charge-integrator circuits 44-1 through 44-n. Third, as previously disclosed herein, the reference voltage points for $V_{max}$ and $V_{min}$ of the A/D converters 52 are also dynamically altered to increase the signal to noise margin.

Figure 9:
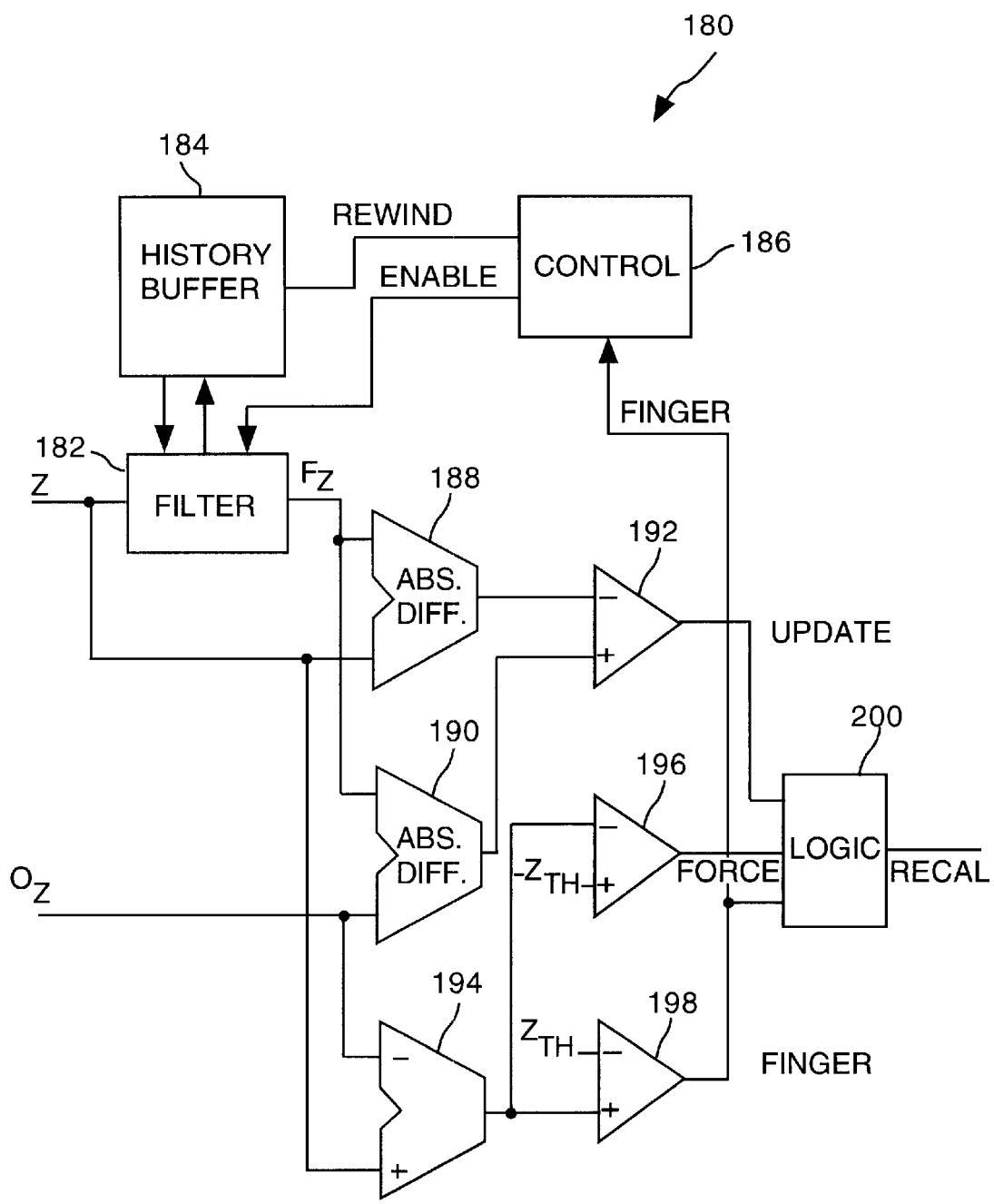
FIG. 9 is a block diagram of a calibration unit which may be used with the arithmetic unit of FIG. 8.

Referring now to FIG. 9, a block diagram of a calibration unit 180 which may be used with the arithmetic unit 16 of FIG. 8 is presented. The calibration unit 180 executes an algorithm to establish the numerator and denominator offset values by attempting to determine when no finger or other conductive object is proximate to the touch sensor array 22.

As previously disclosed, the $O_N$ and $O_D$ offset values represent the baseline values of the array capacitances with no object present. These values are also updated according to the present invention since baseline levels which are too low or too high have the effect of shifting the apparent position of the object depending on the sign of the error. These values are established by selection of the values read when no object is present at the touch sensor array 22. Since there is no external way to "know" when no object is present at touch sensor array 22, an algorithm according to another aspect of the present invention is used to establish and dynamically update these offset values. When the calibration unit 180 sees a Z value which appears typical of the Z values when no finger is present, it instructs the offset registers (158, 160, 162, and 164 of FIG. 8) to reload from the current values of the X and Y numerator and denominator accumulators 150, 152, 154 and 156. According to a presently preferred embodiment of the invention, the decision to update the offset values is based on the behavior of the touch sensor array 22 in only one of the X or Y directions, but when the decision is made all four offsets ($O_{NX}$, $O_{DX}$, $O_{NY}$, and $O_{DY}$) are updated. In other embodiments of the invention, the decision to update may be individually made for each direction according to the criteria set forth herein.

The calibration algorithm works by monitoring changes in a selected one of the denominator accumulator values. According to the present invention, it has been observed that the sensitivity to changes in capacitance of one of the sets of conductive lines in the touch sensor array 22 is greater than the sensitivity to changes in capacitance of the other one of the sets of conductive lines in the touch sensor array 22. Experience suggests that the set of conductive lines having the greater sensitivity to capacitance changes is the one which is physically located above the set of conductive lines in the other direction and therefore closest to the touch surface of the touch sensor array 22. The upper set of conductive lines tends to partially shield the lower set of conductive lines from capacitive changes occurring above the surface of the touch sensor array 22.

The finger pressure is obtained by summing the capacitances measured on the sense lines. This value is already present in the denominator accumulator after subtracting the offset $O_D$. A finger is present if the pressure exceeds a suitable threshold value. This threshold may be chosen experimentally and is a function of surface material and circuit timing. The threshold may be adjusted to suit the tastes of the individual user.

The pressure reported by the device is a simple function $f(X_D, Y_D)$ of the denominators for the X and Y directions as implemented in block 178 of FIG. 8. Possible functions include choosing one preferred denominator value, or summing the denominators. In a presently preferred embodiment, the smaller of the two denominators is chosen. This choice has the desirable effect of causing the pressure to go below the threshold if the finger moves slightly off the edge of the pad, where the X sensors are producing valid data, but the Y sensors are not, or vice versa. This acts as an electronic bezel which can take the place of a mechanical bezel at the periphery of the sensor area.

In the example of FIG. 8, the Y denominator is chosen for monitoring because it is the most sensitive. The chosen denominator is referred to as Z for the purposes of the calibration algorithm. The current saved offset value for this denominator is referred to as $O_Z$.

The goal of the calibration algorithm is to track gradual variations in the resting Z level while making sure not to calibrate to the finger, nor to calibrate to instantaneous spikes arising from noise. As will be apparent to those of ordinary skill in the art from the following disclosure, the calibration algorithm could be implemented in digital or analog hardware, or in software. In a current embodiment actually tested by the inventors, it is implemented in software.

As Z values arrive in the calibration unit 180, they are passed through filter 182. History buffer 184, which operates in conjunction with filter 182, keeps a "running average" of recent Z values. When a new Z value arrives, the current running average $F_Z$ is updated according to the formula:

$$\text{new } F_Z = \alpha(\text{old } F_Z) + (1-\alpha)Z \qquad [\text{Eq. 7}]$$

where α is a constant factor between 0 and 1 and typically close to 1 and Z is the current Z value. In the preferred embodiment, alpha is approximately 0.95. The intention is for $F_Z$ to change slowly enough to follow gradual variations, without being greatly affected by short perturbations in Z.

The filter 182 receives a signal ENABLE from control unit 186. The running average $F_Z$ is updated based on new Z values only when ENABLE is asserted. If ENABLE is deasserted, $F_Z$ remains constant and is unaffected by current Z.

The history buffer 184 records the several most recent values of $F_Z$. In the present embodiment, the history buffer 184 records the two previous $F_Z$ values. The history buffer 184 might be implemented as a shift register, circular queue, or analog delay line. When the history buffer 184 receives a REWIND signal from control unit 186, it restores the current running average $F_Z$ to the oldest saved value. It is as if the filter 182 were "retroactively" disabled for an amount of time corresponding to the depth of the history buffer 184. The purpose of the history buffer 184 is to permit such retroactive disabling.

The current running average $F_Z$ is compared against the current Z value and the current offset $O_Z$ by absolute difference units 188 and 190, and comparator 192. Absolute difference unit 188 subtracts the values Z and $F_Z$ and outputs the absolute value of their difference. Absolute difference unit 190 subtracts the values $O_Z$ and $F_Z$ and outputs the absolute value of their difference. Comparator 192 asserts the UPDATE signal if the output of absolute difference unit 188 is less than the output of absolute difference unit 190, i.e., if $F_Z$ is closer to Z than it is to $O_Z$. The UPDATE signal will tend to be asserted when the mean value of Z shifts to a new resting level. It will tend not to be asserted when Z makes a brief excursion away from its normal resting level. The filter constant ox determines the length of an excursion which will be considered "brief" for this purpose.

Subtractor unit 194 is a simple subtractor that computes the signed difference between Z and $O_Z$, This subtractor is actually redundant with subtractor 172 in FIG. 8, and so may be merged with it in the actual implementation. The output $C_Z$ of this subtractor is the calibrated Z value, an estimate of the finger pressure. This pressure value is compared against a positive and negative Z threshold by comparators 196 and 198. These thresholds are shown as $Z_{TH}$ and $-Z_{TH}$, although they are not actually required to be equal in magnitude.

If pressure signal $C_Z$ is greater than $Z_{TH}$, the signal FINGER is asserted indicating the possible presence of a finger. The $Z_{TH}$ threshold used by the calibration unit 180 is similar to that used by the rest of the system to detect the presence of the finger, or it may have a different value. In the present embodiment, the calibration $Z_{TH}$ is set somewhat lower than the main $Z_{TH}$ to ensure that the calibration unit 180 makes a conservative choice about the presence of a finger.

If pressure signal $C_Z$ is less than $-Z_{TH}$, the signal FORCE is asserted. Since $O_Z$ is meant to be equal to the resting value of Z with no finger present, and a finger can only increase the sensor capacitance and thus the value of Z, a largely negative $C_Z$ implies that the device must have incorrectly calibrated itself to a finger, which has just been removed. Calibration logic 200 uses this fact to force a recalibration now that the finger is no longer present.

Control unit 186 is responsible for preventing running average $F_Z$ from being influenced by Z values that occur when a finger is present. Output ENABLE is generally off when the FINGER signal is true, and on when the FINGER signal is false. However, when FINGER transitions from false to true, the control unit 186 also pulses the REWIND signal. When FINGER transitions from true to false, the control unit 186 waits a short amount of time (comparable to the depth of the history buffer 184) before asserting ENABLE. Thus, the running average is prevented from following Z whenever a finger is present, as well as for a short time before and after the finger is present.

Calibration logic 200 produces signal RECAL from the outputs of the three comparators 192, 196, and 198. When RECAL is asserted, the offset registers $O_N$ and $O_D$ will be reloaded from the current accumulator values. RECAL is produced from the following logic equation:

RECAL=FORCE or (UPDATE and not FINGER). [Eq. 8]

In addition, calibration logic 200 arranges to assert RECAL once when the system is first initialized, possibly after a brief period to wait for the charge integrators and other circuits to stabilize.

From the descriptions of control unit 186 and calibration logic 200, it will be apparent to those of ordinary skill in the art that these blocks can be readily configured using conventional logic as a matter of simple and routine logic design.

It should be obvious to any person of ordinary skill in the art that the calibration algorithm described is not specific to the particular system of charge integrators and accumulators of the current invention. Rather, it could be employed in any touch sensor which produces proximity or pressure data in which it. is desired to maintain a calibration point reflecting the state of the sensor when no finger or spurious noise is present.

Figure 10:
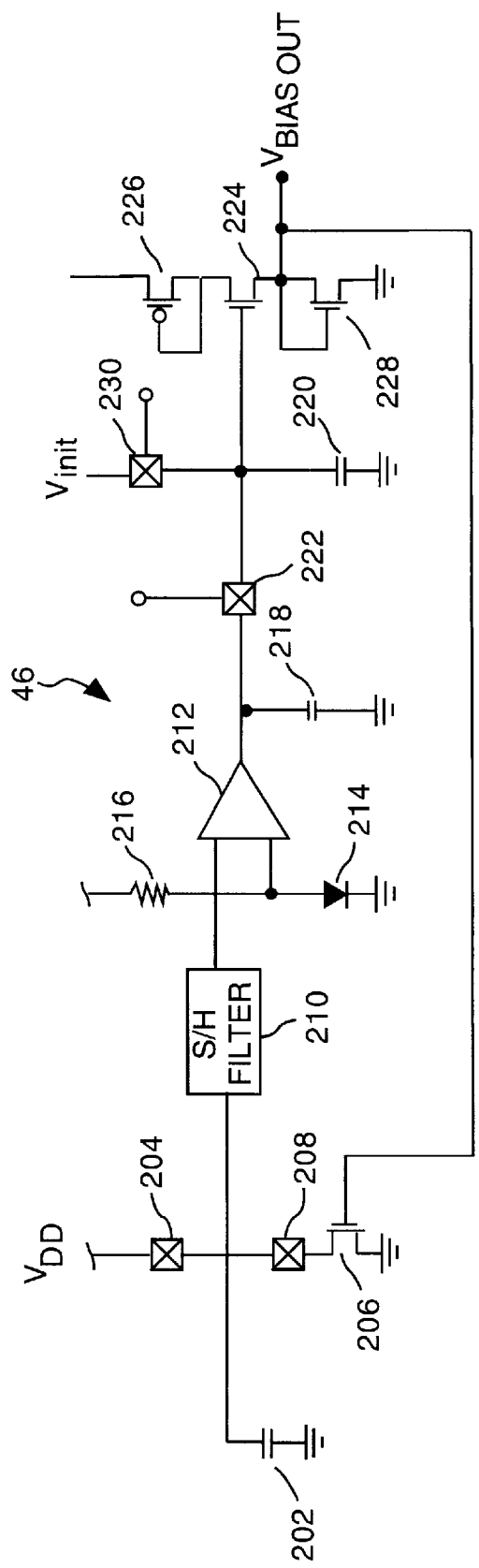
FIG. 10 is a schematic diagram of a bias voltage generating circuit useful in the present invention.

Referring now to FIG. 10, a bias voltage generating circuit 46 useful in the present invention is shown in schematic diagram form. According to a presently preferred embodiment of the invention, all of the N-channel MOS bias transistors 108 (FIG. 4b) of charge integrator circuits 44-1 through 44-n have their gates connected to a single source of bias voltage, although persons of ordinary skill in the art recognize that other arrangements are possible. There are a number of ways in which to generate the bias voltage required by charge integrator circuits 44-1 through 44-n.

As may be seen from an examination of FIG. 10, the bias voltage generating circuit 46 is an overdamped servo system. A reference source which approximates the current source function of a typical one of the charge integrator circuits 44-1 through 44-n includes a capacitor 202 having one of its plates grounded. The other one of its plates is connected to the V DD power supply through a first pass gate 204 and to a current source transistor 206 through a second passgate 208. A filter circuit 210, identical to the filter circuits 48-1 through 48-n and controlled by the same signal as filter circuits 48-1 through 48-n is connected to sample the voltage on capacitor 202 in the same manner that the filter-and-sample/hold circuits 48-1 through 48-n sample the voltages on the sensor conductor capacitances in the touch sensor array 22.

The output of filter circuit 210 is fed to the non-inverting input of a weak transconductance amplifier 212, having a bias current in the range of from about 0.1–0.2 $\mu$A. The inverting input of the transconductance amplifier 212 is connected to a fixed voltage of about 1 volt generated, for example, by diode 214 and resistor 216. The output of trans conductance amplifier 212 is shunted by capacitor 218 and also by capacitor 220 through passgate 222. Capacitor 220 is chosen to be much larger than capacitor 218. In a typical embodiment of the present invention, capacitor 218 may be about 0.2 pF and capacitor 220 may be about 10 pF.

Capacitor 220 is connected to the gate of N-Channel MOS transistor 224, which has its drain connected to the drain and gate of P-Channel MOS transistor 226 and its source connected to the drain and gate of N-Channel MOS transistor 228. The source of P-Channel MOS transistor 226 is connected to $V_{DD}$ and the source of N-Channel MOS transistor 228 is connected to ground. The common drain connection of transistors 224 and 228 is the bias voltage output node.

An optional passgate 230 may be connected between a fixed voltage source (e.g., about 2 volts) and capacitor 220. Passgate 230 may be used to initialize the bias generating circuit 46 on startup by charging capacitor 220 to the fixed voltage.

During each sample period, the filter circuit 2 10 takes a new sample. If the new sample differs from the previous sample, the output voltage of transconductance amplifier 212 will change and start to charge or discharge capacitor 218 to a new voltage. Passgate 222 is switched on for a short time (i.e., about 1 $\mu$sec) and the voltages on capacitors 218 and 220 try to average themselves. Due to the large size difference between capacitors 218 and 220, capacitor 218 cannot supply enough charge to equalize the voltage during the period when passgate 222 is open. This arrangement prevents large changes in bias voltage from cycle to cycle.

Capacitor 202 should look as much as possible like one of the sensor array lines and has a value equal to the background capacitance of a typical sensor line, (i.e., with no object proximate or present capacitance component). Capacitor 202 may be formed in several ways. Capacitor 202 may comprise an extra sensor line in a part of the sensor array, configured to approximate one of the active sensor lines but shielded from finger capacitance by a ground plane, etc. Alternately, capacitor 202 may be a capacitor formed in the integrated circuit or connected thereto and having a value selected to match that of a typical sensor line. In this respect, the signal source comprising capacitor 202 and filter circuit 210 is somewhat like the circuitry for generating the $V_{max}$ and $V_{min}$ reference voltages, in that it mimics a typical sensor line.

As another alternative, one of the actual sensor lines may be employed to set the bias voltage. The measured voltage on the two end-point sensor lines may be compared and the one having the lowest value may be selected on the theory that, if a finger or other object is proximate to the sensor array, it will not be present at sensor lines located at the opposite edges of the array.

According to another aspect of the present invention, an "edge motion" feature may be implemented when the object position sensor of the present invention is used as a computer cursor control device in place of a mouse. A practical problem arises in the use of computer mice or other cursor control devices when an attempt is made to move an object over a large distance on a computer screen. This problem is encountered when a small mouse pad is used with a computer mouse, or when an object position sensor of the kind described herein has a small touch sensor area.

In touch sensor applications, this problem is especially acute during a "drag" gesture. If the user lifts the finger to begin a second stroke, the drag effect ends prematurely on the screen. The edge motion feature of the present invention helps to eliminate the need to use "rowing," or multiple strokes of the finger to move a large distance on the screen.

A prior solution to the long-distance drag problem has been to provide an acceleration feature, i.e., a "ballistic" curve, where the gain varies as a function of finger speed, allowing the user to move long distances, albeit clumsily, using a repeated finger swishing motion. This technique can be used with any variable-speed pointing device, for example, with a mouse on a mouse pad of limited size. Typical mouse driver software includes an adjustable acceleration feature (sometimes under a misleading name like "mouse speed").

Figure 11:
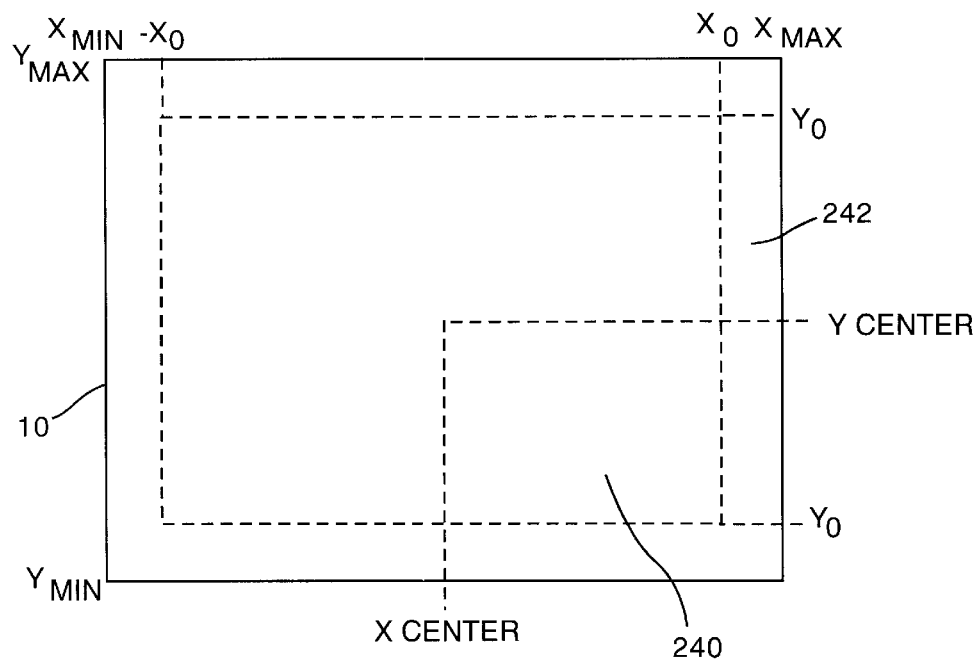
FIG. 11 is a diagram of the sensing plane illustrating the edge motion feature of the object position sensor of the present invention.

According to a presently preferred embodiment of the invention, the edge motion feature of the object position sensor is implemented by motion unit 18 of FIG. 1 and works by defining two zones in the sensing plane 10 containing the touch sensor array 22. As shown in FIG. 11, the sensing plane 10 is preferably divided into an inner zone 240 comprising most of the central portion of the surface of sensing plane 10 and an outer zone 242, typically comprising a thin marginal area at the periphery of the sensor array. The center of the sensing plane 10 may be described as the origin ($X_{center}$, $Y_{center}$) in a Cartesian coordinate system. Those of ordinary skill in the art will recognize however that the inner and outer zones could be of any shape.

Thus in FIG. 11, inner zone 240 is defined by the upper dashed line $Y_0$, right-hand dashed line $X_0$, lower dashed line $-Y_0$ and left-hand dashed line $-X_0$. Outer zone 242 is the region between the outer edges of the sensing plane 10 defined by $Y_{max}$, $-Y_{max}$, $X_{max}$ and $-X_{max}$ and the outer borders of inner zone 240 defined by $Y_0$, $X_0$, $-Y_0$, and $-X_0$.

According to this aspect of the present invention, finger motions in the inner zone 240 are translated in the standard fashion into motion events to be sent to the host computer. As is well understood in the art, the standard way to communicate mouse motion to a host computer may also be employed in the present invention to communicate finger motion to a host computer. After the finger position is established as disclosed herein, the information communicated to the host computer is:

$$\Delta X = A(X_{cur} - X_{old}) \quad [\text{Eq. 9}]$$

$$\Delta Y = A(Y_{cur} - Y_{old}) \quad [\text{Eq. 10}]$$

where $\Delta X$ is the change in the X position of the finger, $\Delta Y$ is the change in the Y position of the finger, $X_{cur}$ is the current X position of the finger and $X_{old}$ is the last reported X position of the finger, $Y_{cur}$ is the current Y position of the finger and $Y_{old}$ is the last reported Y position of the finger, and A is a "gain factor" which is commonly encountered in mouse cursor control applications.

Typically, the host computer takes ($\Delta X$, $\Delta Y$) events and moves the cursor by the indicated amount in each axis, thus reconstructing the finger position on the screen as the successive $\Delta X$ and $\Delta Y$ values are accumulated. So far, this is standard cursor control behavior where edge motion is not considered.

According to the present invention, when the finger is reported as being in the outer zone 242, the edge motion feature of the present invention may be enabled. The determination of whether the finger is in the outer zone is a simple determination:

$$[-X_0 < X_{cur} < X_0] \text{ is FALSE, OR } [-Y_0 < Y_{cur} < Y_0] \text{ is FALSE} \quad [\text{Eq. 11}]$$

Figure 12A:
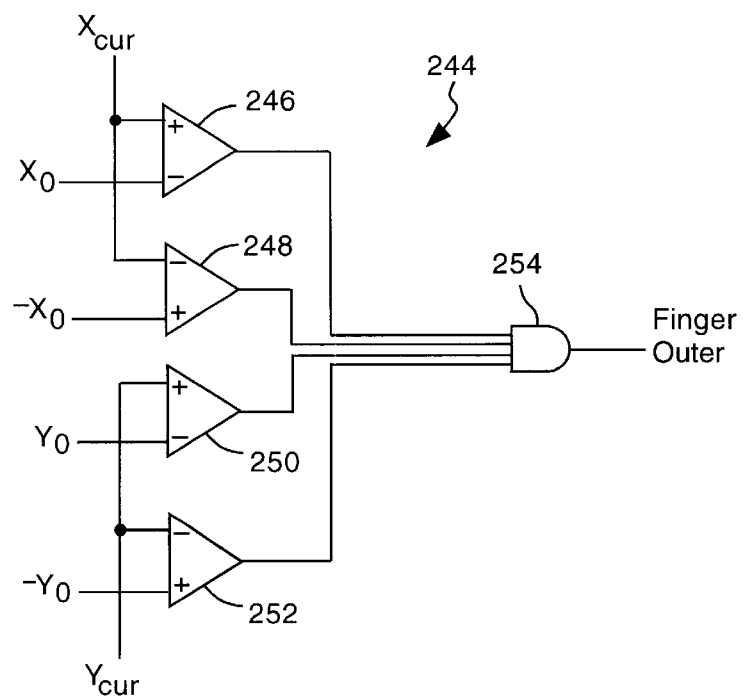
FIG. 12A is a schematic diagram illustrating a first hardware implementation of the determination of whether a finger or other object is present in the peripheral regions of the sensing plane.

Referring now to FIG. 12A, a circuit 244 for making a determination of whether a finger is in the outer zone 242 is shown in schematic diagram form. FIG. 12A illustrates a hardware embodiment for determining whether a finger is in the outer zone 242, but those of ordinary skill in the art will readily recognize that this determination could readily be made by performing one of a number of equivalent software routines. Such software routines are obvious and straightforward from the functions described herein.

Circuit 244 includes digital comparators 246, 248, 250, and 252, which may be straightforwardly implemented by conventional logic. Comparator 246 puts out a true signal when the quantity $X_{cur}$ at one of its inputs is greater than the fixed quantity $X_0$ presented to its other input. Comparator 248 puts out a true signal when the quantity $X_{cur}$ at one of its inputs is less than the fixed quantity $-X_0$ presented to its other input. Comparator 250 puts out a true signal when the quantity $Y_{cur}$ at one of its inputs is greater than the fixed quantity $Y_0$ presented to its other input. Comparator 252 puts out a true signal when the quantity $Y_{cur}$ at one of its inputs is less than the fixed quantity $-Y_0$ presented to its other input.

The outputs of comparators 246, 248, 250, and 252 are ORed together by OR gate 254. As will be appreciated by those of ordinary skill in the art, the FingerOuter signal output of OR gate 254 is true only when the necessary conditions of Eq. 11 are satisfied.

It is presently preferred that the edge motion aspect of the present invention may be selectively enabled or disabled by a user. When the edge motion feature is enabled and the finger is reported as being in the outer zone as set forth above, a second component is added to the ($\Delta X$, $\Delta Y$) events reported:

$$\Delta X = A(X_{cur} - X_{old}) + S(X_{cur} - X_{center}) \quad [\text{Eq. 12}]$$

$$\Delta Y = A(Y_{cur} - Y_{old}) + S(Y_{cur} - Y_{center}) \quad [\text{Eq. 13}]$$

where $X_{center}$ is the X coordinate of the center of the pad, $Y_{center}$ is the Y coordinate of the center of the pad, and S is a multiplicative factor for speed. S should be chosen such that the movement of the cursor is at a comfortable speed on the display screen.

For example, if the finger is held a good distance to the right (so that $X_{cur} > X_0$), then the cursor will tend to "glide" to the right at a constant speed set by multiplicative speed factor S in Eqs. 12 and 13. This factor can be adjusted to individual taste of a user.

If the touch sensor array 22 has different dimensions in X and Y, it is useful to set the multiplicative speed factor S parameters in the X and Y directions to differ by the same ratio as the pad dimensions, so that a finger held at the left or right edge of the touch sensor array 22 will produce the same cursor speed as a finger held at the top or bottom edge. In the presently preferred embodiment of the touch sensor array 22, there are 24 X traces and 18 Y traces. Therefore, since X is 4/3 wider than Y (24 traces vs. 18 traces), the X multiplicative speed factor $S_X$ is set to be to be 3/4 as large as the multiplicative speed factor $S_Y$.

The glide speed of the cursor during edge motion is clearly a direct function of the distance of the finger from the center of the pad, and the glide direction is equal to the direction of the finger from the center. If the outer zone has the preferred "edge margin" shape as shown in FIG. 11, then the finger will always be roughly the same distance from the center whenever edge motion is activated (within a factor of the square root of 2=1.41, assuming a square pad). Thus, the psychological effect is that edge motion involves a constant glide speed where the direction is set by the position around the touch sensor array 22 edge.

The square root of 2 variation may be canceled out by dividing the edge motion terms in equations (12 and 13) by a normalizing factor of the form:

$$\sqrt{(X_{cur}-X_{center})^2+(Y_{cur}-Y_{center})^2}$$ [Eq. 14]

but this is a computationally intensive step applied to fix a problem that is barely noticeable to the average user; thus, it may be omitted.

As discussed above, when a finger is in the outer zone, the FingerOuter signal, which is a global signal for both the X and Y axis, is made true, and increments are added to the ($\Delta X$, $\Delta Y$) events pursuant to Eqs. 12 and 13. Because increments corresponding to $S(X_{cur}-X_{center})$ and $S(Y_{cur}-Y_{center})$ are added in the X and Y directions, respectively, for the ($\Delta X$, $\Delta Y$) events, the direction of the cursor motion will be along a vector from, the center of the pad to the finger position. In graphical environments, there are many vertical and horizontal objects and use of edge motion may incur some unintended results. For example, if a user in a graphical environment pulls down a tall pop-up menu, the user may need the assistance of the edge motion feature to reach the bottom of the menu. In this case, however, the direction of the cursor motion may cause the cursor to slide off the pop-up menu, when the user actually wants the cursor to move in a vertical motion along the Y axis.

In another embodiment of the edge motion feature of the present invention, the direction of the cursor motion will be orthogonal to the edge motion boundary the finger has crossed in traveling to the outer zone.

For example, when a finger crosses either of the edge motion boundaries corresponding to the X axis (the right and left edges of the touchpad) and travels into the outer zone, the direction of cursor motion due to the orthogonal edge motion feature will be only along the X axis. Any cursor motion in the Y direction while the finger is in the outer zone corresponding to the X axis will occur in a normal fashion, i.e. not according to an edge motion feature. Analogously, when a finger crosses either of the edge motion boundaries corresponding to the Y axis (the top and bottom edges of the touchpad) and travels into the outer zone, the direction of cursor motion due to the edge motion feature will be only along the Y axis. Any cursor motion in the X direction while the finger is in the outer zone corresponding to the Y axis will occur in a normal fashion, i.e. not according to an edge motion feature. It should be appreciated, however, that when the finger enters into any of the four corners of the pad, thus crossing both X and Y edge motion boundaries, edge motion will essentially be along a vector from the center of the pad to the finger in the corner.

Unlike the edge motion feature which uses a global FingerOuter signal to indicate that the finger is in the outer zone, the orthogonal edge motion feature has two signals. One is X FingerOuter and the other is Y FingerOuter. X FingerOuter is true when a finger crosses either of the boundaries corresponding to the X axis, which in the preferred embodiment are on the right and left edges of the touch pad, and Y FingerOuter is true when a finger crosses either of the boundaries corresponding to the Y axis, which in the preferred embodiment are on the top and bottom edges of the touch pad.

Figure 12B:
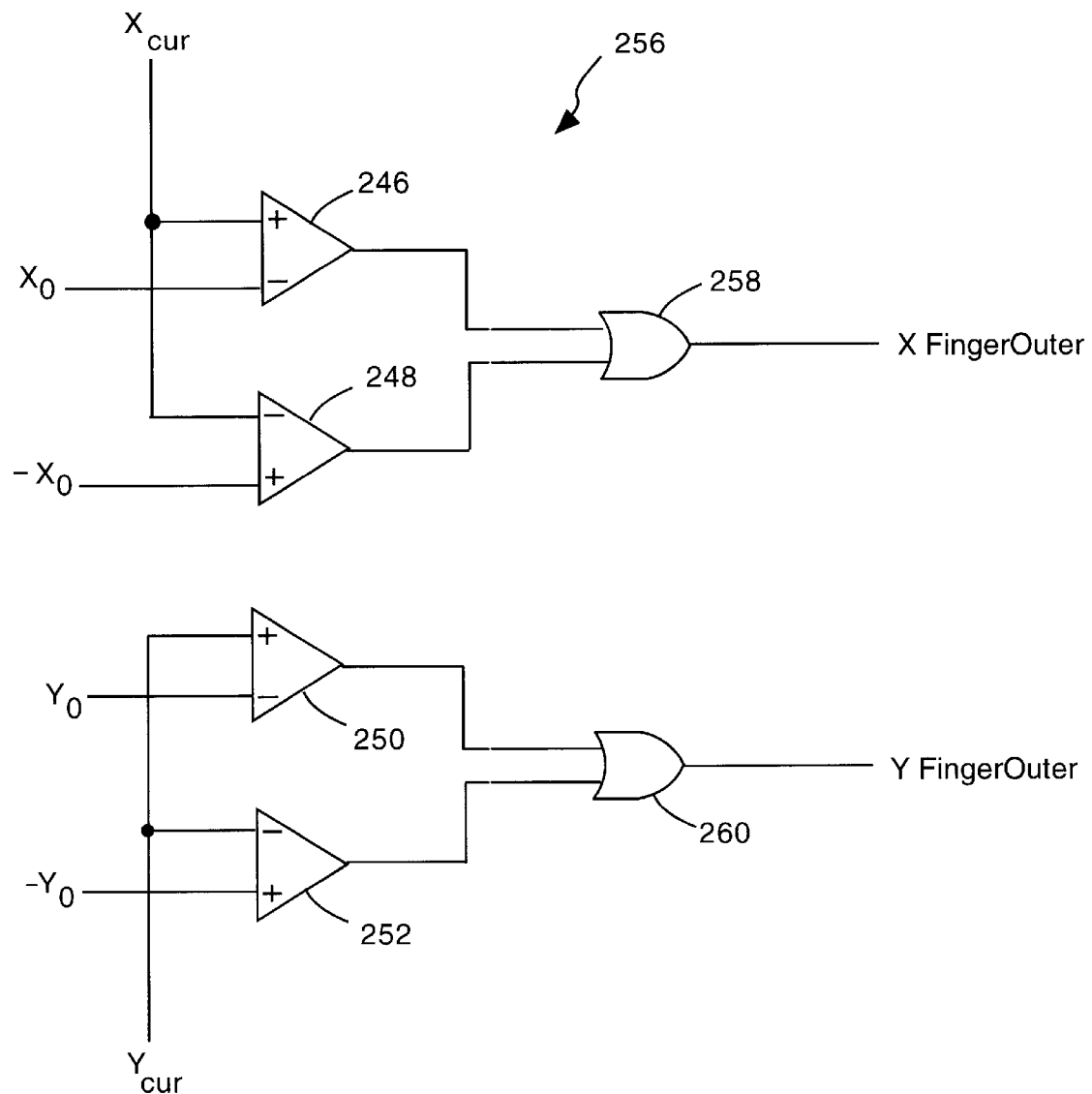
FIG. 12B is a schematic diagram illustrating a first hardware implementation of the determination of whether a finger or other object is present in the peripheral regions of the sensing plane.

In FIG. 12B, a schematic is shown of the hardware used in making the determination of whether a finger is in the outer zone according to the orthogonal edge motion feature.

It will be appreciated by those of ordinary skill in the art that the circuit shown in FIG. 12B could be implemented with an equivalent software routine. Where it is appropriate, FIG. 12B uses the same reference numerals shown in FIG. 12A.

Referring now to FIG. 12B, circuit 256 includes digital comparators 246, 248, 250 and 252 which may be implemented by conventional logic. Comparator 246 puts out a true signal when the quantity $X_{cur}$ at one of its inputs is greater than the fixed quantity $X_0$ presented to its other input. Comparator 248 puts out a true signal when the quantity $X_{cur}$ at one of its inputs is less than the fixed quantity $-X_0$ presented to its other input. Comparator 250 puts out a true signal when the quantity $Y_{cur}$ at one of its inputs is greater than the fixed quantity $Y_0$ presented to its other input. Comparator 252 puts out a true signal when the quantity $Y_{cur}$ at one of its inputs is less than the fixed quantity $-Y_0$ presented to its other input.

The outputs of comparators 246 and 248 are ORed together by OR gate 258. When the condition satisfied by:

$-X_0<X_{cur}<X_0$ is FALSE a TRUE signal, X FingerOuter, will be output from OR gate 258.

The outputs of comparators 250 and 252 are ORed together by OR gate 260. When the condition satisfied by:

$-Y_0<Y_{cur}<Y_0$ is FALSE a TRUE signal, Y FingerOuter, will be output from OR gate 260.

Accordingly, an X FingerOuter signal will result in a value being added to the $\Delta X$ event in an amount determined by $S(X_{cur}-X_{center})$ as set out in Eq. 12. However, because the only time this component will be added is when an X axis edge motion boundary has been crossed, i.e. no additional component determined by $S(X_{cur}-X_{center})$ is added to the $\Delta X$ event when only a Y axis edge motion boundary has been crossed, the component added to the $\Delta X$ event will be approximately constant because $X_{cur}-X_{center}$ is approximately constant.

A Y FingerOuter signal will result in a value being added to the $\Delta Y$ event in an amount determined by $S(Y_{cur}-Y_{center})$ as set out in Eq. 13. However, because the only time this component will be added is when a Y axis edge motion boundary has been crossed, i.e. no additional component determined by $S(Y_{cur}-Y_{center})$ is added to the $\Delta Y$ event when only an X axis edge motion boundary has been crossed, the component added to the $\Delta Y$ event will be approximately constant because $Y_{cur}-Y_{center}$ is approximately constant.

Accordingly, the orthogonal edge motion feature permits cursor motion in only the eight "compass" directions. For, example, if the finger is on the left edge of the touchpad, the orthogonal edge motion feature causes the cursor to glide left along the X axis, since X FingerOuter is TRUE and Y FingerOuter is FALSE. The same is true for the right edge of the pad, except the cursor will glide right along the X axis. Those of ordinary skill in the art will recognize the corresponding movements for the upper and lower edges of the pad. When the finger is in any of the corners of the pad, X FingerOuter and Y FingerOuter are both TRUE, and the motion will be along a 45 degree angle (assuming a square touchpad) from the corner of the pad to where the finger is placed.

The edge motion feature of the present invention can be confusing if the user does not expect it. Since edge motion is most useful in connection with the drag gesture, it is presently preferred to arrange for it to occur only during a drag, i.e., only when the gesture logic is virtually "holding the mouse button down." The drag gesture and other gestures are implemented by gesture unit 20 of FIG. 1.

At times when the edge-motion function is not desired, the outer zone 242 "goes away" (i.e., is ignored) and the inner zone 240 effectively expands to cover the entire sensing plane 10. It has been found that this is much less confusing in practice, probably because the user is more likely to be consciously aware of the cursor control device during a drag gesture than during simple cursor motions.

Assuming the preferred zone boundary shape of FIG. 11, the following algorithm may be employed to implement the edge motion feature of the present invention:

IF NOT($-X_0<X_{cur}<X_0$ AND $-Y_0<Y_{cur}<Y_0$)
AND (optionally) a drag gesture in progress, THEN
Let $eX=S_X(X_{cur}-X_{center})$
Let $eY=S_Y(Y_{cur}-Y_{center})$
ELSE
Let $eX=eY=0$
END IF Otherwise, for orthogonal edge motion, the algorithm is as follows:

IF NOT($-X_0<X_{cur}<X_0$)
AND (optionally) a drag gesture in progress, THEN
Let $eX=S_X(X_{cur}-X_{center})$
ELSE
Let $eX=0$
END IF
IF NOT ($-Y_0<Y_{cur}<Y_0$)
AND (optionally) a drag gesture in progress, THEN Let
$eY=S_Y(Y_{cur}-Y_{center})$
ELSE
Let $eY=0$
END IF Next, the dX and dY motion terms are computed from the regular algorithm:

i.e., Let $dX=A(X_{cur}-X_{old})$
Let $dY=A(Y_{cur}-Y_{old})$

Finally, the resultant packet ($\Delta X=dX+eX$, $\Delta Y=dY+eY$) is transmitted to the host computer. Those of ordinary skill in the art will recognize that a linear proportionality is described by the above equation. As used herein, "proportionality" means that the signal generated is a monotonic function. Those of ordinary skill in the art will recognize that other monotonic functions, including but not limited to inverse proportionality, and non-linear proportionality such as logarithmic or exponential functions, could be employed in the present invention without departing from the principles disclosed herein.

Figure 13:
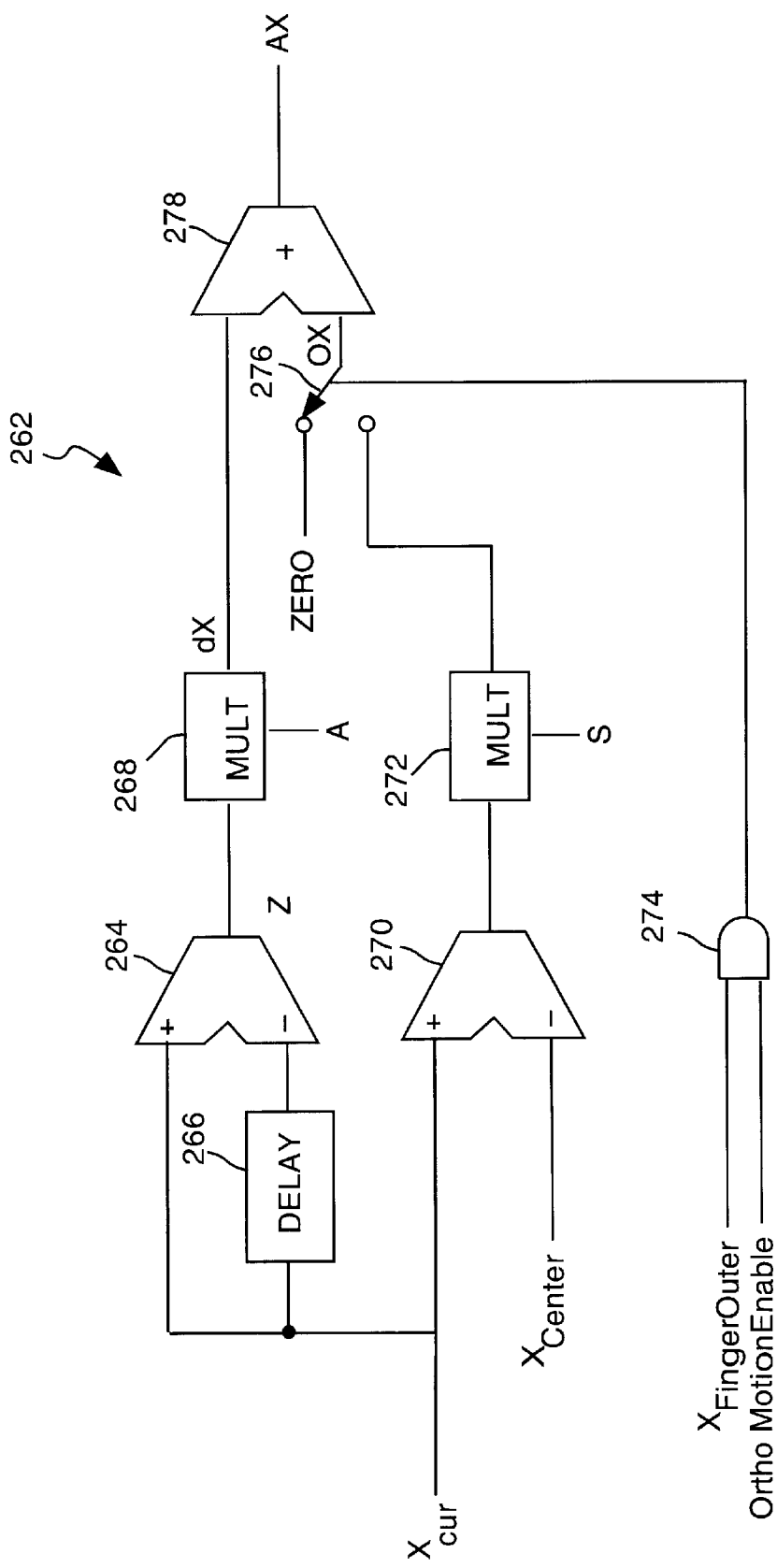
FIG. 13 is a schematic diagram illustrating hardware implementation of the edge motion feature of the present invention.

A hardware implementation of this algorithm is illustrated in FIG. 13 in schematic diagram form. While edge-motion circuit 262 is shown implemented in the X direction only, those of ordinary skill in the art will recognize that an identical circuit will also be employed in the Y direction. Such skilled persons will also immediately appreciate the complete equivalence of implementing the hardware solution of FIG. 13 as a software routine.

Edge-motion circuit 262 includes a subtractor circuit 264 in which the previous value of $X_{cur}$, stored in delay 266, is subtracted from the present value of $X_{cur}$. The output of subtractor circuit 264 is presented to multiplier 268, which multiplies the result by the gain factor "A". The output of multiplier 268 is the term dX.

The term $X_{cur}$ is also presented to subtractor circuit 270 in which the value of $X_{center}$ is subtracted from the present value of $X_{cur}$. The output of subtractor circuit 270 is presented to multiplier 272, which multiplies the result by the gain factor "S" to obtain the value of the eX term. It will be appreciated that with orthogonal edge motion subtractor circuit 270 and multiplier 272 are not required and a constant value can be provided for the eX term, whose sign is positive if $X_{cur}>X_{center}$ or negative if $X_{cur}<X_{center}$.

A two-input AND gate 274 has its input terms the value FingerOuter from the circuit of FIG. 12A and the value MotionEnable which is a toggled on/off enable signal for the edge motion feature of the present invention. If both FingerOuter and MotionEnable are true, switch 276 is configured to pass the output of multiplier 272 to adder circuit 278. If either FingerOuter or MotionEnable is false, then switch 276 is configured to pass the value zero to adder 278. The output of switch 276 is the eX term. The output of adder 278 is passed to the host computer as $\Delta X$. The MotionEnable signal can be controlled by the user, e.g., by a control panel. Alternatively, it may be controlled by the gesture unit as will be more fully disclosed.

It should be appreciated that when orthogonal edge motion instead of edge motion is being enabled, the two-input AND gate 274 has as its input terms the value X FingerOuter from the circuit of FIG. 12B (or the value Y FingerOuter from the circuit of FIG. 12B for the Y direction) and the value OrthoMotionEnable which is a toggled on/off enable signal for the edge motion feature of the present invention. If both X FingerOuter and OrthoMotionEnable are true, switch 276 is configured to pass the output of multiplier 272 to adder circuit 278. If either X FingerOuter or OrthoMotionEnable is false, then switch 276 is configured to pass the value zero to adder 278. The output of switch 276 is the eX term. The output of adder 278 is passed to the host computer as $\Delta X$. The OrthoMotionEnable signal can be controlled by the user, e.g., by a control panel. Alternatively, it may be controlled by the gesture unit as will be more fully disclosed.

In an alternate form, the dX term may be replaced by the eX term, and likewise for dY and eY, when the finger is in the "outer" zone, rather than adding the two terms in that zone. This results in a more "pure" edge motion which is harder for the user to guide. User tests have shown that the dX+eX form shown above feels better and is easier to use.

Another alternative which is functional but has been found to be less desirable employs a somewhat wider outer zone. The glide speed is then varied in proportion to the distance of the finger into the outer zone rather than the distance from the center of the pad. Thus, as the finger enters the outer zone the glide speed starts at zero and increases to some reasonable limit as the finger reaches the edge of the pad. The result is a smoother transition between edge-motion and normal behavior. It is not difficult to modify the above formulas to produce this alternate behavior. This variant was tried by the inventors because the transition into edge-motion mode seemed too abrupt; tests showed that this abruptness is actually a boon in typical use. The smooth transition is harder to "feel", and thus winds up being more, not less, likely to catch the user by surprise. Those of ordinary skill in the art will appreciate that a solution midway between the two described methods can also be employed to produce a less abrupt transition.

Alternate solutions to the long-distance drag problem have been to provide a "locking" drag or drag "extension", as will be disclosed herein.

The edge motion feature of the present invention is used advantageously with one or more finger gestures which may be performed by a user on the touch sensor array 22 and are recognized by the system. Of particular interest are the basic tap and drag gestures. The tap gesture is analogous to the clicking of the mouse button on a conventional mouse, and the concept of dragging objects is familiar to all mouse users.

Pointing devices such as mice typically include one or more mouse buttons. The user can point and click a button to select an object on the screen, or hold the button down and move the mouse to drag an object around the screen. Touch sensor pointing devices can offer "gestures," which are special finger motions that simulate mouse button actions without the need for physical switches. (Since gestures may be difficult for novices or users with disabilities, it is preferable to provide physical switches as well.) In the following discussion, the word "finger" should be interpreted as including a stylus or other conductive object as previously described.

Referring back to FIG. 1, according to another aspect of the present invention, gesture unit 20 examines the (X,Y,Z) data produced by arithmetic unit 16 to produce one or more "virtual mouse button" signals to be sent along with the (ΔX, ΔY) signals to the host.

Figure 14:
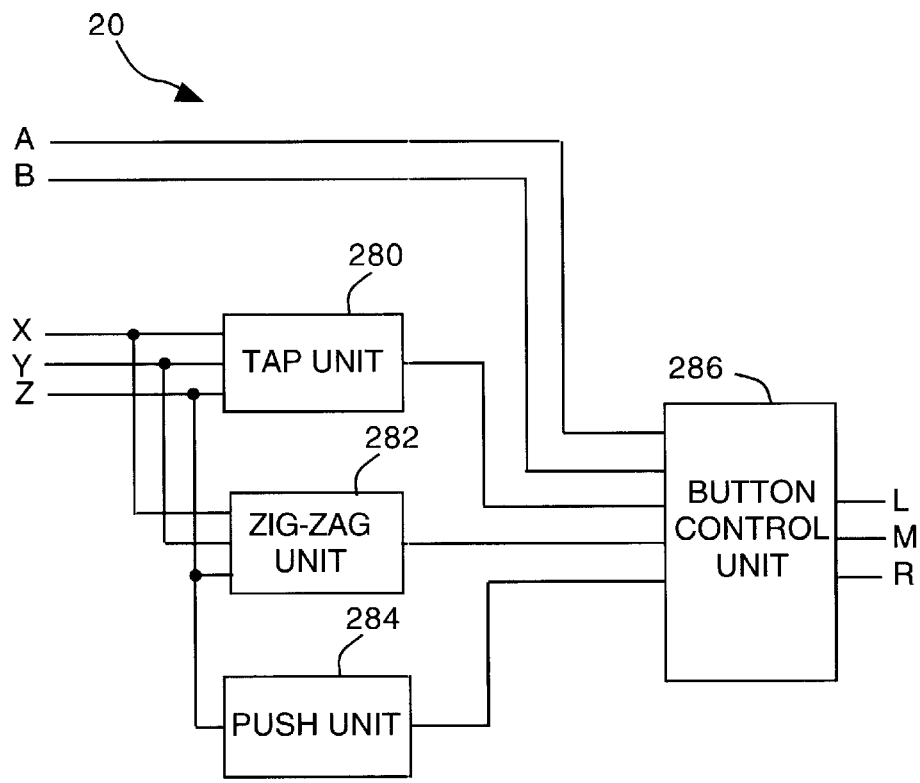
FIG. 14 is a more detailed block diagram of gesture unit 20 of FIG. 1.

FIG. 14 is a more detailed block diagram of gesture unit 20 of FIG. 1. According to the present invention, gesture unit 20 of the present invention is capable of supporting a variety of gestures. Gesture unit 20 includes tap unit 280, zigzag unit 282, push unit 284, and button control unit 286.

Some number of physical switches may be supported by gesture unit 20. In the illustrative example of FIG. 14, two inputs A and B to button control unit 286 come from physical switches. Such switches may be mounted on the touchpad module itself or provided externally. Any number of switches may be provided, or none at all. The inputs A and B have two states, logic "0" and logic "P". Those of ordinary skill in the art will recognize that, instead of mechanical switches, the switch signals could be implemented by special touch sensors, operated by charge integrators similar to units 44 which feed into threshold comparators to form digital signals.

Tap unit 280, zigzag unit 282, and push unit 284 examine the sequence of (X,Y,Z) samples to look for various types of gestures. The outputs of all these units, plus the switch signals, are combined in button control unit 286 to produce the actual button-press signals sent to the host. In the illustrative example disclosed herein, the touchpad simulates a three-button (Left, Middle, Right) pointing device. The system of FIG. 14 could clearly be extended to support other gestures than those described here, or to support fewer gestures in the interest of simplicity.

Button control unit 286 can use any of several well-known methods for combining multiple signals. For example, a priority ordering can be established among the various sources, or each button output (Left, Middle, and Right) can be asserted ("clicked", "pressed" or "held down") whenever any of the sources indicate that button. Any particular method of combining these signals is a routine design detail dependent on a particular system configuration which may be easily implemented by persons of ordinary skill in the art.

In a presently preferred embodiment, the button control unit 286 maps both switches and gestures to the most commonly used virtual buttons, giving maximum flexibility to the user. In an alternate embodiment, switches and gestures can be mapped to different virtual buttons so that a larger number of virtual buttons can be covered without resort to exotic gestures. Or, the user can be offered a choice of mappings.

It is well known in the art to allow extra button switches to be processed as specialized commands, such as double-clicking, selecting commonly used menu items, etc., instead of their normal role as mouse buttons. Similarly, the button control unit 286 or host software could map some of the gestures described here to software commands instead of simulating mouse buttons. Such processing and mapping is well within the realm of ordinary skill in the art.

The tap unit 280 decodes the most basic gestures, including taps, drags, hops, and tap zones. These gestures are illustrated as timing diagrams in FIGS. 15a through 15e. In each of FIGS. 15a through 15e, two signals are shown graphed against time; one is the analog "Z" (finger pressure) signal, the other is the digital "Out" (virtual button press) signal. The various relevant time spans are shown with labels "t1" through "t21".

The basic "tap" gesture is a quick tap of the finger on the pad. Such a tap, of short duration and involving little or no X or Y finger motion during the tap, is presented to the host as a brief click of the mouse button. If a multi-button mouse is simulated, the tap gesture may simulate a click of the "primary" mouse button, or the button to be simulated may be user-selectable using a shift key, control panel, or other known means. Two taps in rapid succession are presented to the host as a double click of the button. In general, multiple taps translate into multiple clicks in the obvious and natural way.

Because it is impossible to tell whether a finger stroke will be a valid tap (as opposed to a cursor motion) while the finger is still down, the device of the presently preferred embodiment does not report a button click until the finger is lifted. This delay is not generally noticeable to the user since taps by definition are very brief strokes.

A small amount of motion may occur during the tap stroke, due to such factors as the natural deformation of the fingertip under pressure. This can cause the virtual click created by the tap gesture to select the wrong item or location on the screen. To avoid this, either the motion must be suppressed until the motion is great enough, or the duration long enough, to disqualify a tap, or the motion must be allowed but then retroactively canceled out once the tap gesture is recognized. The latter solution is preferable, since even a small amount of suppressed motion is noticeable to the user.

According to the presently preferred embodiment of the invention, motion events are sent to the host as usual, and also recorded in a register or queue. When the tap gesture is recognized, a corresponding negative amount of motion is quickly replayed in order to "undo" the already-reported motion and to restore the original cursor position as of the moment the finger's presence was first detected. The motion during the stroke may have been sent to the host in the form of a sequence of several packets. For greatest precision, this sequence can be saved and replayed in reverse. However, if the host's motion processing is linear, it will suffice to accumulate the total amount of motion during the stroke and send a compensating motion in a single packet. Since the "acceleration" feature of a typical mouse driver activates only at high speeds, this assumption of linearity is usually safe in this context.

The inputs considered by tap unit 280 are CurPos, the current (X,Y) finger position from the arithmetic unit; Z, the current pressure value; and CurTime, the current time in some suitable units of time (such as milliseconds or number of samples processed).

There are nine state variables used in tap unit 280. TapState is NONE if there is no gesture in progress, TAP if there is a tap or drag gesture in progress, and LOCKED if there is a locking drag or drag extension in progress. TapOkay is TRUE if a high enough Z value has been seen in the current stroke for the stroke to qualify as a tap. DownPos is the (X,Y) position at which the finger last touched down on the pad. DownTime is the time at which the finger last touched down. UpPos and UpTime record the position and time at which the finger last lifted from the pad. TapButton is one of LEFT, MIDDLE, or RIGHT, identifying whether the current gesture is simulating an action on the left, middle, or right virtual mouse button, respectively. Suppress is TRUE if the virtual buttons are being suppressed for a double click. Finally, Out represents the output of the tap unit, and is one of NONE, LEFT, MIDDLE, or RIGHT.

Several parameters are used to control the tap unit. TapTime is the maximum duration of a stroke to qualify as a tap gesture. DragTime is the maximum interval between the initial tap and the return of the finger to form a drag gesture. ExtendTime is the maximum amount of time the finger can be off the touchpad during a drag extension gesture before the drag gesture will end. HopTime is the maximum lift time preceding a tap to qualify as a hop. TapRadius is the maximum amount of motion that can occur during a tap. DragRadius is the maximum distance between the initial tap and the return of the finger for a drag. DragExtendRadius is the minimum distance between finger lift-off and finger touchdown needed to qualify as a drag extension. HopDistance is the minimum distance moved to qualify for a hop. Zthresh is the minimum pressure (Z) to detect a finger. DragExtendSpeed is the minimum smoothed speed required during finger lift-off to qualify as a drag extension. In the claims herein, steps reciting "detecting the presence" of a finger or other object (or other words to that effect) assume that a pressure greater than Zthresh has been detected. Finally, Ztap is the minimum Z to detect a tapping finger.

Figure 15A:
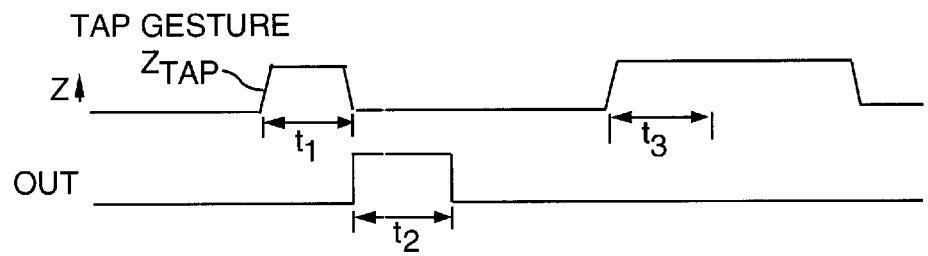
FIGS. 15a through 15g are timing diagrams illustrating some of the gestures which may be recognized according to the present invention.

FIG. 15a shows the timing of a basic tap gesture. First, a successful tap is shown, followed by a finger stroke which is too long to qualify as a tap. In the first stroke, the finger is down for time "t1", which is less than TapTime. Also (not shown on FIG. 15a) the (X, Y) motion during time "t1" is less than TapRadius. Finally, the Z signal exceeds threshold Ztap for at least some part of the stroke. Thus, the stroke qualifies as a tap. The Out signal (the lower trace of FIG. 15a) becomes true for a certain amount of time "t2", then becomes false. As will be discussed later, the amount of time "t2" is equal to DragTime. In the device described in the flowcharts to follow, the TapState variable will equal TAP for the entire interval "t2". As presently preferred, TapTime is about 400 msec, TapRadius is about 2% of the width of the sensor pad, and Ztap is slightly larger than Zthresh, whose value is adjustable by the user.

On the right half of FIG. 15a, the finger is held down for longer than the parameter TapTime, shown on the figure as "t3". Thus, it will not qualify as a tap gesture and no Out signal is generated from this stroke.

In the basic drag gesture, the user taps once, quickly brings the finger back in contact with the pad, then moves the finger in a desired direction in the XY plane of the pad. The simulated mouse button is depressed at the beginning of the drag gesture and is released only when the finger is again lifted from the pad. Gesture logic arranges for the initial tap of the drag gesture to be merged into the extended drag rather than presenting the host with an additional distinct button click.

In a variation of the drag gesture, the above-described gesture begins a drag which continues even when the finger is lifted. The drag ends (i.e., the simulated mouse button is released) when the finger is again tapped on the sensor pad. This feature is known as "locking drag". Locking drag allows dragging over longer distances than can be covered by a single finger motion on a small pad, but it can be highly confusing if it is activated by mistake. The locking drag becomes a hidden mode, a well-known undesirable item in the study of user interfaces. Thus, in the preferred embodiment it is presented to the user as an option which is disabled by default.

In another embodiment of the drag gesture, the above-described gesture will continue even though the finger has been lifted, if the finger comes back down to the touch pad within a specified period of time referred to as a drag timeout. This feature is referred to as drag "extension". The drag timeout period is presently preferred as 500 msec, but will be optimized, as will be appreciated by those of ordinary skill in the art, with user studies. Of course, a drag gesture will end if the finger is removed from the touchpad and not returned within the drag timeout.

Accordingly, with the drag extension feature enabled, when the finger is lifted off the pad for less than the drag timeout, the drag gesture will continue, but when the finger stays off the touchpad for a period greater than the timeout, the drag gesture ends. This gives the user the ability to "stroke" or "row" repeatedly to. drag a long distance. Unlike locking drag, drag extension does not appear to the user as a hidden mode, since the end of the drag occurs after the drag timeout, a very short time period in human perception, if the finger does not return to the touch pad in time.

However, a problem can arise with drag extension because the drag continues through the drag timeout, even though the drag ends. There may be occasions when the user wants the drag to end immediately, e.g. when the drag gesture is being used to hold down a scroll bar arrow. Generally, these arrows auto-repeat until the user releases the mouse button. The continuation of the drag gesture during the drag timeout would cause the scrolling feature to scroll past the desired stopping place.

Accordingly, the drag gesture may actually represent two different gestures. A true drag, where the cursor is moved around while the virtual button is being held down, and a press, where the cursor remains stationary while the virtual button is being held down. The drag extension feature is only desired for a true drag. There are several ways to distinguish between a true drag and a press. A true drag can be identified if the finger's speed of motion prior to lift-off is above a small threshold. A press can be identified if the finger was stationary through the entire gesture, possibly ignoring small, inconsequential movements, or just at the time of finger lift-off. In the preferred embodiment of the drag extension gesture of the present invention the distinction between -a true drag and a press is identified by the finger speed at lift-off being above a specified threshold. The finger speed at lift-off is obtained as the output of a running average filter. If the speed is below the specified threshold, the drag ends rather than being, extended. In an alternative embodiment, the distinction between a true drag and a press may be identified by the position of the finger at lift-off. If the finger is within a selected distance from the edge of the pad at lift-off a true drag is identified.

A second potential problem may occur while using drag extension if the user begins a new unrelated finger action during the ExtendTime period. As discussed above, when drag extension is enabled, a drag will continue even though the finger has been lifted from the touch pad if the finger is brought back to the touch pad within the drag timeout. It may be that the user actually wants the drag to end when the finger is lifted, and to begin a new gesture when bringing the finger back down to the touchpad. One way to determine whether the drag gesture is continuing or is being ended and a new finger action begun is to compare the lift-off finger position and the touchdown finger position. Usually, a subsequent stroke of an extended drag would not begin at the spot where the previous stroke had ended. Therefore, if the finger comes down within a specified distance from the lift-off position (within the specified drag timeout), then the drag extension feature allows the drag to continue, otherwise the drag ends immediately. It will be appreciated, however, by those of ordinary skill in the art that the drag extension feature may be implemented, though not preferably, without comparing the finger position at touch down with the finger position at lift-off, and further, that the drag need not end immediately.

The "edge motion" feature described previously serves as an alternate way to accomplish long-distance drags.

The drag gesture is implemented as follows. When a tap is recognized, the virtual mouse button is depressed as previously described. However, the virtual mouse button is not released until the finger has remained away from the pad for a sufficient amount of time to disqualify as a drag gesture. This amount of time DragTime should be chosen to be long enough to allow for a comfortable drag gesture, but short enough so that the click arising from a tap gesture is still reasonably brief. As presently preferred, a time of about 200 msec is used.

Figure 15B:
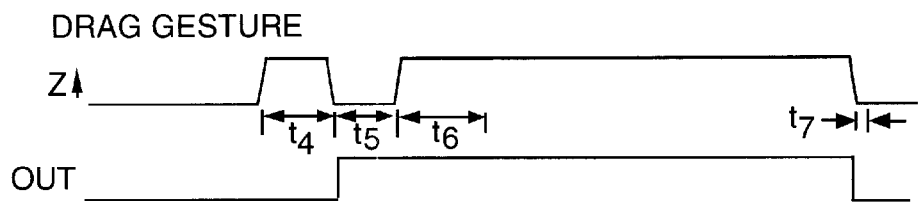

As shown in FIG. 15b, the drag gesture begins with a tap as described above, of duration "t4" which is less than TapTime. The Out signal goes high in response to this tap. The finger remains away from the pad for a period "0" which is less than DragTime, then it returns to the pad and remains for a time "t6" which is longer than TapTime. This qualifies the gesture as a drag. The Out signal remains high until the finger is finally released at time "t7". In the implementation of FIG. 15b, the time "t7" between the removal of the finger and the release of the virtual mouse button is zero; in other similar implementations this might be nonzero but small, e.g., equal to DragTime. Note that TapState will equal TAP for the entire interval from "t5" to "t7".

There are a number of alternatives which can be considered for the timing of DragTime. FIG. 15a shows the interval "t2", which is also the upper limit on the interval "t2", as being exactly equal to the parameter DragTime. In one alternative, DragTime is measured relative to Down-Time instead of UpTime, which is equivalent to saying that the intervals "t1" and "t2" ("t5" and "t6", respectively) must sum to DragTime. A consequence of this method is that in the basic tap gesture, a longer, slower tap causes a briefer virtual button click. This contradiction makes this approach less satisfying to the user than the one shown in FIGS. 15a–b.

In an another alternative, DragTime is made proportional to the length of interval "t1" ("t5" respectively), so that a brief tap produces a brief virtual button click, and a longer tap (up to the limit TapTime) produces a longer click. This alternative gives the user more control over the simulated button click, but it makes the behavior depend on what the user may perceive as an insignificant feature of the tapping action.

There are several ways to make the duration of DragTime "proportional" to the length of interval "t1". In one case, the length of the virtual button click or DragTime is a direct function of the length of the tap by the user. As described in the previous paragraph a brief tap produces a brief virtual button click, and a longer tap produces a longer click. This approach seems to provide an advantage to novice users who usually tap more slowly and also require a longer period of time (longer DragTime) to bring the finger back down to begin a drag gesture. Unfortunately, the longer DragTime also results in a longer virtual button click (OUT signal) which may have undesirable side effects, including unintentional scroll bar auto-repeating or "stuttering".

A preferred approach when differentiating between novice and expert taps is to recognize taps of different lengths, but to make the virtual button click or OUT signal the same length for different tap lengths. However, when a novice tap is recognized, the timing of the OUT signal will be delayed, so that novice users will have a longer DragTime to begin a drag gesture. It will be appreciated by those of ordinary skill in the art that the length of taps used to differentiate between novice and expert users will be optimized after user studies. It should also be recognized that there are other ways to differentiate between novice and expert users. For example, the pressure of a novice tap is often greater than the pressure of an expert tap. Additionally, it may also be beneficial to use a history of tap lengths, for example, the averaged length of several previous taps. Those of ordinary skill in the art will also recognize that the decision between novice and expert could be made by the user at a control panel.

Figure 15C:
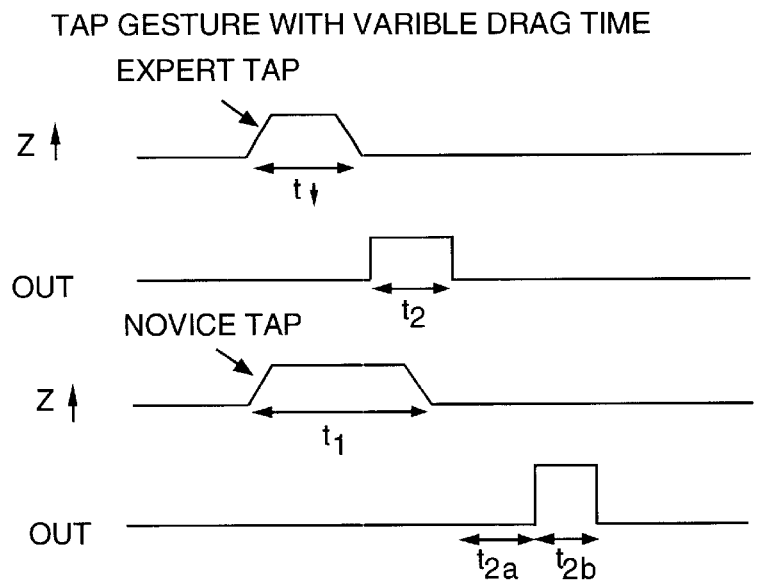

Referring now to FIG. 15C, the preferred embodiment of a variable DragTime as a function of tap length is illustrated. On one hand, as presently preferred, an expert tap is seen having a duration for the interval "t1" of less than 200 msec. The virtual button click or OUT signal of 200 msec in the interval "t2" begins as soon as the finger comes off the pad, thus providing the expert with the fastest possible response. To begin a drag gesture the finger would have to come back down on the touchpad before the 200 msec virtual button click time ended. Thus, the variable DragTime is chosen to be 200 msec in the preferred embodiment, thus reducing the chances of an expert's quick finger actions being incorrectly interpreted as a drag gesture.

On the other hand, a novice tap is seen having a duration for the interval of between 200 msec and 500 msec (in the preferred embodiment, strokes longer than 500 msec would be disqualified as taps). The virtual button click or OUT signal of 200 msec in the interval "t2b" begins after a delay "t2a" of 300 msec, and as a result the user will have a longer DragTime of 500 msec in which to begin a drag gesture. Those of ordinary skill in the art will recognize that the length of the delay may be chosen in several different ways, including as a function of the tap duration. Similarly, the other time-related parameters of gesture recognition such as HopTime and ExtendTime can be adjusted when novice taps are involved. If the finger comes back down to begin a drag gesture before the delayed click has begun (i.e., during the "t2a" interval), then the virtual button click must begin immediately as the finger comes down. Otherwise, if this new finger stroke also turned out to be a tap, the first click of the resulting double-click could be subsumed in the "t2a" interval.

Figure 15E:
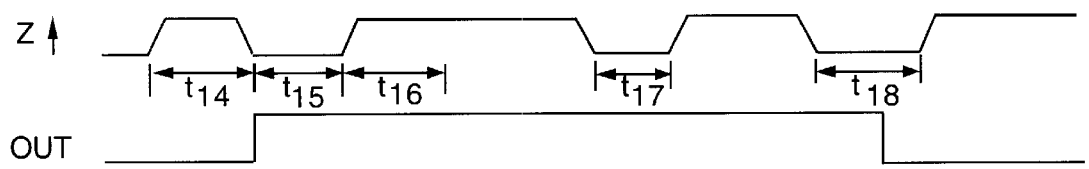
Figure 15D:
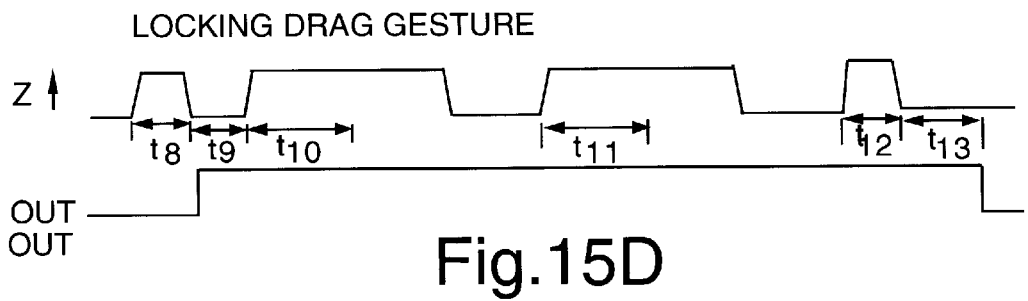

FIG. 15D shows the locking drag gesture. The locking drag begins with a standard drag gesture involving intervals "t8" through "t10". However, when the finger is raised, the Out signal remains high. (In the flowcharts, TapState will change from TAP to LOCKED at this time.) The figure shows a second dragging stroke of a length longer than TapTime (shown as "t11") which does not end the locking drag, followed by another stroke of length "t12" less than TapTime. Since this last stroke qualifies as a tap, it ends the locking drag at time "t13". In the flowcharts, TapState changes back to TAP at this time; a regular tap is then processed, which continues to hold Out high for a time "t13" equal to DragTime as usual. A reasonable alternative implementation might end the drag after a different interval "t13", such as zero.

FIG. 15E shows the drag extension gesture. The drag extension begins with a standard drag involving intervals "t14" through "t16". The finger is raised during interval "t17", but because the finger is off the touchpad for a length of time shorter than the drag timeout parameter ExtendTime, the OUT signal remains high. Also (not shown on FIG. 15E) the (X,Y) motion during "t17" is greater than DragExtendRadius and the smoothed average finger speed at the time of lift-off from the pad at the beginning of interval "t17" is greater than DragExtendSpeed. The figure shows the finger lifted for a second interval "t18". Since the period of time in which the finger is lifted from the touchpad during interval "118" is greater than ExtendTime, the OUT signal goes low a period of time equal to ExtendTime after the finger is lifted from the pad. It may be preferable to adjust ExtendTime for novice or expert users, as described previously for DragTime.

Figure 15F:
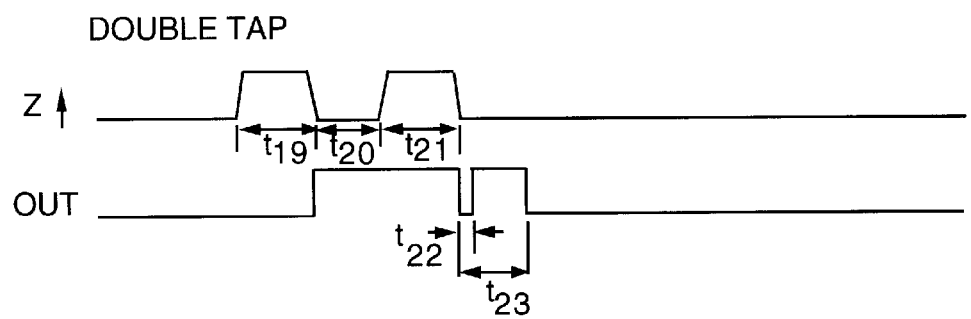

FIG. 15F shows a double tap gesture. The double tap starts out indistinguishably from a drag gesture. However, the second stroke "t21" is shorter than TapTime, thus qualifying as a second tap instead of a drag. Regular tap processing causes Out to remain high for another interval "t23" of length DragTime; however, special double tap handling shown in the flowcharts suppresses the virtual mouse button for a brief period "t22" after recognition of the tap. Thus, the host computer perceives two distinct clicks rather than the one long, run-together click that it would see without this special handling.

Other gestures may be used to simulate a multi-button mouse. In one such approach, the basic gestures are augmented by a "hop" gesture, in which the finger is lifted from its resting place in one location on the pad and tapped a substantial distance away from the resting place. If the distance is sufficiently great (HopDistance, typically a fraction of the width of the sensor pad; presently preferred to be about 25%) and the duration between the lift and the subsequent tap is less than a suitable threshold (HopTime, typically a fraction of a second; presently preferred to be about 0.5 sec.), then the click or drag gesture begun by the tap is simulated on a different mouse button. This different button may be a fixed "secondary" button, or it may be user-selectable by a control panel or other means, or it may be a function of the direction in which the finger hopped (e.g., to the left vs. to the right). According to a presently preferred embodiment of the invention, the hop gesture is available as an option which is off by default.

Note that, while some users prefer to tap with a second finger in the hop gesture, this gesture never involves more than one finger on the pad at any one time. A similar gesture, the "zigzag", is also described herein and does involve the use of two fingers at once.

Figure 15G:
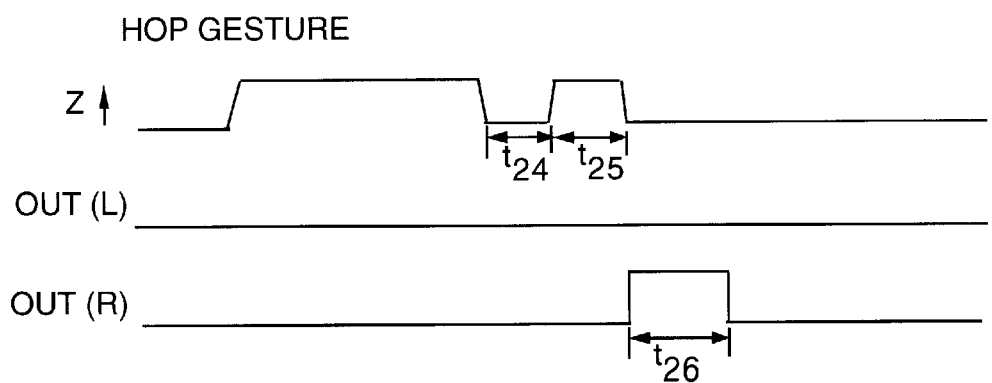

FIG. 15G shows a "hop" gesture. This gesture begins with the finger already on the pad. The finger is then lifted for interval "t24" which is less than HopTime; the finger then comes down for a regular tap "t25". Also, not shown on the figure, during interval "t24" the finger must have moved by at least a certain distance HopDistance away from its previous position. When this occurs, the gesture is processed as a "hop" instead of a regular tap, and the virtual button press "t26" occurs on the right button Out(R) instead of the usual left button Out(L). It is easy to see how the tap "t25" could be followed by further finger actions to form a drag or a double-tap on the right button.

Another multi-button gesture uses "tap zones," in which the surface of the pad is divided into two or more zones. A tap or drag initiated in a given zone simulates an event on a button corresponding to that zone. Even if the finger moves between zones during a drag, the entire drag is simulated on the button corresponding to the zone of the original tap that initiated the drag gesture.

Figure 16A:
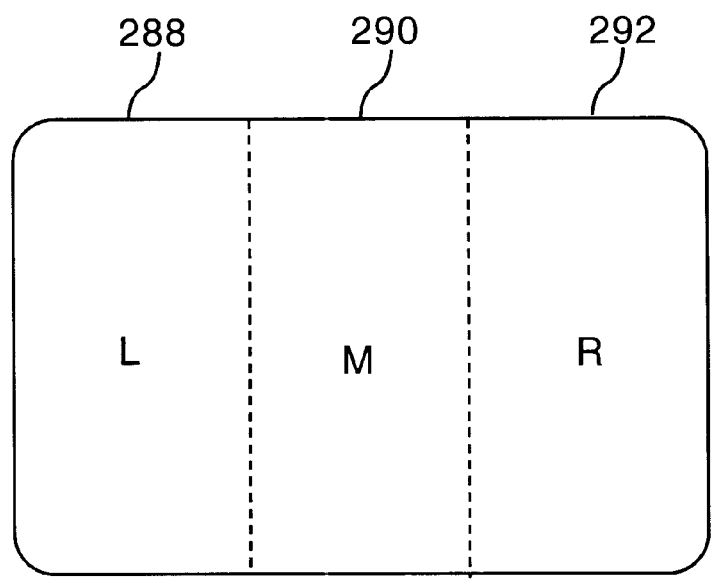
FIGS. 16a and 16b are diagrams illustrating two tap zone shapes which may be used on sensor pads according to the present invention.
Figure 16B:
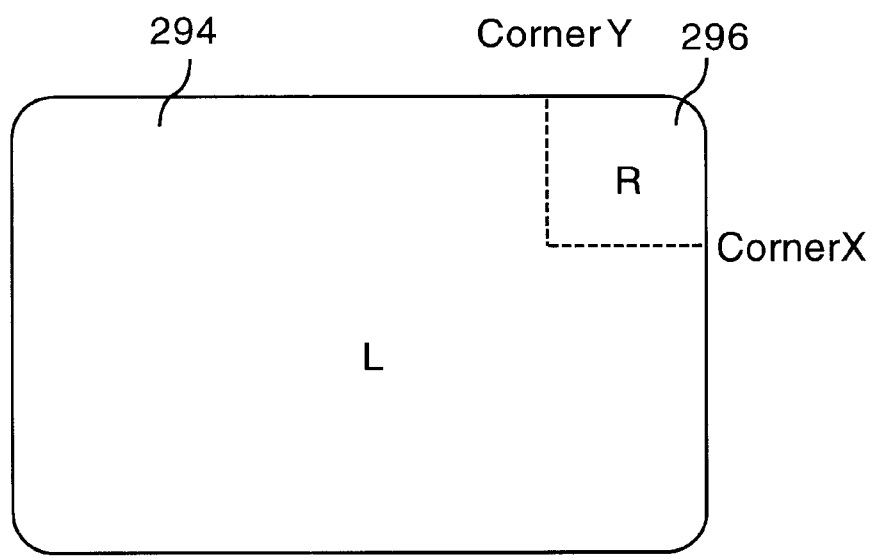

FIGS. 16a and 16b illustrate two tap zone shapes. In FIG. 16a, the pad is divided into three vertical stripes 288, 290, and 292, corresponding to the left, middle, and right mouse buttons, respectively. In FIG. 16b, the pad is divided into a main area 294 simulating the left mouse button, and a small corner area 296 simulating the right mouse button. The implementation of FIG. 16b is more appropriate if one button is much more heavily used in typical applications than the other button(s).

It is preferable for the zones to correspond to clearly marked regions on the pad surface. It will be obvious to one skilled in the art that other zone shapes, such as multiple corners or horizontal stripes, are equally straightforward.

There is an interaction between tap zones and the edge motion feature that needs to be taken into account. Particularly with the corner area 296 of FIG. 16b, tap zones encourage the user to tap near the edge of the pad. If edge motion is active during taps and drags or at all times, then edge motion will tend to interfere with the proper behavior of corner taps. To prevent this, the edge motion enable logic of FG. 13 can be modified slightly. In a given stroke, edge motion only operates if the finger has been in the inner zone at least once during that stroke. Thus, if the finger touches down in the outer zone, edge motion will not activate until the finger leaves the edge of the pad and then returns.

All of the above-described gestures are variations of basic tap and drag gestures. In the system described herein, all of these gestures are recognized by the tap unit 280. The operation of tap unit 280 is most easily described as an algorithm in the form of a flowchart. From this disclosure, persons of ordinary skill in the art will recognize that the tap unit described herein could actually be implemented as known and obvious equivalents such as a software program, hardware state machine, or otherwise. All such implementations are intended to fall within the s cope of the present invention.

FIGS. 17a through 17f comprise a flowchart for the operation of tap unit 280. Tap unit 280 implements the tap, drag, locking drag, drag extension, corner-tap, and hop gestures described herein. In the gesture recognition operations described herein, the corertap is used to simulate the right virtual mouse button. Hops to the left and right are used to simulate the middle and right virtual mouse buttons. Simple taps simulate the left (primary) virtual mouse button.

Processing begins at step 300 as each (X,Y,Z) sample arrives from the arithmetic unit 16 of FIG. 1. In a presently preferred embodiment of the invention, such data arrive 40 times per second. The algorithm of FIGS. 17a through 17f will run from start (step 300) to finish (step 392) every time a sample arrives.

Step 302 determines whether the finger is up or down by comparing Z (pressure) against Zthresh to determine whether a finger is present ("down") or not ("up"). Instead of a simple threshold comparison, two thresholds may be used to provide hysteresis as is well-known in the art. Hysteresis is not shown in FIG. 17a, but similar hysteresis will be illustrated later in FIG. 20 for the "push" gesture.

In step 304, the finger is known to be down. The previous Z is checked to see whether the finger was previously down or is just now touching down on the pad.

In step 306, a finger-down transition has been detected. This may indicate the beginning of a drag gesture or a successive row in drag extension, etc. For a drag or drag extension gesture, the change in the finger position from the previous finger position on the touchpad during DragTime and ExtendTime, respectively, is checked.

In the drag gesture illustrated in FIG. 15b, it is beneficial to check that the finger has not moved a great distance during time "ts", the interval between the initial tap and the return of the finger to the pad. If the distance calculated during "t5" indicates that the finger has returned to the pad in a different location, then a drag gesture was probably not intended.

In the drag extension gesture illustrated in FIG. 15E it is necessary to check that the finger has moved a great enough distance during interval "t17, between subsequent rows of an extended drag gesture. If the distance is not great enough, the drag gesture ends.

Since the TapState during a drag gesture is TAP and the TapState during a drag extension gesture is LOCKED, step 306 determines the TapState. If the TapState at step 306 is TAP, then step 308 computes the distance between the current position CurPos (the filtered and smoothed X and Y position data) and the saved position of the previous tap, DownPos. If the distance is greater than some threshold DragRadius, then execution proceeds to step 310. Otherwise, it proceeds to step 312. The threshold DragRadius should be some fraction of the width of the pad, preferably larger (more generous) than the TapRadius used in basic tap detection.

At step 316, it is determined whether DragLock is enabled. If DragLock is enabled, the execution proceeds to step 312. Otherwise the execution proceeds to step 310.

If the TapState of step 306 is LOCKED, and DragLock is not enabled, then a drag extension must be in progress. Step 314 computes the distance between the CurPos and the saved ending position of the previous stroke, UpPos. If the distance greater than some threshold DragExtRadius, then execution proceeds to step 312. Otherwise it proceeds to step 316. The threshold DragExtRadius should be some fraction of the width of the pad, as determined by user testing. (Some users may prefer a DragExtRadius of zero, so that step 310 is effectively disabled.)

Persons of ordinary skill in the art will recognize that several possible distance measures are suitable for use in steps 308 and 314. A true Euclidean distance measure is reasonable but expensive to compute; a simpler measure is the sum or maximum of the absolute values of the distances in X and Y. The sum or maximum will produce a "drag zone" around the original tap which is diamond- or square-shaped, respectively, instead of the circular zone produced by a Euclidean distance measure. Experiments suggest that u*sers are unable to perceive the difference between these zone shapes, so whichever measure is easiest to compute is preferred. Also, the geometry of the finger and touchpad may cause the significant motion to lie always in one direction, e.g., X, in which case a simple absolute difference of X coordinates may be preferred.

In the preferred embodiment, the user is able to change the level of gesture recognition using a control panel or other means. If the user elects to allow taps but not drags, then step 308 can be programmed to go directly to step 310 so that all taps are disqualified from becoming drags.

In step 310, a drag gesture has been disqualified. TapState is changed from TAP to NONE; the effect will be a simple tap gesture followed by cursor motion with no virtual button held down.

Step 312 records the position and the time at which the finger touched down.

Step 318 initializes the TapOkay flag to FALSE. It also clears the Suppress flag which is used to delay the virtual button clicks resulting from "novice" taps. Step 318 ends the delay prematurely if the finger comes back down onto the touchpad. If the new finger stroke is the second tap of a double tap gesture, step 318 is responsible for ensuring that the virtual click from the first tap is not accidentally suppressed entirely.

Step 320, which executes on all samples in which the finger is down, compares Z against the Ztap threshold; step 322 sets TapOkay to TRUE if Z is greater than the Ztap threshold. Thus, when the finger lifts, TapOkay will be TRUE if Z ever exceeded the tap threshold during the brief stroke that is a candidate for a tap gesture.

Figure 17A:
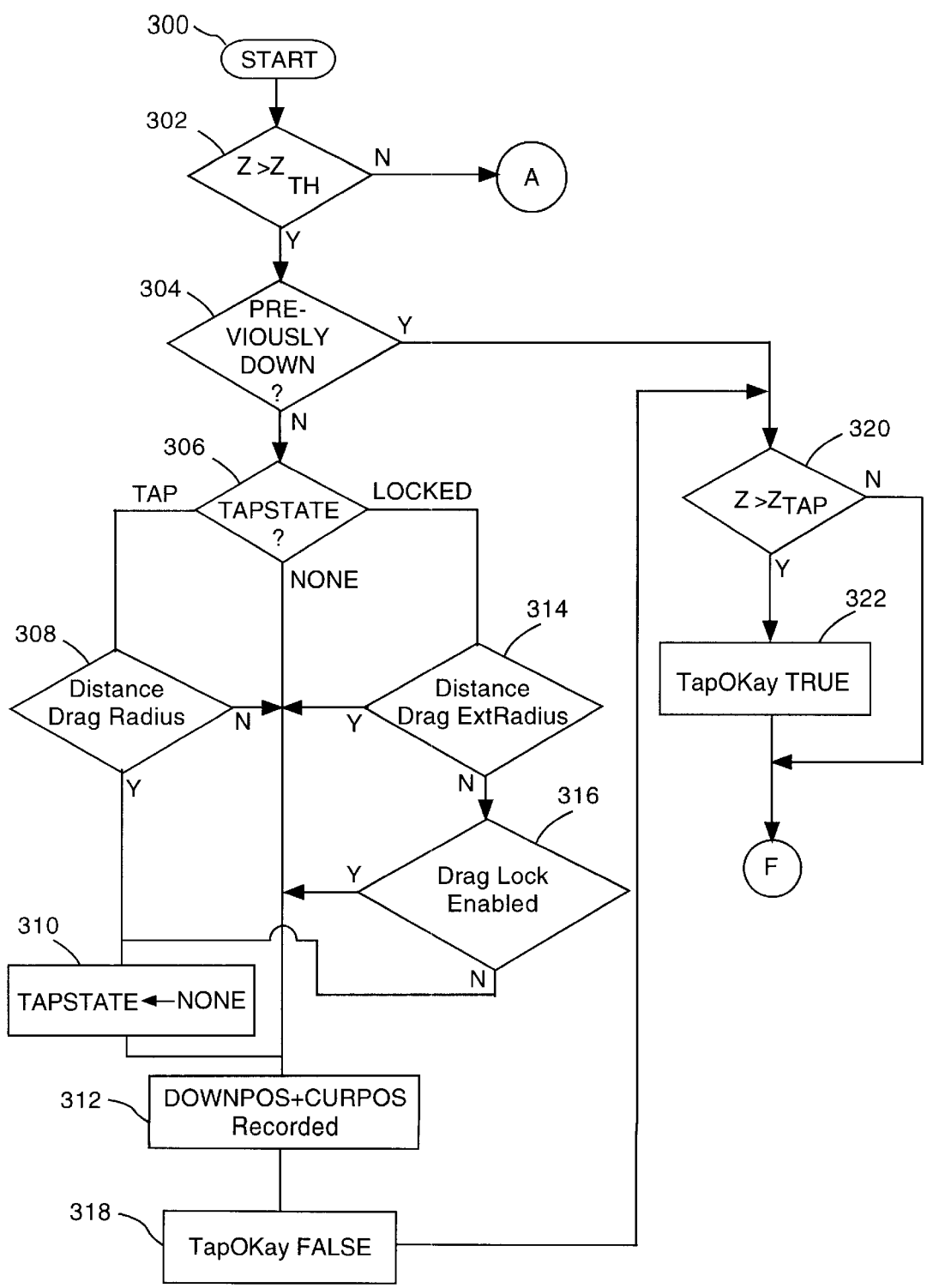
FIGS. 17a through 17f comprise a flowchart illustrating the operation of the tap unit of FIG. 14.
Figure 17B:
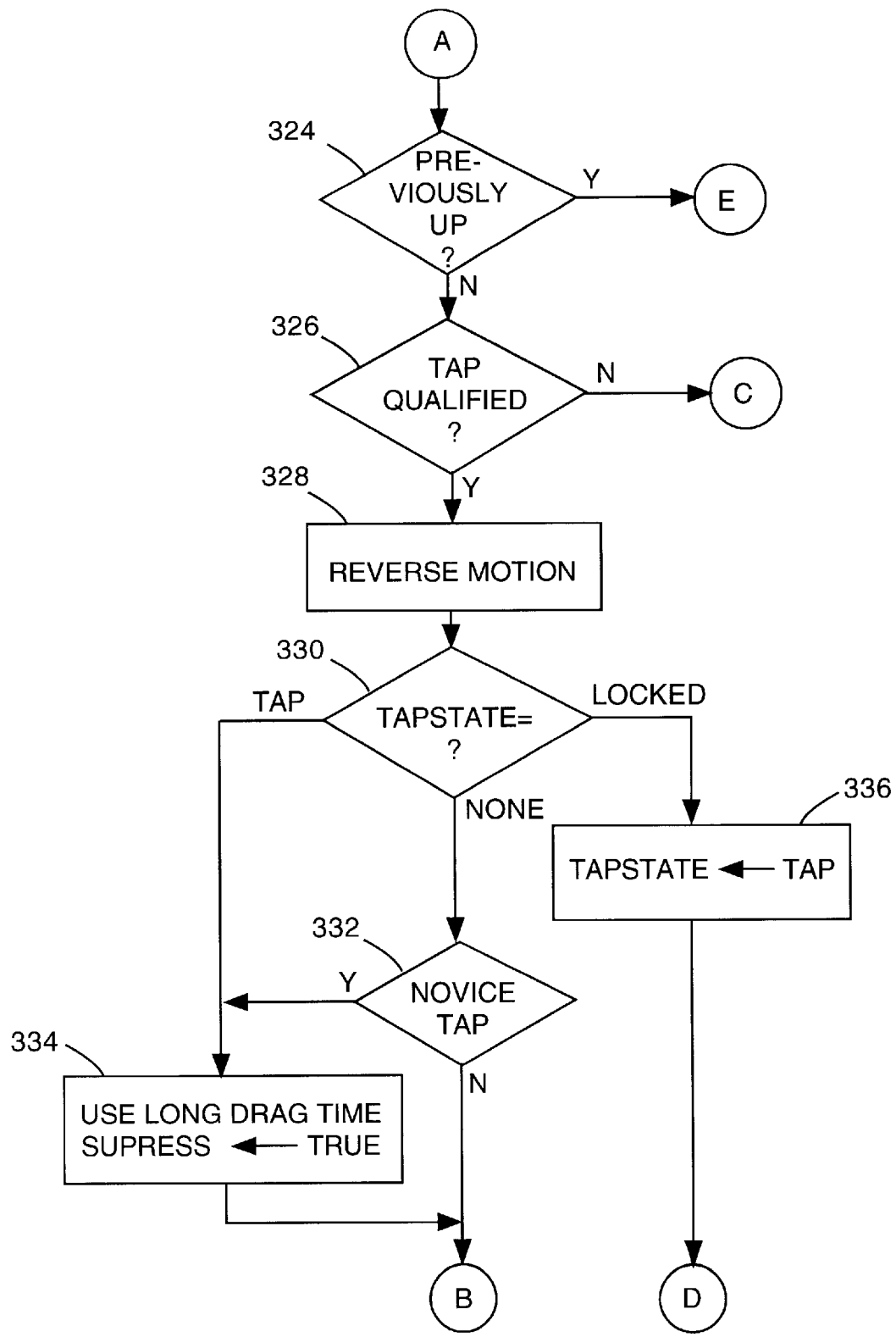

Referring now to FIG. 17b, in step 324, the finger is known to be off the pad. The previous Z is checked to see whether the finger was previously up or is just now being lifted from the pad.

In step 326, a finger-up transition has been detected. Various tests are made of the most recent stroke (finger-down period) to see if it qualifies as a tap. To qualify, the stroke must have short duration (CurThne minus DownTime must be less than TapTime), little or no motion (the distance from CurPos to DownPos must be less than TapRadius), and sufficient peak finger pressure (TapOkay must be TRUE), in order to qualify as a tap.

In step 328, any finger motion which has occurred is retroactively canceled out by quickly replaying to the host a corresponding negative amount of motion from the register or queue in order to "undo" the already-reported motion and to restore the original cursor position as of the moment the finger's presence was first detected. If the motion during the stroke was sent to the host in the form of a sequence of several packets, this sequence can be saved and replayed in reverse. If the host's motion processing is linear, it will suffice to accumulate the total amount of motion during the stroke and send a compensating motion in a single packet. Since the "acceleration" feature of a typical mouse driver activates only at high speeds, this assumption of linearity is usually safe in this context.

Step 330 takes one of several actions based on the current TapState. First, if TapState is NONE (no gestures in progress), execution simply proceeds to step 332. In step 332, the duration of the tapping stroke, CurTime minus DownTime, is computed to distinguish short, expert taps and long, novice taps. For expert taps, execution simply proceeds to step 338 of FIG. 17c. For novice taps, execution proceeds to step 334, which arranges to use a longer value for DragTime for the current gesture. These steps may simply compare the tap duration to a fixed threshold to choose between two fixed DragTime values, or they may use the tap duration to smoothly modulate the DragTime.

Step 334 also sets the Suppress flag to True to cause the virtual button signal to stay low for a short period. In the preferred embodiment, this period is chosen to be the difference between the novice and expert DragTime values, so that the resulting non-suppressed portion of the virtual click has the same duration in all cases, as shown in FIG. 15C.

Second, if TapState is TAP (a recent tap is still in progress), then a double-tap has been detected. Step 334 sets the Suppress flag to TRUE to cause the virtual button signal to go low for one sample. This corresponds to time "t22" of FIG. 15F. In an alternate approach, one or more extra packets indicating a release of the virtual buttons can be inserted into the regular packet stream, rather than using a Suppress flag as shown herein. In an alternate approach, distinct Suppress flags could be used for the two purposes of delaying novice clicks and processing double taps; for example, a 300 msec suppression may be desirable for delaying novice clicks, but for double-taps it may suffice to end the suppression after at least one packet reflecting the suppression of virtual button has been sent to the host.

Finally, if TapState is LOCKED, this is the tap that ends a locking drag. Step 336 sets TapState back to TAP, then skips directly to step 370 of FIG. 17e, bypassing the steps which decide which of the three mouse buttons to simulate. Thus, the locking drag changes back into a tap on the same virtual mouse button. After the usual short duration ("t13" of FIG. 15D), the virtual button will be released.

It is significant that the button choice (FIG. 17c) is omitted in the LOCKED case. If a right-button locking drag is initiated by, for example, a tap in the corner of the pad, then it should be possible to terminate the drag by tapping anywhere on the pad, not just in the corner. It is also significant that the button choice is included in the double tap case. Otherwise, it would be impossible, for example, to perform left- and right-button clicks in rapid alternation by tapping alternately in two different locations on the pad.

In an alternate embodiment, if TapState is LOCKED, TapState is set to NONE and step 386 is performed next. This makes "t13" of FIG. 15D equal to zero. Since TapState may also be LOCKED during drag extension, the implementation shown here also allows the user to tap to cut short the drag extension period DragExtTime. In an alternate embodiment, taps could be ignored during the drag extension period. However, the significance of this is lessened if DragExtTime is short.

Figure 17C:
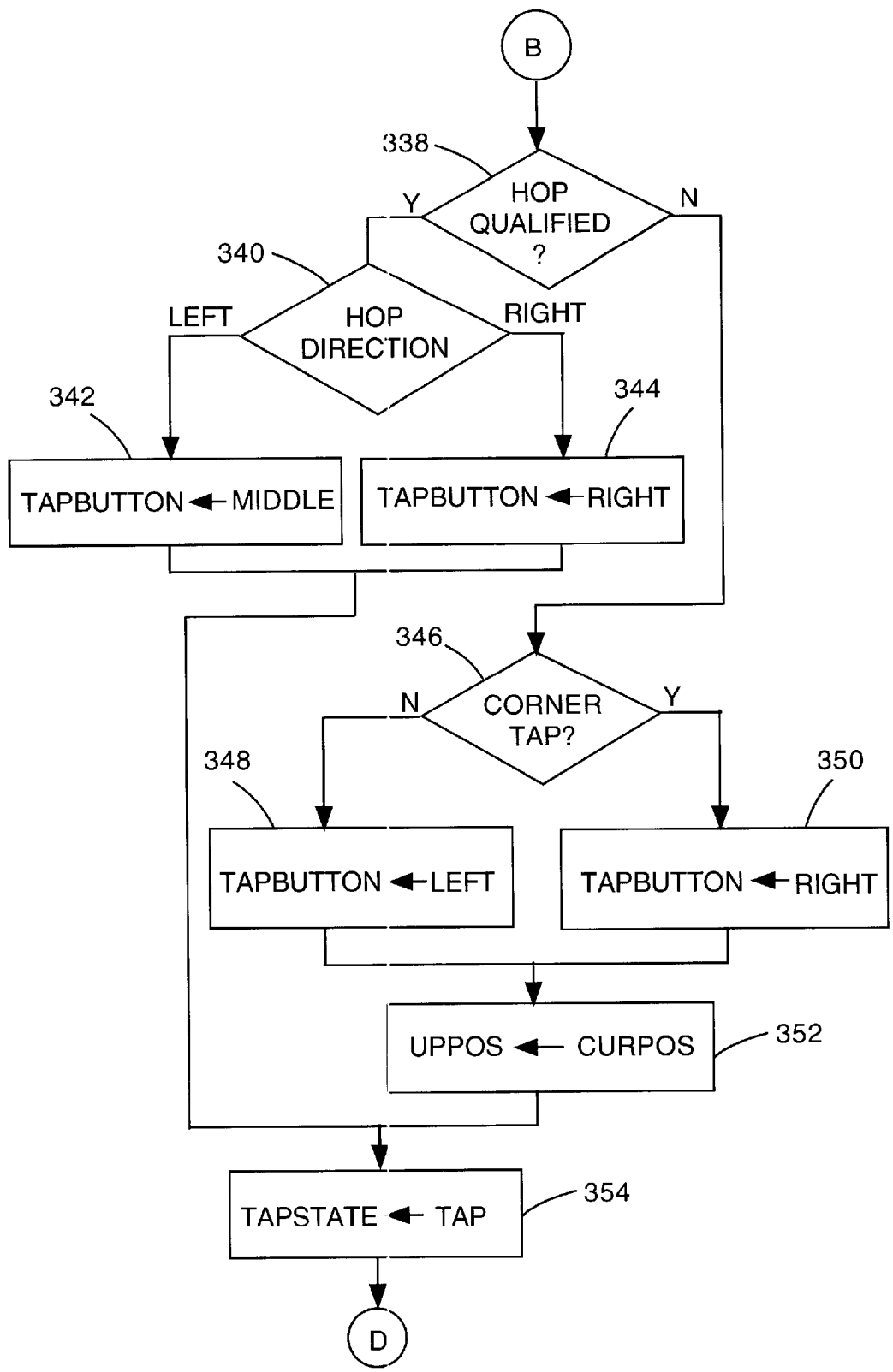

Referring now to FIG. 17c, step 338 checks whether the current tap qualifies as a "hop" gesture. This check involves several tests. First, the hop gesture must be enabled by the user. Second, the finger must have been raised for only a short amount of time between the current tap and the last time it was on the pad (Downtime minus UpTime must be less than HopTime). Finally, the position of this tap must be significantly far away from the previous position (the distance from DownPos to UpPos must be greater than HopDistance). Once again, a variety of distance measures are possible. The operations shown in FIGS. 17a through 17f support leftward and rightward hops; thus, a reasonable distance measure is absolute difference in X coordinate between DownPos and UpPos.

In a variant which is easily seen to be nearly equivalent, CurTime and CurPos are used in place of DownTime and DownPos in step 338.

If the tap qualifies as a hop, execution proceeds to step 340. Since the system of this example supports two different hop gestures, the direction of the hop is checked to determine the type of gesture. If the X coordinate of DownPos (or CurPos) is less than the X coordinate of UpPos, a leftward hop has occurred (assuming X increases to the right). If the X coordinate of DownPos (or CurPos) is greater than the X coordinate of UpPos, a rightward hop has occurred. Note that, due to the checks of step 338, DownPos will be either significantly to the left or significantly to the right of UpPos at this point.

In step 342, a leftward hop causes TapButton to be set to the symbol MIDDLE, so that the tap gesture will generate a virtual middle mouse button click.

In step 344, a rightward hop causes TapButton to be set to RIGHT, initiating a virtual right button click.

Step 346 executes if no hop was detected. It proceeds to check for the other supported alternate gesture, the corner tap. A corner tap is a tap occurring in a small corner zone as shown in FIG. 16b. A corner tap occurs if corner taps have been enabled by the user; the X coordinate of DownPos (or CurPos) is greater than some coordinate CornerX; and the Y coordinate is greater than some coordinate CornerY. CornerX and CornerY are shown on FIG. 16b.

It should be obvious to one of ordinary skill in the art that other tap zones, such as those of FIG. 16a, or multiple corner zones, can be decoded in a completely analogous way by examining the X and Y coordinates of the tap location.

In the presently preferred embodiment, the user is given the choice of hop gestures, corner taps, or neither, as a mechanism for simulating alternate button clicks. There is nothing stopping an implementation from offering both hops and corner taps at once, except that to do so would likely be more confusing than beneficial to the user.

In step 348, no corner tap was detected, so TapButton is set to LEFT to simulate a click of the left virtual mouse button.

In step 350, a corner tap was detected, so TapButton is set to RIGHT to simulate a right virtual mouse button click.

Step 352 records the current position as the new UpPos, the lift location used for later hop decoding. In general, UpPos is updated each time the finger is seen to lift from the pad. However, there are two exceptions to this rule. First, if the finger lift is itself part of a hopping tap gesture, UpPos is not updated. This is seen in the left branch of the flowchart of FIG. 17c. This exception is needed to support, for example, a double click of the right virtual button. The finger is lifted, moved substantially to the right, then tapped twice. The two taps will occur in roughly the same place. If UpPos were updated by the first tap, the second tap would be decoded as a left-button click.

Second, in the flowcharts of FIGS. 17a through 17f, UpPos is not updated on a tap that ends a locking drag. User tests show that the last-lift location perceived by the user is usually the last lift during the locking drag, with the terminating tap being a subconscious action whose location is not perceived as relevant. Therefore, it makes more sense to omit the update of UpPos for the terminating tap of a locking drag.

Step 354 sets TapState to TAP after any tap, corner tap, or hop gesture, thus recording that a gesture is in progress.

Figure 17D:
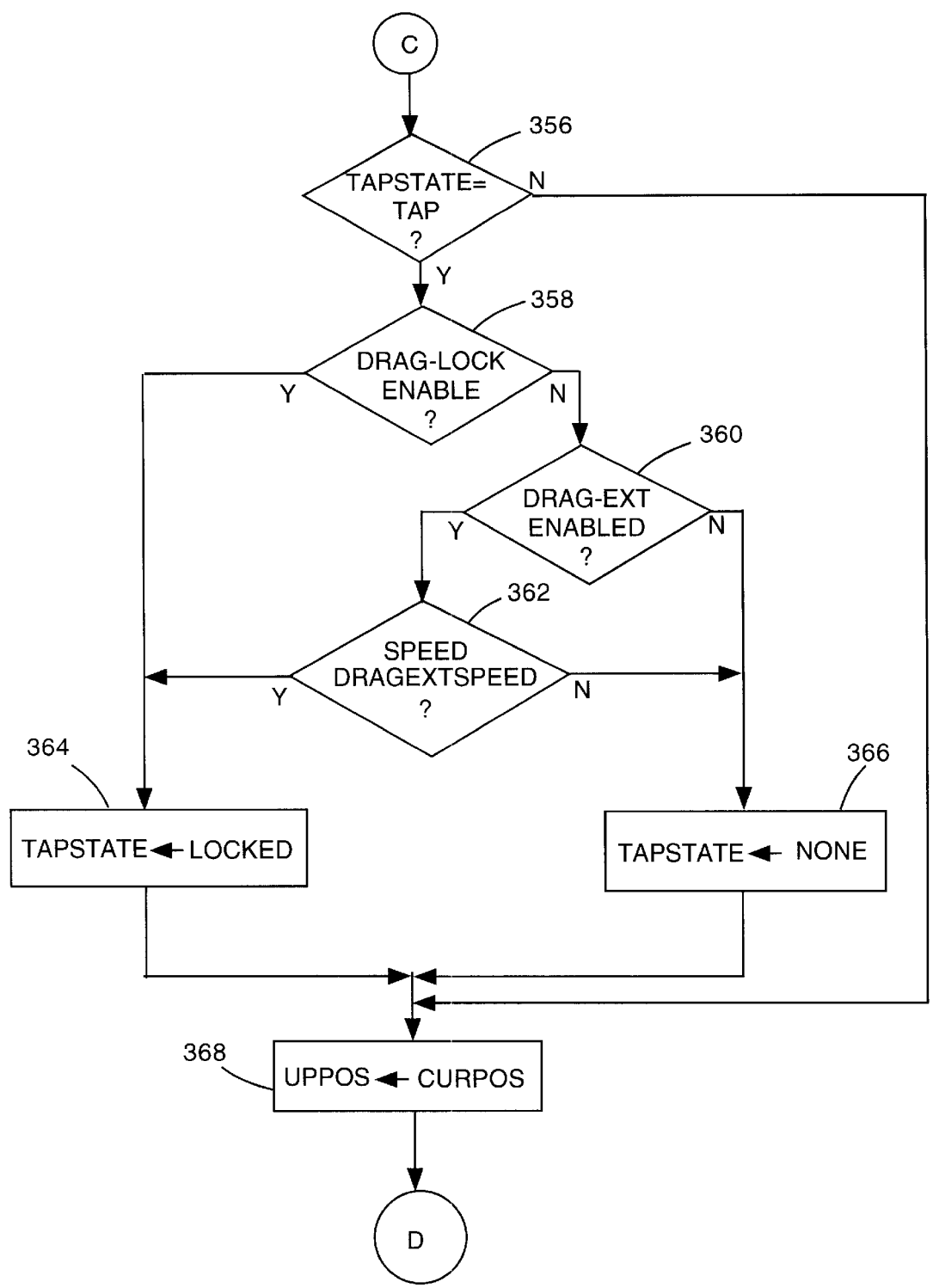

Referring now to FIG. 17d, step 356 executes when the finger lifts from the pad in a way that does not qualify as a tap. This step checks if TapState is TAP; if so, the finger must have lifted from the long stroke of a drag gesture, e.g., time "t7" of FIG. 15b. Depending on user preference, the drag gesture is either terminated by the lift of the finger, or locked to become a locking drag.

Step 358 checks whether locking drags have been enabled by the user. This decision may be made at design time, for a system in which drags are always locking or always not, or it may be based on a run-time option such as a control panel.

If locking drags have not been enabled, then step 360 checks whether drag extension has been enabled. This decision may be made at design time, for a system in which drags are always extended or not, or it may be based on a run time option such as a control panel.

At step 362, if drag extension is enabled, then the speed of the finger at lift-off is checked to see whether it is above DragExtSpeed. This permits making the distinction between true drags and presses described above.

In step 364, the TAPSTATE of a drag is converted to LOCKED.

In step 366, a drag is terminated by the lift of the finger.

In step 368, which executes whenever the finger is lifted and does not qualify as a tap, UpPos is updated to the current position as described above.

Figure 17E:
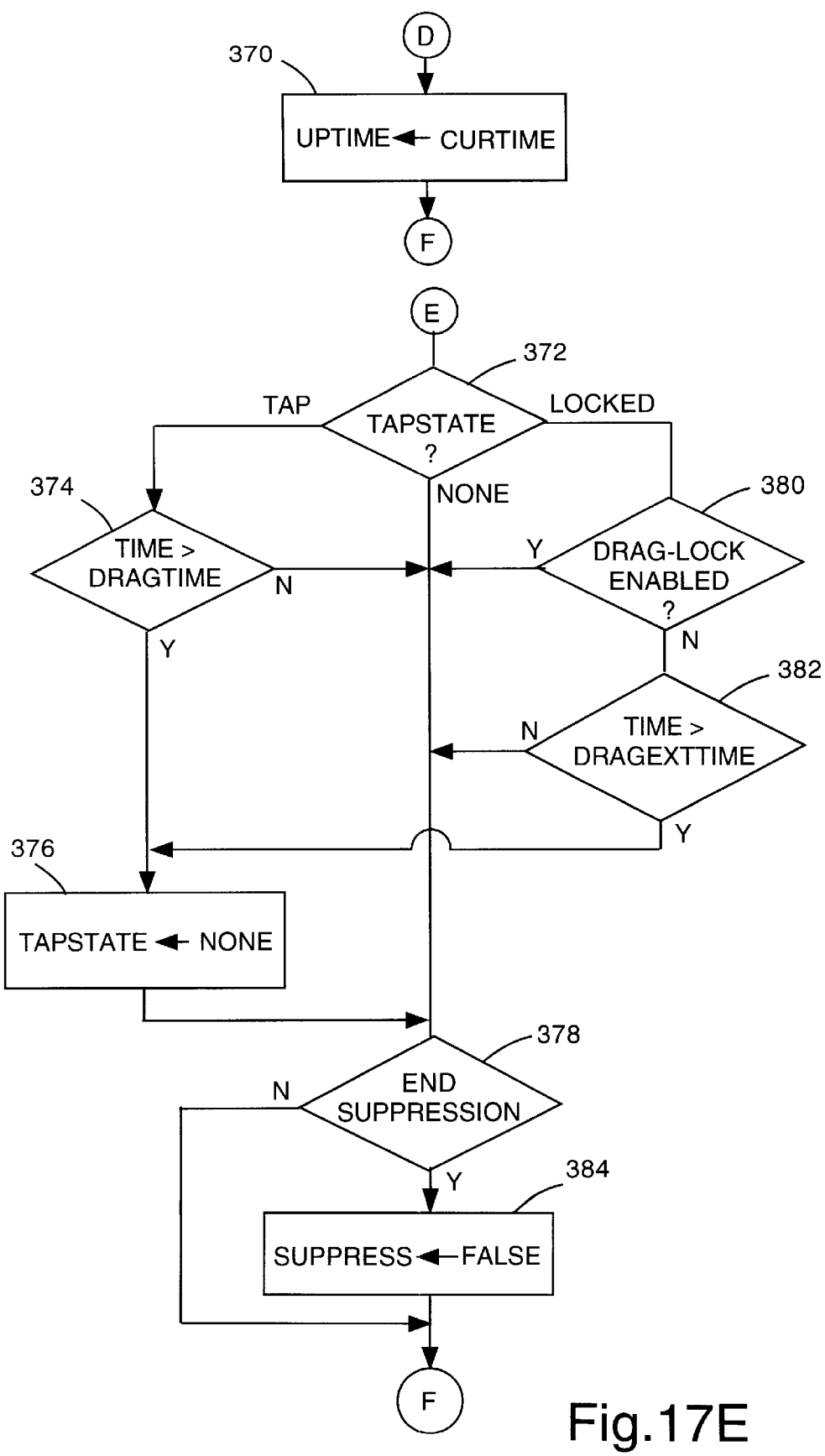

Referring now to FIG. 17e, step 370 executes whenever the finger lifts from the pad. The variable UpTime is updated to record the time at which the finger lifted from the pad.

Step 372 determines the TapState for each sample in which the finger remains off the pad.

If the TapState is TAP, then step 374 compares CurTime minus UpTime against DragTime, to see if the finger has stayed off the pad too long after a tap for the tap to be the beginning of a drag. It should be appreciated that if variable DragTime is in use, the DragTime used for comparison will be a function of whether a short, expert tap has been made or a long, novice tap has been made. If the time limit is exceeded, and TapState equals TAP, then execution proceeds to step 376. Otherwise, execution proceeds to step 378.

If the TapState is LOCKED, step 380 determines whether the DragLock mode has been enabled. If DragLock has not been enabled, then execution proceeds to step 382. If DragLock is enabled, then execution proceeds to step 378 and the drag continues.

Step 382 determines whether the finger has been off the touchpad for a period exceeding ExtendTime. If not, the drag continues and execution proceeds to step 378. Otherwise execution proceeds to step 376 where the TapState becomes NONE because the finger has been off the touchpad for too long to continue the drag.

Step 378 checks whether the finger has been off the pad long enough to end the suppression period begun by step 334. If so, execution proceeds to step 384, where the Suppress flag is set to False.

Step 376 changes TapState from TAP to NONE, ending the tap and thus preventing the tap from extending to a drag, or the existing drag from being extended further.

Figure 17F:
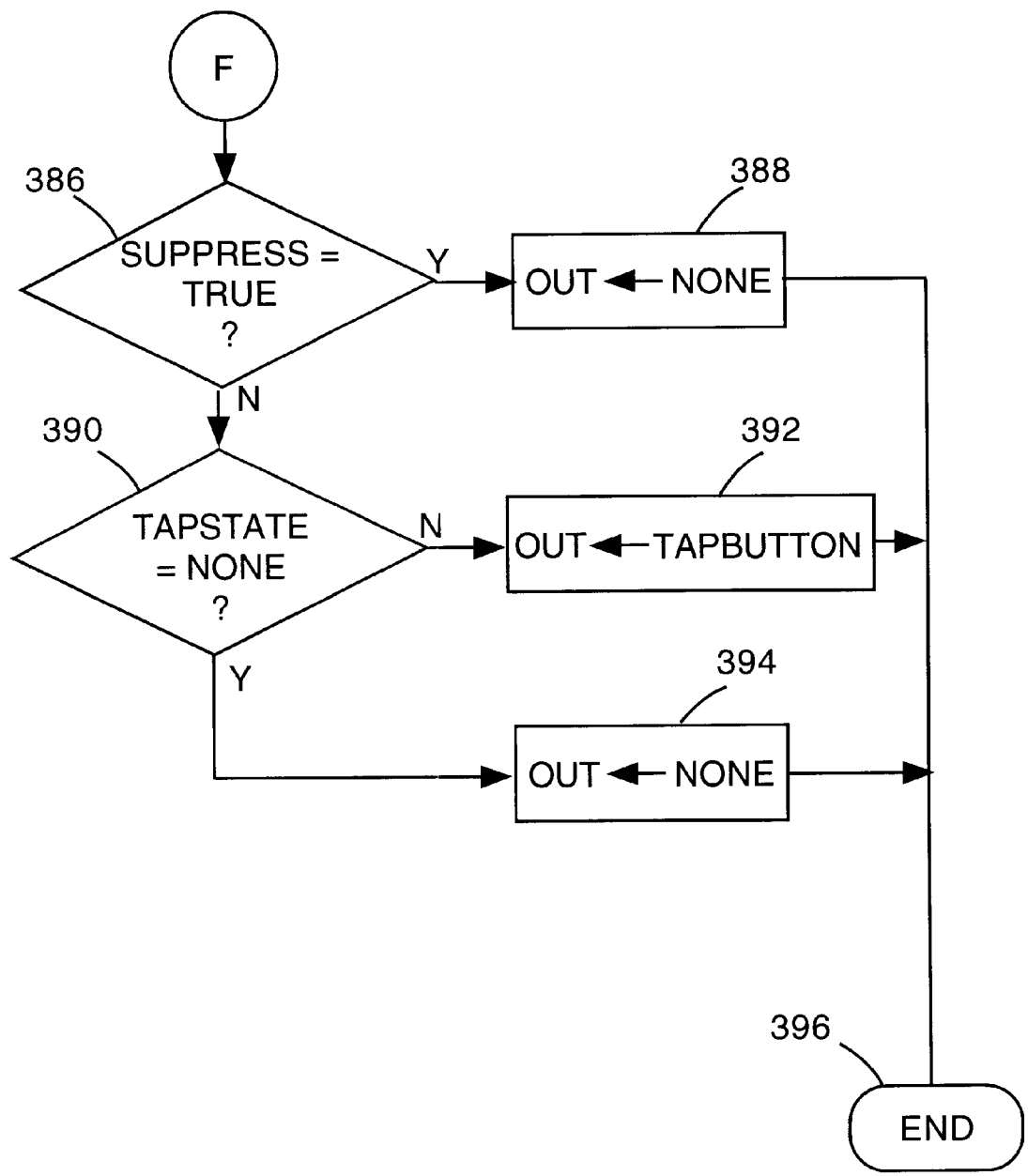

Referring now to FIG. 17f, all paths converge on step 386, which executes on every sample regardless of the state of the finger. This step begins a series of checks to determine the output of the tap unit 280 for this sample. First, if the Suppress flag is TRUE in step 386, virtual buttons are suppressed so the output is set to NONE in step 388.

If the Suppress flag is FALSE and there is no button suppression, TapState is examined in step 390. If TapState is TAP or LOCKED, then the button indicated by TapButton is output in step 392.

If TapState is NONE, no tap, drag, or hop gesture is in progress, step 394 sets the output to NONE in this case.

Processing ends at step 396 (END). The tap unit will start over at step 300 (START) when the next (X,Y,Z) sample arrives from the arithmetic unit.

The edge-motion feature of FIG. 13 is most useful during a drag gesture. Thus, it is preferable to allow the Motion-Enable input of motion unit 18 to be derived from the state of gesture unit 20. In particular, the "MotionEnable" signal into AND gate 268 of FIG. 13 is obtained by MotionEnable= (TapState=TAP) OR (TapState=LOCKED).

The "zigzag" unit 282 of FIG. 14 decodes a two-finger gesture in which one finger remains resting on the pad while another finger taps to one side of the primary finger. In terms of the (X,Y,Z) information produced by the basic device, this gesture will effectively increase the Z value while quickly shifting the X and/or Y value by a significant distance. (When two fingers are on the pad, the apparent position reported is midway between the two fingers.) If such a change is detected, and is followed by a rapid return to the original X, Y, and Z values, then a tap of a second finger is recognized.

Because a second finger tap cannot be reliably recognized until the second finger is lifted, sudden cursor motions first to one side and then back again are unavoidably sent to the host. The name "zigzag" refers to these characteristic cursor motions. A motion-reversal mechanism similar to that used in the tap unit 280 can be employed to ensure that the virtual button click occurs at the original, un-zigzagged location. The only difficulty in this case is that the motions involved may be large enough to trigger the host's acceleration feature, which means that either the reversal motion must be stored and replayed packet by packet, or the zigzag unit and host software must cooperate to ensure that the cursor does in fact return to the desired place.

It is possible to recognize second-finger taps using only the (X,Y,Z) information from the standard arithmetic unit 16, as described herein. However, it is clear that the arithmetic unit 16 could be modified to produce additional information, such as the width or shape of the sensor trace profile, which would aid in the accurate recognition of this gesture.

Figure 18A:
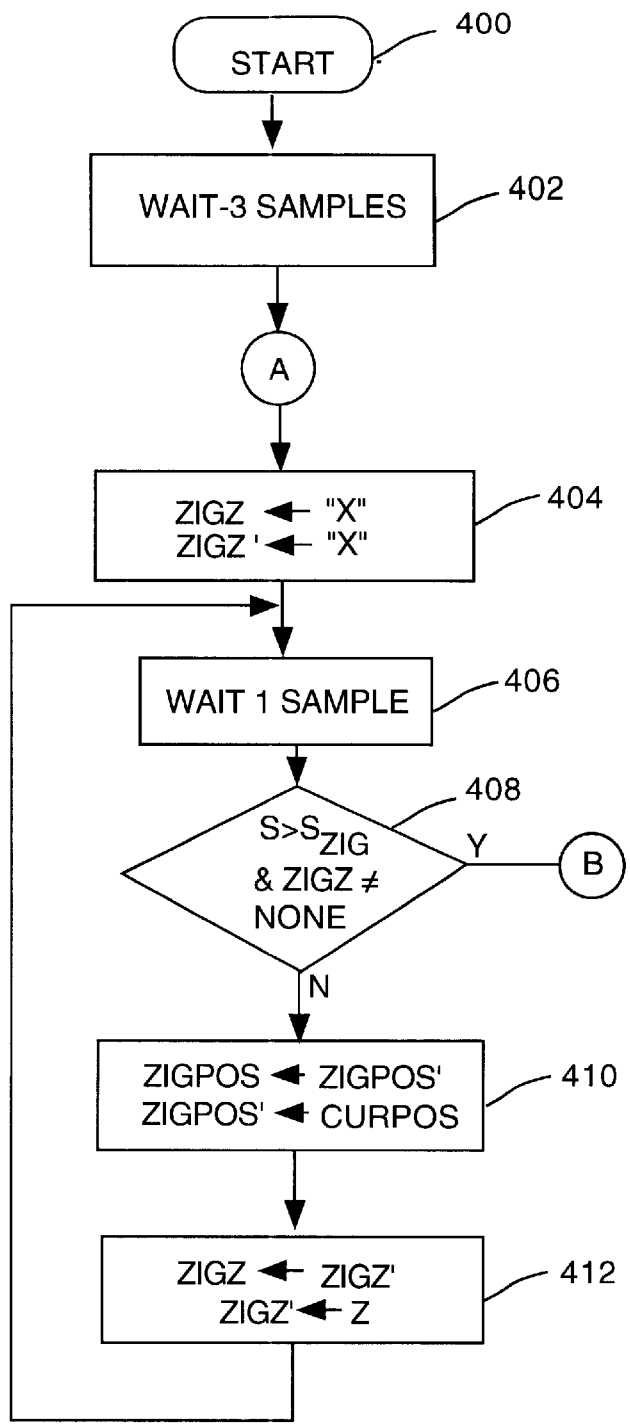
FIGS. 18 through 18c comprise a flowchart illustrating the operation of the zigzag unit of FIG. 14.
Figure 18B:
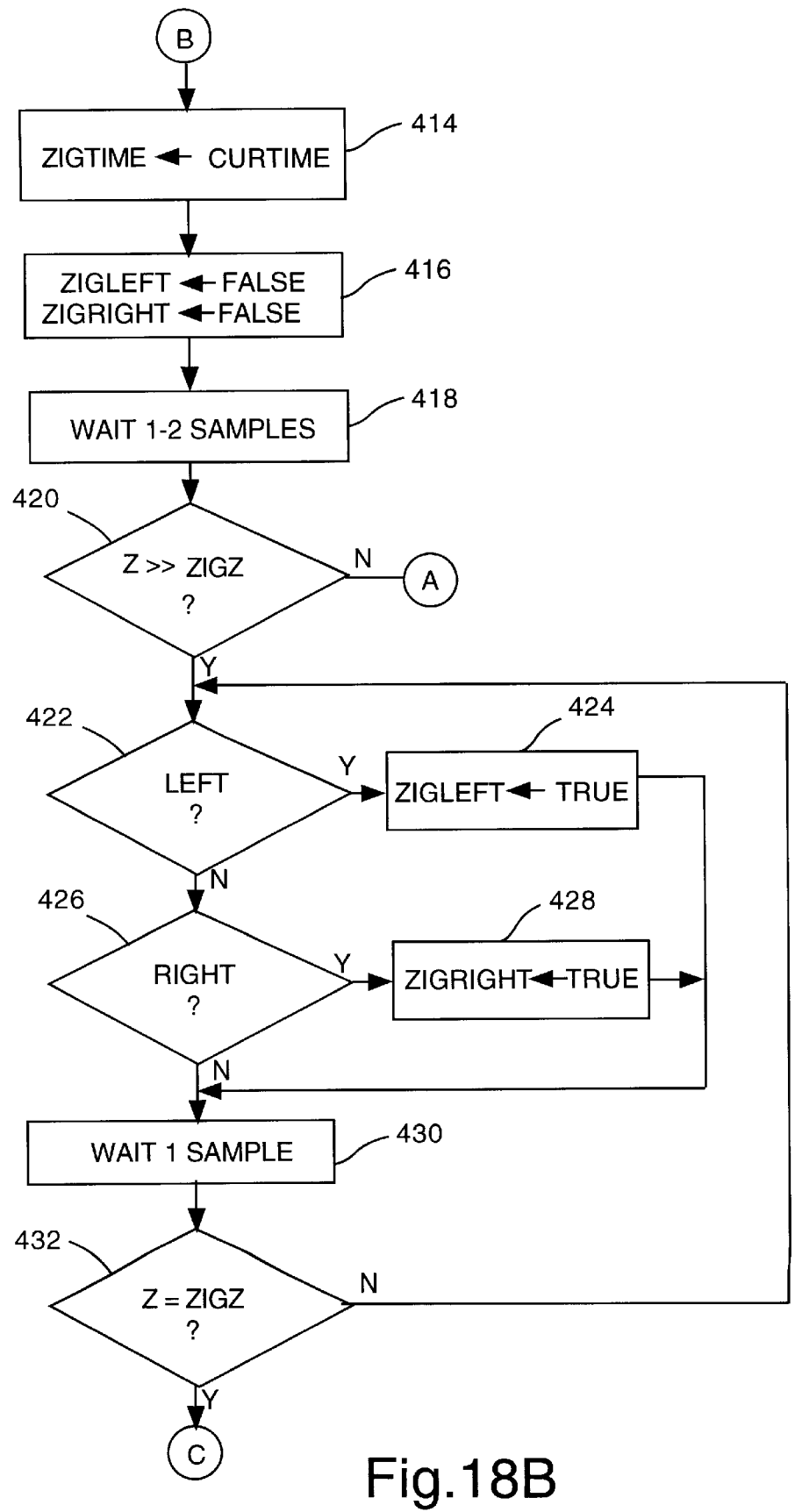
Figure 18C:
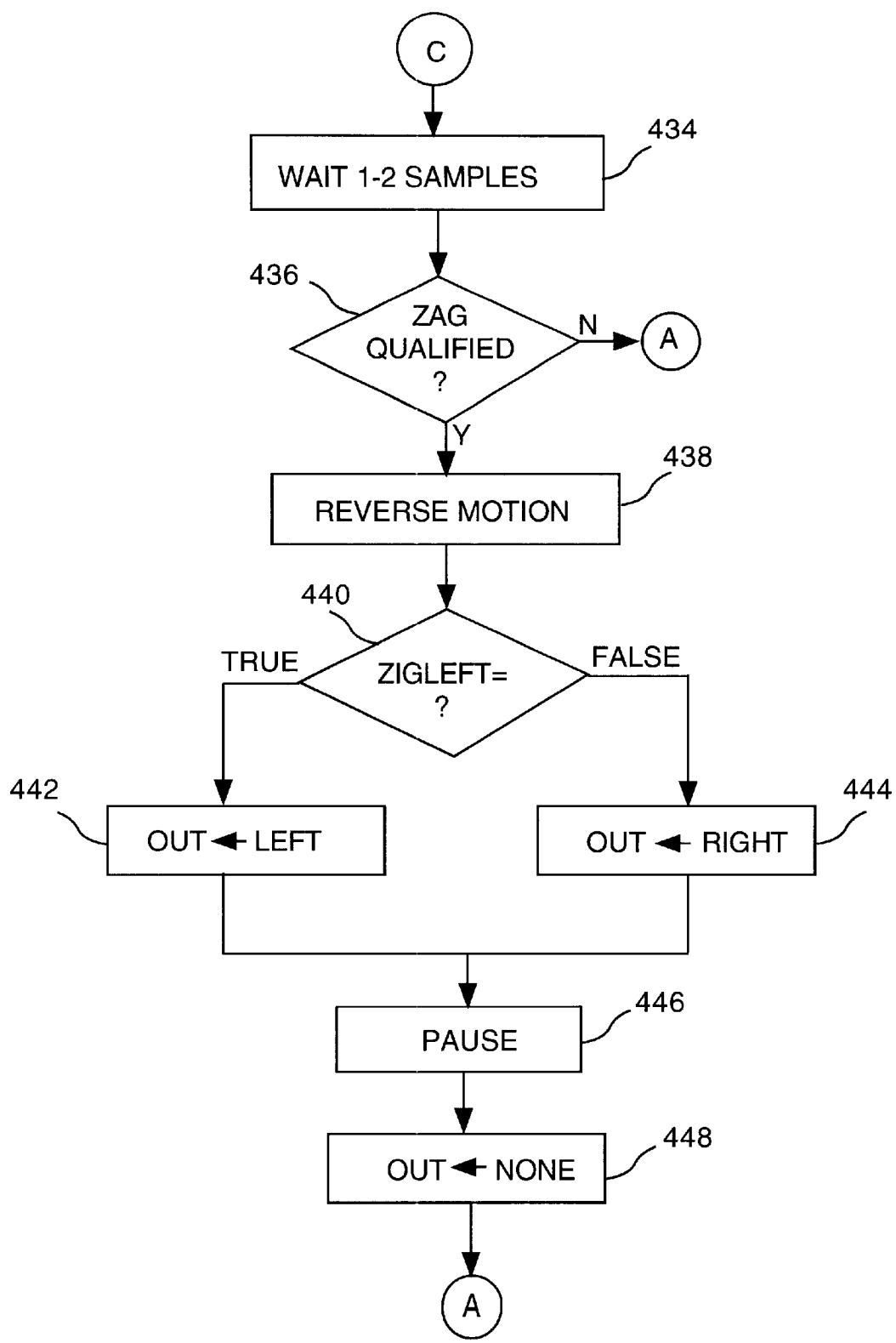

FIGS. 18a through 18c are a flowchart describing the algorithm for the zigzag unit 282. As was the case for the tap unit 280, the zigzag unit 282 is best described as a flowchart. However, a hardware state machine is a known equivalent and would also be a reasonable implementation of the zigzag unit 282. Unlike the tap unit 280 flowchart of FIGS. 17a through 17f, the zigzag unit 282 flowchart executes once per stroke. When the finger's presence is detected (Z>Zthresh), execution begins at step 386. If the finger leaves the pad before execution ends, the zigzag unit 282 abandons its computation and starts over at step 386 on the next stroke.

FIGS. 18a through 18c illustrate the additional feature that leftward zigzags simulate a left button click, while rightward zigzags simulate a right button click.

The zigzag unit 282 requires the same position, Z, and time inputs as the tap unit 280. It also requires a speed measure S, which is computed as the distance from the previous to the current finger position at any given time. If any filtering or smoothing done on the normal (X,Y) outputs of the arithmetic unit 16 as previously disclosed, it is best to compute the speed S from the unfiltered (X,Y) values.

State variables of the zigzag unit 282 include ZigZ and ZigZ', which record the two most recent values of Z; ZigPos, and ZigPos', which record the two most recent positions; ZigTime, which records the time at which the presence of the second finger was detected; ZigLeft and ZigRight, which are TRUE if a leftward or rightward zigzag has been detected, respectively; and Out, which represents the output of the zigzag unit 282, and is one of LEFT, RIGHT, or NONE.

The zigzag unit 282 uses several parameters. ZigDistance, the minimum distance the finger position can move to qualify for this gesture. ZigMaxTime is the maximum amount of time the second finger can be present to qualify. Szig is the instantaneous finger speed required to begin the detection of the gesture and is determined experimentally, depending on the sample rate, sensor dimensions, and amount of analog filtering in the charge integrators. ZigRadius and ZigLimit specify how close the position and Z values, respectively, must return to their original pre-zigzag values after the second finger is lifted. ZigRadius is comparable to TapRadius, and ZigLimit is about 30% of Zthresh in the presently preferred embodiment.

Referring now to FIG. 18a, execution begins, when the finger's presence is detected, at step 400.

In step 402, the zigzag unit 282 waits for approximately three (X,Y,Z) samples to arrive from the arithmetic unit 16.

In the preferred embodiment, these samples arrive at a rate of 40 per second. This initial delay is to prevent Z fluctuations at the beginning of the stroke from being mistaken for a second finger.

In step 404, ZigZ and ZigZ' are initialized to a reserved value denoted as NONE.

In step 406, the zigzag unit 282 waits for the next (X,Y,Z) sample to arrive.

Step 408 checks for the beginning of a "zig", the first half of the zigzag gesture in which the apparent finger grows and jumps to one side. The speed S of the current sample is compared against the threshold Szig. If S is greater, and ZigZ contains valid data (not the reserved value NONE), then execution proceeds to further validation of the gesture in FIG. 18b.

In step 410, no incipient "zig" has been seen, so ZigPos' is updated to reflect the most recent finger position, and ZigPos is updated to reflect the second-most-recent finger position. If smoothing or filtering is applied to the output of the arithmetic unit 16 of FIGS. 1 and 8, then, unlike the S computation described earlier, ZigPos should be updated from the filtered or smoothed position data. In other words, it should be updated from the processed position data which is used to update the cursor position on the host.

In step 412, ZigZ' and ZigZ are similarly updated to reflect the two most recent Z values. In typical usage patterns, a second-finger tap will typically occur to the left or right, i.e., different in X but not necessarily in Y. Thus, the X denominator (output of subtractor 168 of FIG. 8) will tend to increase by a clear factor of two when a second finger is present, whereas the Y denominator (output of subtractor 172) may or may not increase correspondingly, depending on the linearity of the charge integrators 44. Thus, it is preferable to use the X denominator output directly as Z for the purposes of the zigzag unit 282, rather than the combined and processed value normally obtained from block 178 of FIG. 8.

After step 412, execution returns to step 406 where the next sample is awaited.

Referring now to FIG. 18b, step 414 records the time at which the incipient "zig" was detected.

Step 416 then initializes the ZigLeft and ZigRight flags. These flags will become TRUE if the finger is seen to move significantly far to the left or right, respectively, of its starting position.

When a second finger comes down on the pad, the (X,Y,Z) values typically take two or three samples to converge to their new values which reflect the presence of two fingers. Step 418 waits for one or two more samples to arrive, after which time the (X,Y,Z) values should be settled. The choice of one, two, or more samples depends on factors such as the basic sample rate and the amount of filtering that occurs in the analog input section of the device.

After step 418, CurPos reflects the zigged apparent finger position, and ZigPos reflects the position from two samples before the speed passed the Szig threshold. The two-sample history is important because a small amount of motion may have occurred due to the approaching second finger, before the finger touched down and produced the large motion that exceeded Szig. After step 418, ZigPos contains the current position saved at a time before the second finger is likely to have had an effect. Likewise, ZigZ contains the Z value from before the second finger arrived.

Step 420 checks to see if Z has increased substantially beyond the resting Z value ZigZ. In the presently preferred embodiment, Z is compared against a threshold 30% larger than ZigZ. If Z is too small, the "zig" is disqualified and execution returns to step 404.

Step 422 checks to see if the current position is far to the left of the resting position ZigPos. Since the zigzag unit 282 is looking for an abrupt, "unnatural" change in position, it is preferable that step 422 use position data directly from dividers 174 and/or 176 of the arithmetic unit 16, before any filtering or smoothing that may normally be applied to position data. This data is referred to herein as RawPos to distinguish it from the filtered and smoothed value CurPos. The value CurPos may be used, however, if desired, with less than optimum results.

In this implementation, step 422 compares the X coordinate of RawPos with the X coordinate of ZigPos minus ZigDistance. The parameter ZigDistance can be chosen experimentally based on the observed spacing on the pad between two fingers when one finger is held down and the other tapped in a natural manner.

If a suitable leftward zig is detected, step 424 sets ZigLeft to TRUE.

Step 426 similarly checks if the current position is far to the right of the resting position; if so, step 428 sets ZigRight to TRUE.

Step 430 then waits for the next (X,Y,Z) sample to arrive.

Step 432 checks if the second finger has lifted from the pad, by comparing Z against a second "zag" threshold somewhat less than the "zig" threshold of step 420. (In the current system, this threshold is roughly 20% larger than ZigZ.) The "zag" threshold is set below the "zig" threshold in order to provide simple hysteresis.

If the second finger has not yet lifted, execution returns to step 422 to continue waiting. If the second finger has lifted, execution proceeds to step 434 on FIG. 18c.

Referring now to FIG. 18c, step 434 waits one or two samples for the (X,Y,Z) data to stabilize as the second finger lifts; this step is analogous to step 418.

Step 436 does a final check for a complete zigzag gesture. So far, a sudden motion accompanied by an increase in Z has been seen, followed by sudden decrease in Z. Step 436 additionally checks that the position has returned to its prezigzag value (the distance from RawPos to ZigPos is less than ZigRadius); the Z value has similarly returned to normal (the absolute value of Z minus ZigZ is less than ZigLimit); and either ZigLeft or ZigRight but not both, is TRUE. In addition, the second-finger tap must be of short duration, i.e. CurTime minus ZigTime is less than ZigMaxTime.

If the motion does not qualify as a zigzag, execution returns to step 404 to await detection of a zigzag gesture. If the motion has qualified as a zigzag, step 438 provides reverse motion to restore the cursor to the exact position corresponding to ZigPos, if necessary. This step is analogous to step 328 of FIG. 17b.

In step 440, a complete zigzag has been detected. If ZigLeft is TRUE, the motion is a leftward zigzag. Otherwise, ZigRight must be TRUE and the motion is a rightward zigzag. Accordingly, either step 442 simulates a left button press for a leftward zigzag, or step 444 simulates a right button press for a rightward zigzag.

Step 446 pauses for a certain amount of time. For example, this step might wait for one or several more samples to arrive, or it might wait for one or several data packets to be sent to the host. (Normally there is a one-to-one correspondence between samples and data packets.)

Finally, step 448 ends the simulated button press by setting Out to NONE. In this example, the zigzag gesture only works to simulate clicks, not drags. The zigzag does not extend neatly to a drag in the same way as the normal one-finger tap, since this would imply that the entire drag motion occurs with two fingers held awkwardly on the pad. One alternative is to simulate a locking button, as is often done with trackball buttons in the art, where consecutive zigzags alternately press and release the virtual button. Another alternative is to have the zigzag gesture press the virtual button, and to release the virtual button only when the primary finger is also removed from the pad.

After step 448, execution returns to step 404 to await detection of further zigzag, gestures.

Another gesture which is useful in specialized applications is a "push" gesture, which simply compares the Z (pressure) information against a second Z threshold ZpushDown, considerably higher than the basic finger-detection threshold, and simulates a mouse button action whenever Z exceeds this threshold. This "push" gesture is similar to the way pen-based pointing devices normally operate; however, it too imprecise and too tiring on the finger to use as the primary click or drag gesture. The "push" gesture is most useful in special contexts such as freehand drawing programs.

Figure 19:
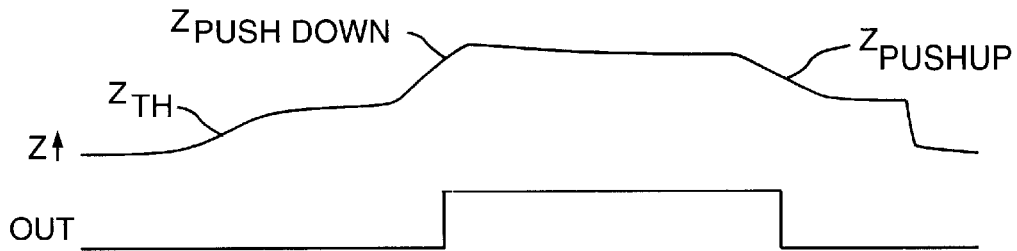
FIG. 19 is a timing diagram illustrating a "push" gesture according to the present invention.

FIG. 19 is a timing diagram illustrating a "push" gesture. To perform this gesture, the finger is first brought near enough to cause cursor motion without causing a virtual button press. Next, the finger pressure increases past threshold ZpushDown, causing the virtual button to be pressed. Later, the pressure reduces below a threshold ZpushUp, causing the virtual button to be released. If ZpushUp is somewhat lower than ZpushDown, the resulting hysteresis will prevent unwanted oscillation on the virtual button if the finger pressure varies slightly around the "push" threshold.

In one variant that may be preferable, ZpushUp is set equal to Zthresh, so that once a push has begun the finger must be fully lifted from the pad in order to release the simulated button. Other users may prefer ZpushUp to be much closer to ZpushDown than to Zthresh, resulting in a more delicate feel.

Figure 20:
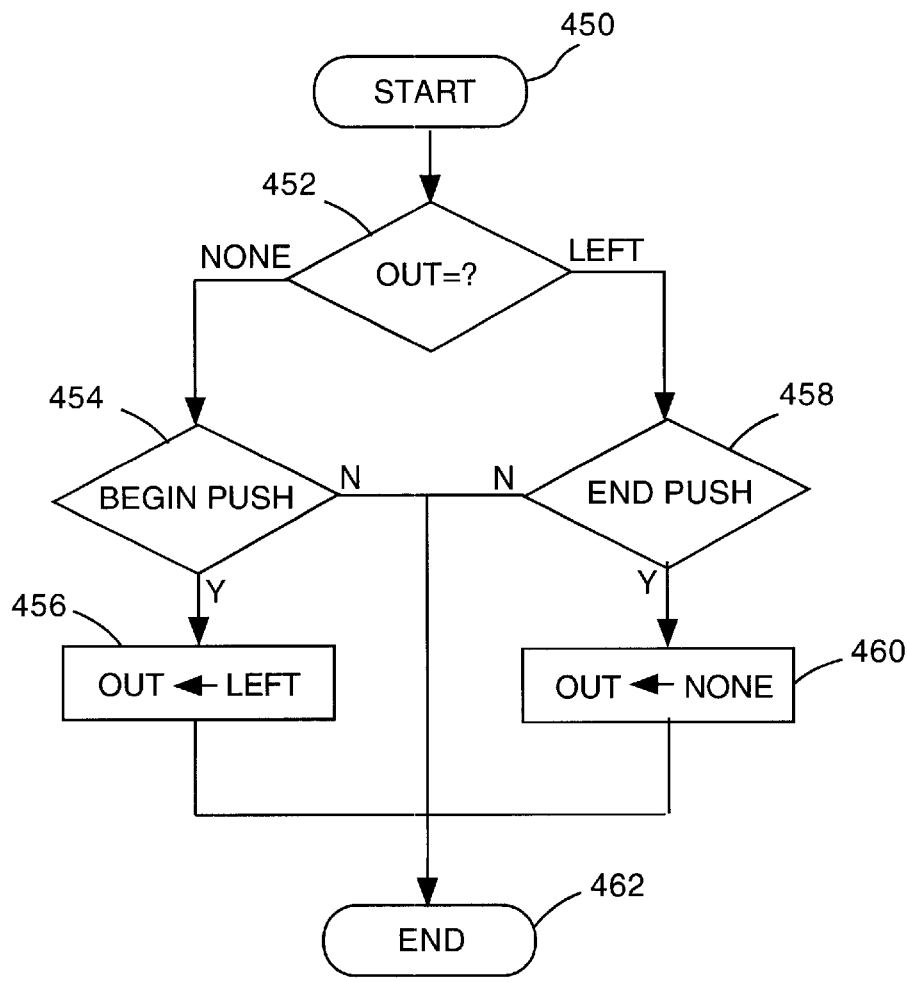
FIG. 20 is a flowchart illustrating the operation of the push unit of FIG. 14.

The push unit 284 of FIG. 14 recognizes the push gesture. FIG. 20 is a flowchart illustrating the implementation of this gesture. The corresponding diagram for an equivalent hardware circuit to recognize this gesture would be quite straightforward.

Execution begins at step 450 every time a new (X,Y,Z) sample arrives from the arithmetic unit 16. Note that the push unit 284 examines only the Z value of each sample.

Step 452 checks whether or not a "push" gesture is already in progress.

Step 454 executes if no "push" gesture is in progress. This step checks if a "push" should begin. First, "push" gestures must be enabled by the user. Second, current Z value must be greater than the threshold ZpushDown.

If Z is sufficient to begin a push gesture, step 456 sets Out to LEFT to indicate that the left button is now pressed.

Step 458 checks if the current push gesture should end. This check simply involves comparing Z against ZpushUp. If Z is less than ZpushUp, the push gesture is terminated in step 460.

Execution ends at step 462. If neither step 456 nor step 460 was executed then Out remains the same, thus providing the hysteresis referred to above. The state variable Out should be initialized to NONE at startup time.

Those of ordinary skill in the art will note that the tap unit 280 is suitable for use with any touchpad that provides (X,Y) and finger-presence information, and push unit 284 is suitable for use with any touchpad that produces Z (pressure) information. Only the zigzag unit 282 depends on special characteristics of the particular touchpad technology disclosed herein, namely the fact that two fingers reliably report an averaged finger position.

Two more algorithms that are not directly part of gesture processing may be used to address minor problems that occur when the user taps on the pad. Specifically, the finger position sometimes shears sharply in one direction just as the finger lifts away. This is due to natural slippage of the finger during this action, and is aggravated when the finger is held at a shallow angle. A "reverse motion" algorithm can deal with some jumps so far that the TapRadius test fails, reverse motion cannot help.

If Z is seen to be changing rapidly between the current and previous samples (i.e., if the absolute difference between the current and previous Z values is less than some empirically determined threshold), then the time constant of the (X,Y) filtering of the output of the arithmetic unit 16 can be increased. Normally, the old filter value and new quotient are averaged with roughly equal weighting to produce the new filter value. If Z is rapidly changing, the old filter value is instead weighted considerably (e.g., an order of magnitude) more than the new quotient. The result is that any motion occurring during this instant of high Z change is heavily damped.

Figure 21:
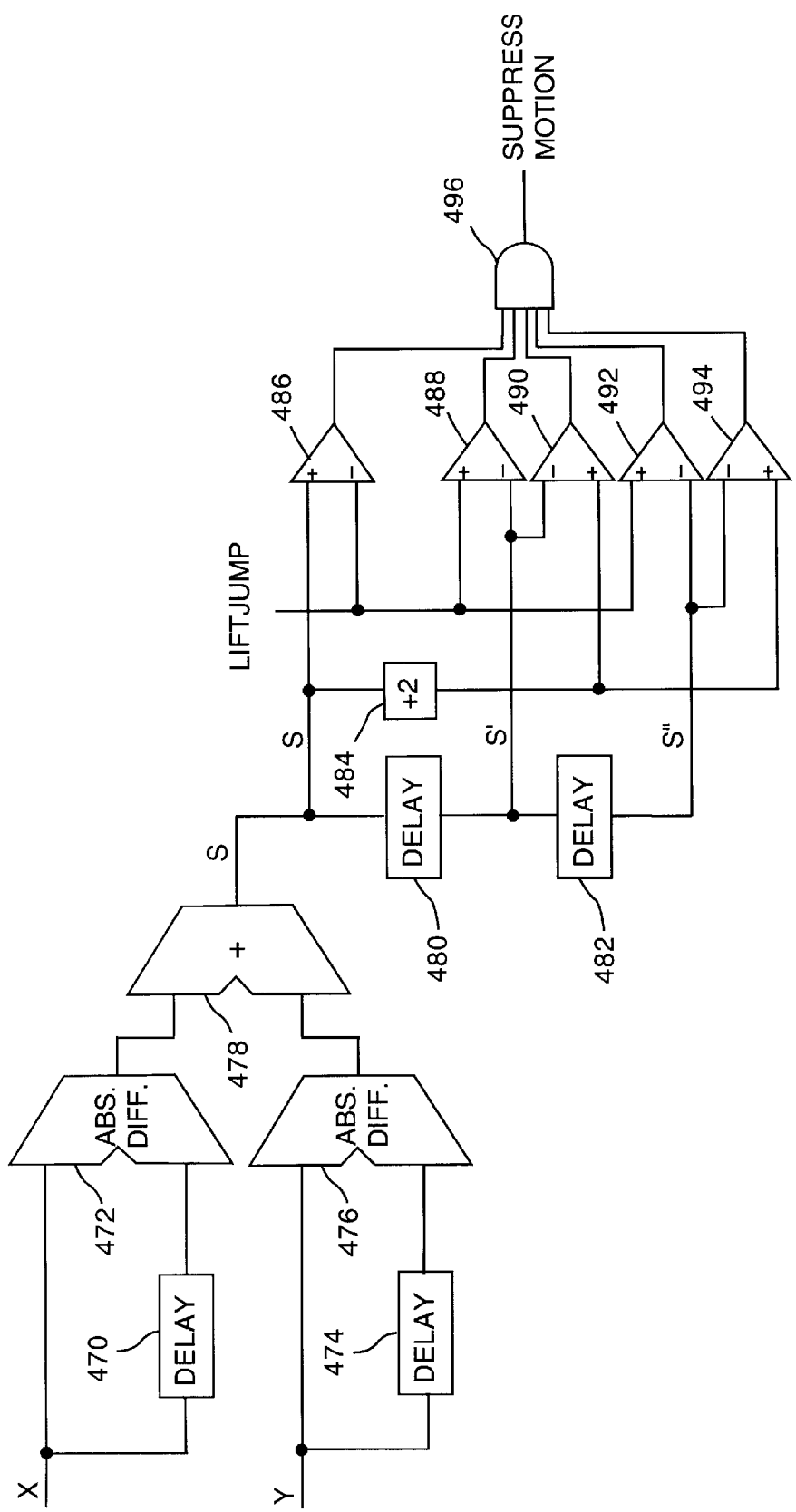
FIG. 21 is a block diagram of an illustrative LiftJump suppressor circuit which may be used in gesture recognition according to the present invention.

Often the spurious motion that arises from a finger-lift occurs all in the very last sample before Z decreases below the finger-down threshold Zthresh. Another solution to the problem of spurious finger-lift motion is the "lift-jump suppression" mechanism, which attempts to suppress this final spurious motion event. FIG. 21 shows an illustrative circuit for performing the lift-jump suppression function.

The circuit shown in FIG. 21 performs lift jump suppression. It examines the sequence of (X,Y) position samples arriving from dividers 174 and 176 of FIG. 8 to produce a speed S which is further processed to obtain a motion-suppression signal. As described previously, it is best to use the quotient values directly, before any smoothing or filtering stage, when computing the speed S.

Referring to FIG. 21, X coordinates are stored in delay 470. Subtractor 472 computes the absolute value of the difference between the current X value and the previous value stored in delay 470. Likewise, delay 474 and subtractor 476 compute the absolute change in Y. Adder 478 forms the sum of these absolute differences to produce speed S, the distance between the current and previous samples. As previously described, it is clear that other distance measures may be used for this computation. Note that, in addition to the circuitry of FIG. 21, the zigzag unit 282 also makes use of the speed value S as previously disclosed.

Delay units 480 and 482 record the previous and second-previous values of S, known as S' and S", respectively. Divider 484 computes the quantity one-half of S, denoted S/2. The lift-jump suppression unit looks for a characteristic relationship among the values S, S', S", and S/2 in an attempt to recognize spurious lift-jump events. One practiced in the art will recognize that S" is not valid until the fourth sample of a given finger stroke; thus, the lift-jump suppression unit is disabled for the first three samples of each stroke. The lift-jump suppression unit also employs a parameter Liftjump, a speed threshold which is determined experimentally and is affected by the sample rate and the sensitivity of the sensor pad.

Comparator 486 checks if the speed S is greater than the threshold Liftjump. Comparator 488 checks to see if the previous speed S' is less than Liftjump, and comparator 490 checks if S' is less than S/2. Similarly, comparator 492 checks to see if the second-previous speed S" is less than Liftjump, and comparator 494 checks if S" is less than S/2. If all five conditions are satisfied, AND gate 496 outputs a "suppress motion" signal which suppresses the action of motion unit 18 for this sample. When motion unit 18 is suppressed, its output (ΔX,ΔY) is not generated for the current sample, and its delay unit 260 is not clocked.

The profile detected by the lift-jump suppression unit usually occurs during a last spurious motion sample before the finger lifts. Since Z will fall below Zthresh on the very next sample, the current sample will never contribute to. any motion events sent to the host. The algorithm is guaranteed by design not to suppress more than one sample in a row. Thus, if the algorithm "guesses wrong" and Z does not fall below Zthresh, the skipped finger motion will be taken up into the (ΔX,ΔY) packet produced by the next sample with only a tiny hesitation in the perceived cursor motion.

The increased sensitivity of the touch sensor system of the present invention allows for a lighter input finger touch which makes it easy for human use. Increased sensitivity also makes it easier to use other input objects, like pen styli, etc. Additionally, this sensitivity allows for a tradeoff against a thicker protective layer, or different materials, which both can allow for lower manufacturing costs.

Greater noise rejection allows for greater flexibility in use and reduced sensitivity to spurious noise problems. Two techniques are employed which allow derivation of the most noise-rejection benefit.

Due to the drive and sense techniques employed in the present invention, the data acquisition rate has been increased by about a factor of 30 over the prior art. This offers several obvious side effects. First, for the same level of signal processing, the circuitry can be turned off most of the time and reduce power consumption by roughly a factor of 30 in the analog section of the design. Second, since more data is available, more signal processing, such as filtering and gesture recognition, can be performed.

The sensor electronic circuit employed in the present invention is very robust and calibrates out process and systematic errors. It will process the capacitive information from the sensor and provide digital information to an external device, for example, a microprocessor.

Because of the unique physical features of the present invention, there are several ergonomically interesting applications that were not previously possible. Presently a mouse or trackball is not physically convenient to use on portable computers. The present invention provides a very convenient and easy-to-use cursor position solution that replaces those devices.

In mouse-type applications, the sensor of the present invention may be placed in a convenient location, e.g., below the "space bar" key in a portable computer. When placed in this location, the thumb of the user may be used as the position pointer on the sensor to control the cursor position on the computer screen. The cursor may then be moved without the need for the user's fingers to leave the keyboard. Ergonomically, this is similar to the concept of the MacIntosh Power Book with its trackball, however the present invention provides a significant advantage in size over the trackball. Extensions of this basic idea are possible in that two sensors could be placed below the "space bar" key for even more feature control.

The computer display with its cursor feedback is one small example of a very general area of application where a display could be a field of lights or LEDs, an LCD display, or a CRT. Examples include touch controls on laboratory equipment where present equipment uses a knob/button/touch screen combination. Because of the articulating ability of this interface, one or more of those inputs could be combined into one of the inputs described with respect to the present invention.

Consumer Electronic Equipment (stereos, graphic equalizers, mixers) applications often utilize significant front panel surface area for slide potentiometers because variable control is needed. The present invention can provide such control in one small touch pad location. As Electronic Home Systems become more common, denser and more powerful human interface is needed. The sensor technology of the present invention permits a very dense control panel. Hand-held TV/VCR/Stereo controls could be ergonomically formed and allow for more powerful features if this sensor technology is used.

The sensor of the present invention can be conformed to any surface and can be made to detect multiple touching points, making possible a more powerful joystick. The unique pressure detection ability of the sensor technology of the present invention is also key to this application. Computer games, "remote" controls (hobby electronics, planes), and machine tool controls are a few examples of applications which would benefit from the sensor technology of the present invention.

Musical keyboards (synthesizers, electric pianos) require velocity sensitive keys which can be provided by the pressure sensing ability of this sensor. There are also pitch bending controls, and other slide switches that could be replaced with this technology. An even more unique application comprises a musical instrument that creates notes as a function of the position and pressure of the hands and fingers in a very articulate 3-d interface.

The sensor technology of the present invention can best detect any conducting material pressing against it. By adding a compressible insulating layer covered by a layer of conductive material on top of the sensor the sensor of the present invention may also indirectly detect pressure from any object being handled, regardless of its electrical conductivity.

Because of the amount of information available from this sensor it will serve very well as an input device to virtual reality machines. It is easy to envision a construction that allows position-monitoring in three dimensions and some degree of response (pressure) to actions.

While embodiments and applications of this invention have been shown and described, it would be apparent to those skilled in the art that many more modifications than mentioned above are possible without departing from the inventive concepts herein. The invention, therefore, is not to be restricted except in the spirit of the appended claims.

What is claimed is:

1. A method for recognizing a drag gesture made on a touch-sensor pad in a touch-sensing system, including the steps of:

detecting a first presence of an object on the touch-sensor pad;

comparing the duration of said first presence with a first reference amount of time;

generating a drag gesture signal indicating the occurrence of a gesture if the duration of said first presence is less than said first reference amount of time;

detecting a second presence of said object on the touch-sensor pad;

comparing the duration between said first presence and second presence with a second reference amount of time;

maintaining said drag gesture signal and repeatedly generating X and Y information for the duration of said second presence if the amount of time between said first presence and second presence is less than said second reference amount of time.

2. The method of claim 1 wherein said touch-sensing system sends said drag gesture signal and said X and Y information to a host.

3. The method of claim 1 wherein said X and Y information is positional information.

4. A method for recognizing a double tap gesture made on a touch-sensor pad in a touch-sensing system, including the steps of:

detecting a first presence of an object on the touch-sensor pad;

comparing the duration of said first presence with a first reference amount of time;

generating a first signal indicating the occurrence of said gesture if the duration of said first presence is less than said first reference amount of time;

terminating said first signal if a second reference amount of time passes before a second presence is detected;

detecting a second presence of said object on the touch-sensor pad;

comparing the duration of said second presence with a third reference amount of time;

terminating said first signal if the duration of said second presence is less than said third reference amount of time; and generating a second signal indicating said second gesture after the termination of said first signal.

5. The method of claim 4 wherein said touch-sensing system sends said first signal and said second signal to a host.

* * * * *

UNITED STATES PATENT AND TRADEMARK OFFICE
CERTIFICATE OF CORRECTION

PATENT NO.    : 6,414,671 B1
DATED         : July 2, 2002
INVENTOR(S)   : Gillespie et al.

It is certified that error appears in the above-identified patent and that said Letters Patent is hereby corrected as shown below:

<u>Column 53,</u>
Line 13, please replace "of said" with -- of a --.

<u>Column 54,</u>
Line 10, please replace "indicating said" with -- indicating a --.

Signed and Sealed this

Eighteenth Day of November, 2003

JAMES E. ROGAN
*Director of the United States Patent and Trademark Office*